US011875664B2

(12) United States Patent
White

(10) Patent No.: US 11,875,664 B2
(45) Date of Patent: Jan. 16, 2024

(54) INTEGRATED SMOKE ALARM COMMUNICATIONS SYSTEM

(71) Applicant: Smart Cellular Labs, LLC, Carlsbad, CA (US)

(72) Inventor: Tyler White, North Salt Lake, UT (US)

(73) Assignee: Smart Cellular Labs, LLC, Carlsbad, CA (US)

( * ) Notice: Subject to any disclaimer, the term of this patent is extended or adjusted under 35 U.S.C. 154(b) by 32 days.

(21) Appl. No.: 17/833,883

(22) Filed: Jun. 6, 2022

(65) Prior Publication Data

US 2022/0398913 A1 Dec. 15, 2022

Related U.S. Application Data

(60) Provisional application No. 63/196,764, filed on Jun. 4, 2021.

(51) Int. Cl.
*G08B 25/00* (2006.01)
*G08B 17/117* (2006.01)

(52) U.S. Cl.
CPC .......... *G08B 25/009* (2013.01); *G08B 17/117* (2013.01)

(58) Field of Classification Search
CPC ............................ G08B 25/009; G08B 17/117
See application file for complete search history.

(56) References Cited

U.S. PATENT DOCUMENTS 4,692,742 A 9/1987 Raizen et al.
5,365,568 A 11/1994 Gilbert
6,028,513 A 2/2000 Addy
6,150,935 A 11/2000 Anderson
6,215,404 B1 4/2001 Morales
6,441,731 B1 8/2002 Hess
6,624,750 B1 9/2003 Marman et al.
6,917,288 B2 7/2005 Kimmel et al.
7,019,646 B1 3/2006 Woodard et al.
7,233,781 B2 6/2007 Hunter et al.
(Continued)

FOREIGN PATENT DOCUMENTS

AU 2019338430 A1 3/2021
CN 104469040 A 3/2015
(Continued)

OTHER PUBLICATIONS

Invitation to Pay Additional Fees and Where Applicable, Protest Fee, issued on Sep. 8, 2022 for corresponding International Patent Application No. PCT/US2022/032409.
(Continued)

*Primary Examiner* — Ojiako K Nwugo
(74) *Attorney, Agent, or Firm* — Marcella M. Bodner; Cole Schotz, P.C.

(57) ABSTRACT

A wireless sensor alert system capable of detecting an abnormal condition, such as one of smoke, fire, carbon monoxide, temperature deviation, humidity, air quality, and radon levels. The system provides remote notifications and status information regarding the monitored information in the environment of a detector. The alert system additionally communicates over communications networks to provide user and authorized third party interactivity, as well as real-time sensor network data based upon customizable triggering events and conditions.

30 Claims, 25 Drawing Sheets

(56) References Cited

U.S. PATENT DOCUMENTS

| | | | | |
|---|---|---|---|---|
| 7,295,128 | B2 | 11/2007 | Petite | |
| 7,567,174 | B2 | 7/2009 | Woodard et al. | |
| 7,994,928 | B2 | 8/2011 | Richmond | |
| 8,013,734 | B2 | 9/2011 | Saigh et al. | |
| 8,018,337 | B2 | 9/2011 | Jones et al. | |
| 8,032,123 | B2 | 10/2011 | Sakhpara | |
| 8,258,969 | B1 | 9/2012 | Billman | |
| 8,289,157 | B2 | 10/2012 | Patenaude et al. | |
| 8,391,826 | B2 | 3/2013 | McKenna et al. | |
| 8,395,494 | B2 | 3/2013 | Trundle et al. | |
| 8,610,587 | B2 | 12/2013 | Trapper | |
| 8,723,672 | B2 | 5/2014 | Jonson | |
| 8,760,285 | B2 | 6/2014 | Billman et al. | |
| 9,123,221 | B2 | 9/2015 | Puskarich | |
| 9,154,933 | B2 | 10/2015 | Rogalski et al. | |
| 9,183,731 | B1 | 11/2015 | Bokhary | |
| 9,196,141 | B1 | 11/2015 | Schmidt et al. | |
| 9,218,731 | B2 | 12/2015 | Puskarich | |
| 9,357,490 | B2 * | 5/2016 | Kates | G08B 13/04 |
| 9,456,297 | B2 | 9/2016 | Pi-Sunyer | |
| 9,473,918 | B2 | 10/2016 | Goossen | |
| 9,514,623 | B1 | 12/2016 | Urrutia et al. | |
| 9,520,042 | B2 | 12/2016 | Eck | |
| 9,875,644 | B2 | 1/2018 | Chiarizio et al. | |
| 10,142,394 | B2 | 11/2018 | Chmielewski et al. | |
| 10,210,748 | B2 | 2/2019 | Lamb et al. | |
| 10,257,686 | B2 | 4/2019 | Logue et al. | |
| 10,568,019 | B2 | 2/2020 | Crouthamel et al. | |
| 10,636,269 | B2 | 4/2020 | Lacy | |
| 11,355,003 | B1 * | 6/2022 | Bauchot | G08G 1/205 |
| 2005/0275547 | A1 | 12/2005 | Kates | |
| 2007/0044539 | A1 | 3/2007 | Sabol et al. | |
| 2008/0045156 | A1 | 2/2008 | Sakhpara | |
| 2008/0151056 | A1 | 6/2008 | Abamefula | |
| 2008/0303678 | A1 | 12/2008 | McCredy | |
| 2009/0033505 | A1 | 2/2009 | Jones et al. | |
| 2012/0171987 | A1 | 7/2012 | Newman | |
| 2013/0154823 | A1 | 6/2013 | Ostrer et al. | |
| 2014/0062693 | A1 | 3/2014 | Watts et al. | |
| 2015/0254952 | A1 | 9/2015 | Chao et al. | |
| 2015/0341979 | A1 | 11/2015 | Gallo et al. | |
| 2018/0053401 | A1 | 2/2018 | Martin et al. | |
| 2019/0080580 | A1 | 3/2019 | Orr et al. | |
| 2019/0104395 | A1 | 4/2019 | Mehta et al. | |
| 2019/0311595 | A1 | 10/2019 | Lacey | |
| 2019/0327597 | A1 | 10/2019 | Katz et al. | |
| 2021/0349066 | A1 * | 11/2021 | Chilla | G08B 17/117 |
| 2022/0180729 | A1 * | 6/2022 | Bauchot | G08B 25/004 |

FOREIGN PATENT DOCUMENTS

| | | | |
|---|---|---|---|
| CN | 106981166 | A | 7/2017 |
| DE | 202010006956 | | 2/2011 |
| GB | 2380041 | A | 3/2003 |
| KR | 101444915 | B1 | 9/2014 |
| KR | 101767444 | B1 | 8/2017 |
| WO | 2003023729 | A1 | 3/2003 |
| WO | 2022256749 | A2 | 12/2022 |

OTHER PUBLICATIONS

International Patent Application No. PCT/US2022/032409, filed on Jun. 6, 2022.

International Search Report dated Jan. 4, 2023 for International Patent Application No. PCT/US2022/032409.

Written Opinion of the International Searching Authority, dated Jan. 4, 2023 for International Patent Application No. PCT/US2022/032409.

* cited by examiner

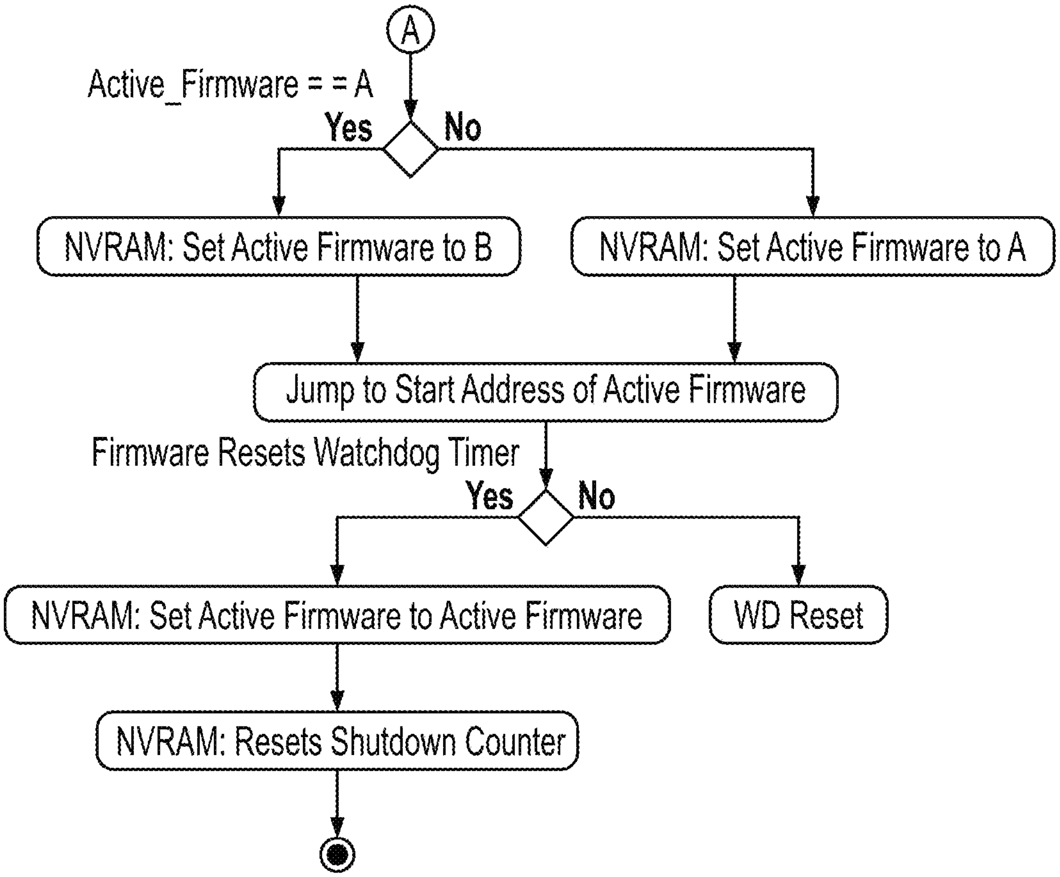
FIG. 20(Cont...)

Hardware Components / Interfaces)

INTEGRATED SMOKE ALARM COMMUNICATIONS SYSTEM

CROSS-REFERENCE TO RELATED APPLICATIONS

The present application claims the benefit of U.S. Provisional Patent Application No. 63/196,764, filed Jun. 4, 2021, the entire disclosure of which is hereby incorporated by reference herein.

FIELD OF THE INVENTION

The teachings described herein relate generally to a wireless detection and alert system that is capable of detecting an abnormal condition, such as one of smoke, fire, and carbon monoxide, including at least one smoke detector that can communicate more quickly and reliably than the typical smoke detector to provide more information to all necessary individuals, both remote and in the vicinity of the detector, as soon as a potential emergency condition is detected.

BACKGROUND

There are a number of systems for monitoring and controlling smoke, fire, and carbon monoxide detection alarm systems. These are installed as a way to detect emergencies involving smoke, fire, or carbon monoxide and alert people of the threat. Detectors are typically powered by 9-volt batteries or hard wired through electrical systems. These detectors typically respond to a threshold level of heat, smoke, or carbon monoxide by emitting an audio and/or visual indication to individuals in the vicinity of the detector that an emergency is likely.

Traditional smoke detector systems do not provide an app or have a backend server, which significantly limits the amount of available functionality and interactivity that can be implemented. For example, traditional smoke alarm systems are not connected to a server or otherwise networked and are not able to notify occupants in a home of a fire of which they are unaware if they are outside the proximity of the sounding smoke detector. Whenever a traditional smoke or carbon monoxide alarm is reported to first responders, they do not know if anyone is in the home unless a third party has reported that they know or think that someone is inside.

Smart systems have also proliferated as customers seek automation as well as remote control and access of their systems. Most automated systems use sensors and controllers to monitor and respond to system inputs and output according to instructions given by the system. A number of control systems utilize computers or dedicated microprocessors in association with appropriate software to process these inputs. These smart systems can be adapted to send a low data wireless signal, such as a text message, to a predetermined location. Such smart systems are typically associated with an access point. These access points are typically associated with security systems and/or home routers. In an emergency, the smart system may automatically send a signal to the access point, which then may alert security system personnel receiving notifications from the access point, who may then alert emergency personnel of the detected situation. However, if any of the systems involved in transmitting the signal become damaged, particularly in an ongoing emergency resulting in smoke, fire, or elevated carbon monoxide, the system will not be able to reliably detect and alert emergency personnel.

Emergency detection and alert systems involving mobile communication devices, rather than wireless, hardwired, or similar communications access, allows the detector to bypass certain of the connections susceptible to interruption in a response protocol. Additionally, it would be important to utilize a fire, smoke, and carbon monoxide detection system that quickly and reliably communicates the most amount of information to the most amount of people to increase the likelihood all necessary individuals are alerted to the potential threat and may respond more quickly and efficiently than may otherwise be the case.

SUMMARY

An objective of some embodiments of the present disclosure is to send help timely in the event that an alarm or emergency event is triggered (e.g., detection of excessive heat, smoke, carbon monoxide etc.). For that purpose, the communications module in a smoke detector sends an alarm to an external communication server, which processes the alarm and sends a notification to the Client Mobile Application if needed, so that the end-user has the ability to respond to the alarm in the Client Mobile App (e.g., cancel the alarm, send it to Central Station immediately, contact 911 immediately, etc.). In the event the new alarm is not processed within a predetermined period of time (e.g., 30 seconds by default), then the alarm would be sent to the Central Station automatically, and the Central Station would then proceed with verifying the alarm and notifying emergency services if needed.

In some embodiments, a smart smoke detector that communicates more information more quickly than the typical smoke detector and, in doing so, increases the safety of the individuals in the vicinity of the detector and increases the likelihood of preserving the location of the detector. The systems described in the present disclosure do this by increasing the detection, responsiveness, and efficiency of each susceptible point as well as adding additional non-traditional elements allowing the detector to avoid certain susceptible points entirely.

Among many benefits, one benefit described and provided herein is that some embodiments increase the accuracy of the smoke sensor, which may prevent false alarms that cloud monitoring systems and prevent efficient response to emergency situations. The present disclosure improves monitoring by using an ionization type or photoelectric smoke sensor which allows the detector to detect smoke faster and more effectively. Alternatively, the present disclosure may use an imaging system for recognizing the presence of a fire, such as using photographic, infrared, etc. imaging detectors in conjunction with software pattern recognition and/or edge AI. Likewise, the present disclosure uses an electrochemical carbon monoxide sensor that is more reliable.

In addition to monitoring for fire, smoke, and carbon monoxide, the present disclosure can also be adapted to include further monitoring features that would improve the safety and efficacy of the smart smoke detector. For example, the present disclosure can be used to monitor air quality or radon levels to identify further potential issues. This may be used to detect temperature and humidity, including any changes to temperature and humidity. This would alert the user to potential issues such as mold risk due to increased humidity or heat spike due to fire. This monitoring occurs both short-term to detect rapid changes signaling potential immediate emergencies, but also detects and tracks long term changes to temperature and humidity to identify more subtle or seasonal patterns that may lead to or indicate unsafe conditions. Such monitoring can also allow the users to improve the air quality in the home and reduce energy consumption by tracking both short term and long-term patterns in temperature and humidity in the vicinity of the detector. Likewise, users would be able to detect elevated levels of radon earlier and install mitigation systems, which may otherwise go untested for extended periods.

The present disclosure can also be adapted to monitor the detector through a cellular connection, which may prevent monitoring interruptions due to damaged access points or communications connections such as wireless routers or cables. This allows the detector to alert emergency personnel, even when communications systems are interrupted as long as a cellular network is available in the vicinity of the detector. This also removes the need The present disclosure also increases battery life to prevent interruption. It does this by relying on long lasting batteries such as lithium batteries and avoiding reliance on power, which may not be available in an emergency situation.

The present disclosure can also be adapted to integrate into smart systems that are often integrated into residences and businesses for increased monitoring and communication to not only security and emergency personnel, but also for early notification of individuals in more remote parts of the monitored location, those responsible for the monitored location, or those not at the location at the time of the detected emergency situation. For example, the present disclosure may be adapted to send push notifications to one or more devices such as mobile devices or smart systems. The present disclosure may also be adapted to allow users to cancel false notifications, preventing unnecessary use of emergency personnel.

An additional objective of the present disclosure is to provide a portal for law enforcement to access the system's smoke detector logs to help in responding to or investigating alarms or events by providing historical information before and during the event. For example, in the event of a fire, the start time of a fire may be more closely approximated based on when the first alarm was triggered. Additional sensor history may also be compared to ascertain information indicating the potential rate of spread and direction of the fire.

Another objective of the present disclosure is to improve the response framework for first responders and improve user experience in the event of an alarm. A cell phone application that will transmit the GPS location of any smart phones connected to a registered smoke detector account anytime that smoke or carbon monoxide are detected by a smoke detector associated with the account. This will allow for a better user experience and also provide first responders with previously unknown additional information to help them make more informed decisions. Additionally, a cell phone application will sound a loud Temporal-Three (T-3) cadence when smoke is detected or a Temporal-Four (T-4) cadence when carbon monoxide is detected essentially enabling all cell phones registered to a particular smoke detector to act as additional sounders when smoke or carbon dioxide are detected, utilizing the universally recognized National Fire Protection Association T-3 and T-4 cadences.

BRIEF DESCRIPTION OF THE DRAWINGS

FIG. 13 illustrates an embodiment of the process for device check-in.

DETAILED DESCRIPTION

The present techniques will now be described in detail with reference to a few embodiments thereof as illustrated in the accompanying drawings. In the following description, numerous specific details are set forth in order to provide a thorough understanding of the present techniques. It will be apparent, however, to one skilled in the art, that the presently described techniques may involve features which are optional or substitutable with other equivalent features, while still enabling accomplishment of the same effects, solutions, or results as are within the scope of the invention described and contemplated herein. Additionally, while the features, steps and/or structures of the invention described and contemplated herein may explained and described in varying degrees of detail, all are explained and described in sufficient detail for persons of ordinary skill in the relevant art to make and use the presently described invention. Further, it should be understood that several inventive techniques are described, and such embodiments are not limited to systems which require all of the techniques described, since balancing various cost and engineering tradeoffs may produce embodiments of systems that provide a subset, rather than all of the potential benefits, described herein as will be readily apparent to persons of ordinary skill in the relevant art.

It should be understood that the description and the drawings are not intended to limit the present techniques to the particular form disclosed, but to the contrary, the intention is to cover all modifications, equivalents, and alternatives falling within the spirit and scope of the techniques and embodiments of the invention as described and contemplated herein. Further modifications and alternative embodiments of various aspects of the techniques will be apparent to those skilled in the relevant art in view of this description. Accordingly, this description and the drawings are to be construed as illustrative only and are for the purpose of teaching those skilled in the art the general manner of carrying out the present techniques.

It should be understood that the various forms of the present techniques shown and described herein are exemplary embodiments and, therefore, not intended to limit the scope of the presently described and contemplated invention. Equivalent elements and materials may be substituted for those illustrated and described herein, parts and processes may be reversed or omitted, and certain features of the present techniques may be utilized independently, all as would be apparent to one skilled in the relevant art with the benefit of this description of the present techniques. Changes may be made in the elements described herein without departing from the spirit and scope of the present inventions as described and contemplated herein.

Headings used herein are for organizational purposes only and are not meant to be used to limit the scope of the description.

Figure 1:
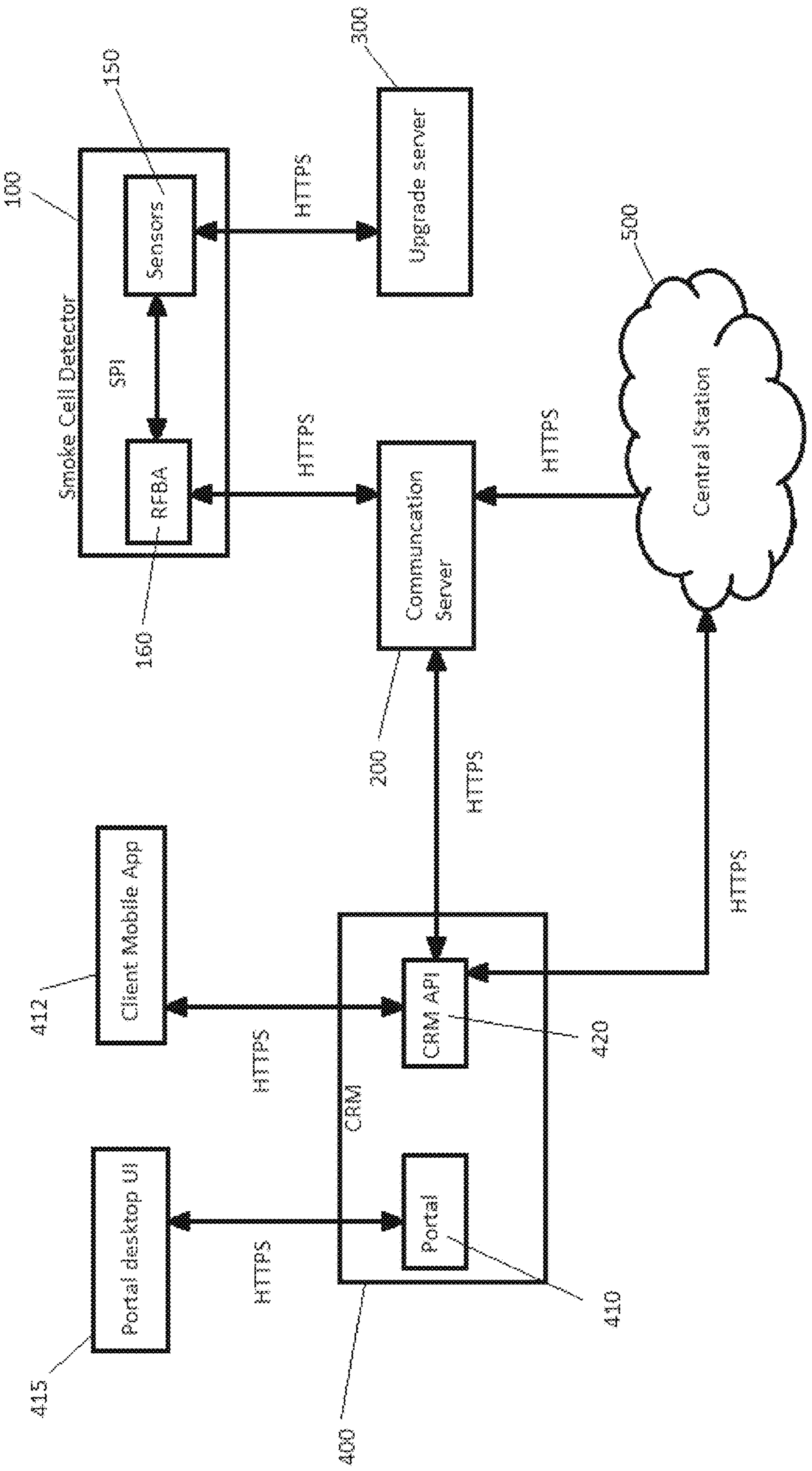
FIG. 1 illustrates an embodiment of the system including the detector 100 and computing device 200.

In one embodiment, a system depicted in FIG. 1 is shown, including one or more detectors 100 for detecting an abnormal condition, such as one of smoke, fire, carbon monoxide, temperature, humidity, air quality, and radon levels. Upon detection of an abnormal condition, the detector can deliver notifications by a cellular chip 200 to a remote computing device 300 for processing and response.

In some embodiments, the system may include a networked architecture with cloud-based back-end services, one or more applications on client devices, and one or more RF Board Assemblies ("RFBA") integrated into a residential alarm sensor units (referred to herein as a "Smoke Cell" or "Smoke Cell detector"). The Smoke Cells can detect at least the presence of at least one of fire, carbon monoxide, and smoke, but may also detect the presence of other airborne contaminants such as natural gas, impurities, or pollutants. The Smoke Cells may also be equipped with additional sensors capable of detecting other abnormal or monitored conditions, such as extreme temperatures (heat or cold), decibel levels, sound patterns, and/or lighting fluctuations. The Smoke Cell may also contain one or more sensors for monitoring for and detecting external tampering or interference with device operations.

Figure 10:
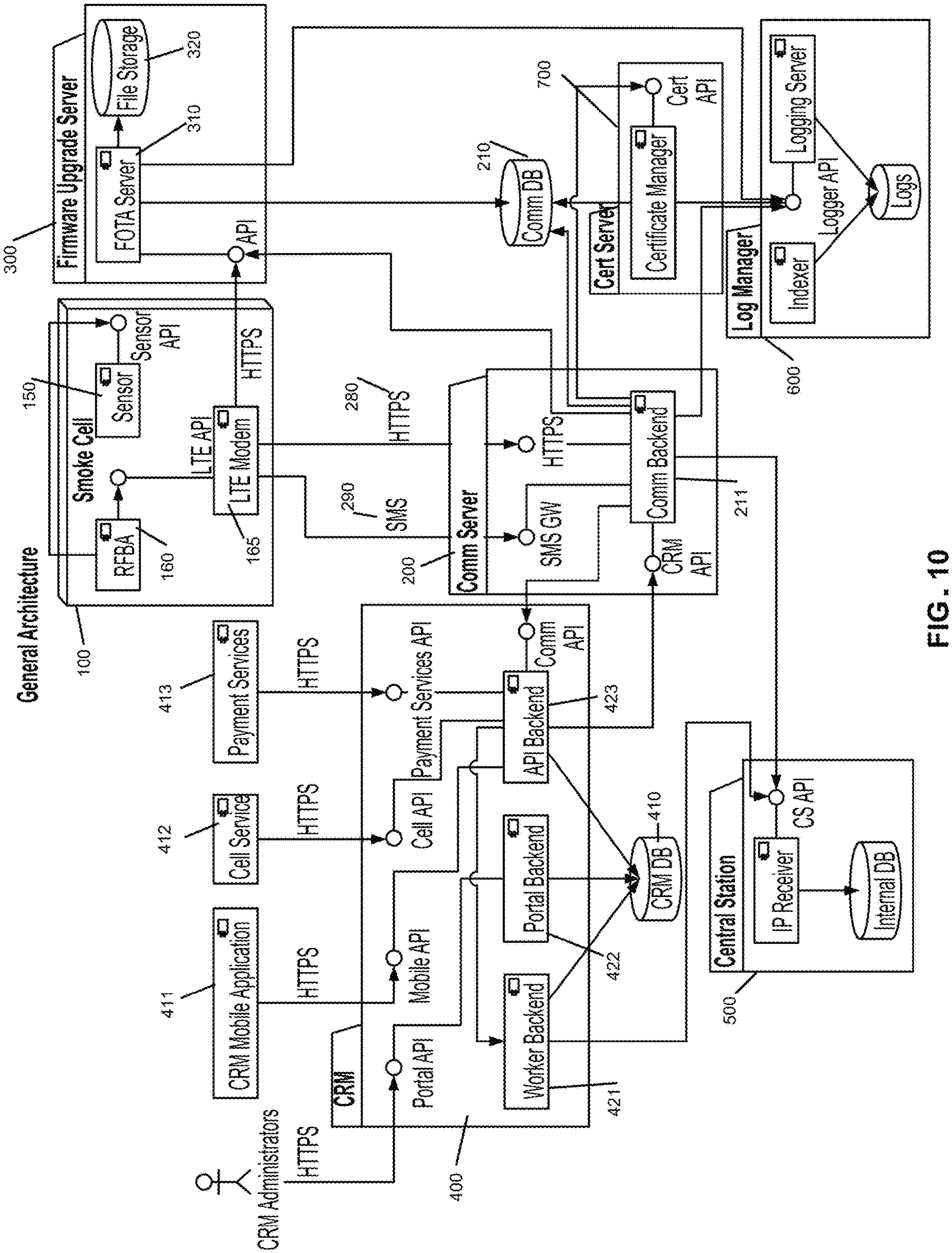
FIG. 10 illustrates an embodiment of the system's general architecture, with the various connections between component servers, devices, and connected systems.

In another embodiment, a system depicted in FIG. 10 is similarly shown, with one or more Smoke Cell detectors 100 for detecting an abnormal condition. Each detector utilizes a communications module, such as an LTE Modem 165, to communicate with servers for upgrading firmware 300 and for communications with CRM 400 and monitoring systems 500. The firmware upgrade server 300 provides upgrading of detectors and other connected hardware through firmware over the air procedures. The communications server 200 securely connects to the LTE Modem on each device through encrypted channels using protocols such as HTTPS 280. Additionally, the communications server may provide a backup communications channel using SMS communications 290 with each LTE Modem in case a communication error has occurred on one or more of the primary channels. Additional servers 700 may also be deployed to specifically handle certificate authorization, validation, and management. A CRM server 400 is also provided to manage user accounts, handle payments 413, interface with mobile applications 411 and cellular networks 412, and communicate with monitoring systems at the central station 500. The central station 500 preferably also includes an Alarm Receiver that receives alarm-related notifications and information from the communications server or the CRM server 400. Databases 410 and 210 are also provided in connection with various servers and systems to log real-time events, user activity, system status, and other information gathered from the system and/or any connected devices or detectors. Additionally a log manager 600 may be utilized to provide logging and indexing of events, alarms and associated data.

Figure 2:
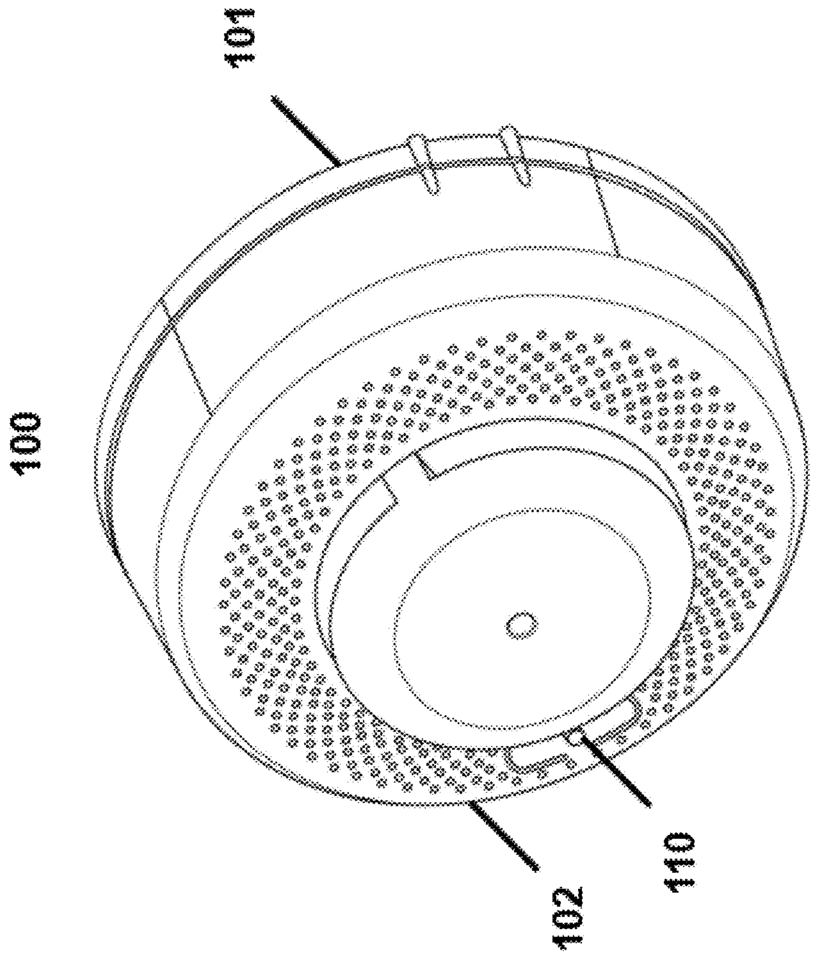
FIG. 2 is a perspective drawing of a detector 100 for smoke, fire, and carbon monoxide detection as closed.

FIG. 2 depicts the Smoke Cell 100 of a system in one embodiment. Smoke Cell 100 is made up of various internal and external elements, with the mounting base 101 for mounting the detector 100 to a location for detection and a detector lid 102 to encapsulate the Smoke Cell detector 100.

Figure 3:
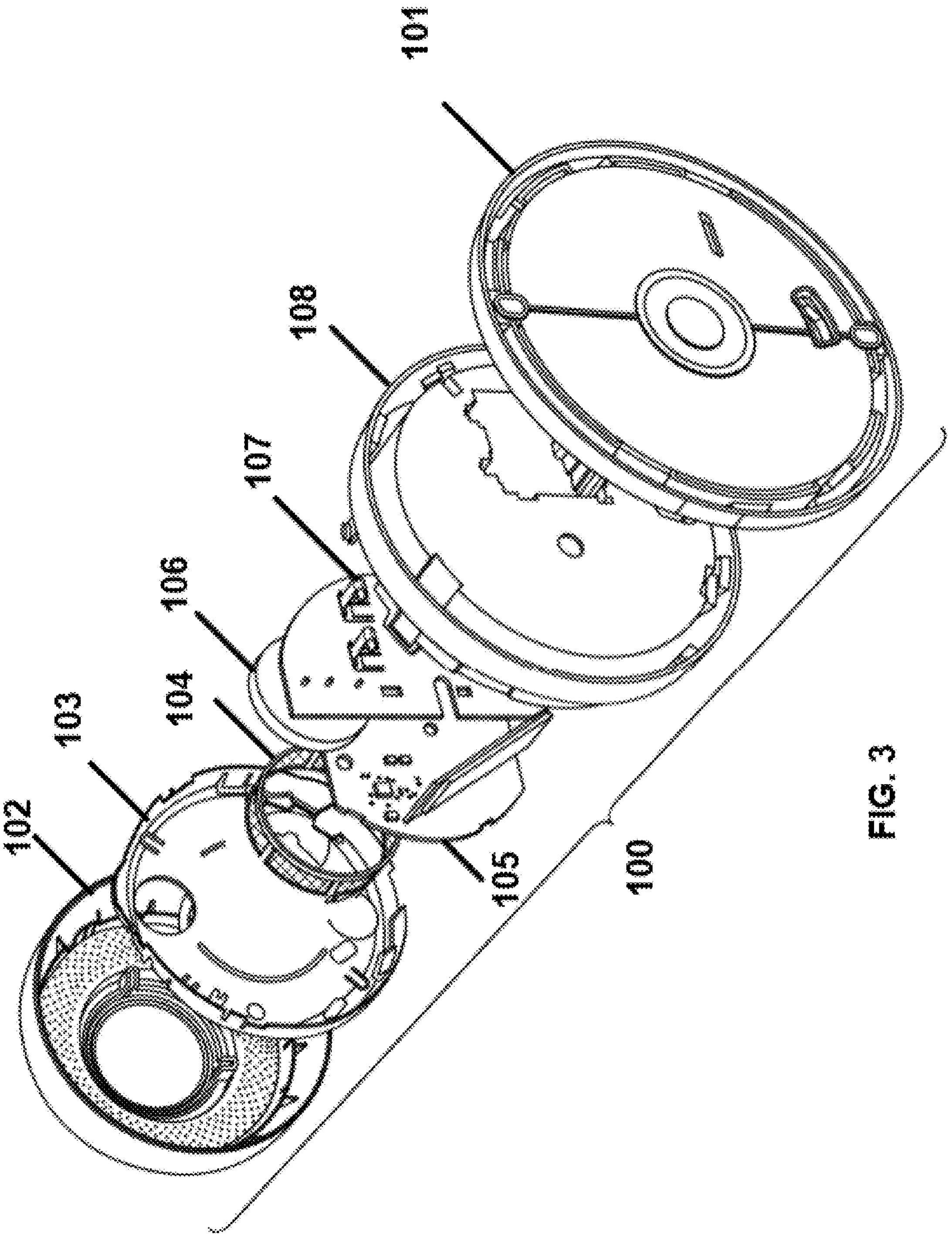
FIG. 3 is an exploded bottom-left view of a detector 100 for smoke, fire, and carbon monoxide detection.

FIG. 3 is an exploded view of a Smoke Cell detector 100 from the bottom-left perspective which includes certain visible internal elements of the detector 100. Specifically, the detector lid 102 is shown separated from the chamber cover 103, which may adjoin a cylindrical particulate filter mesh 104 for the filtration and detection of air particles in order to detect smoke, temperature, humidity, air quality, and radon levels more accurately. The filter mesh 104 may adjoin the PCB assembly 105. In the embodiment depicted in FIG. 3, the PCB assembly 105 borders a buzzer 106 for sounding an alert. In one embodiment, the buzzer 106 is a piezoelectric sounder, but it is understood that other buzzer or sounding devices may be used in place of a piezoelectric sounder.

Figure 4:
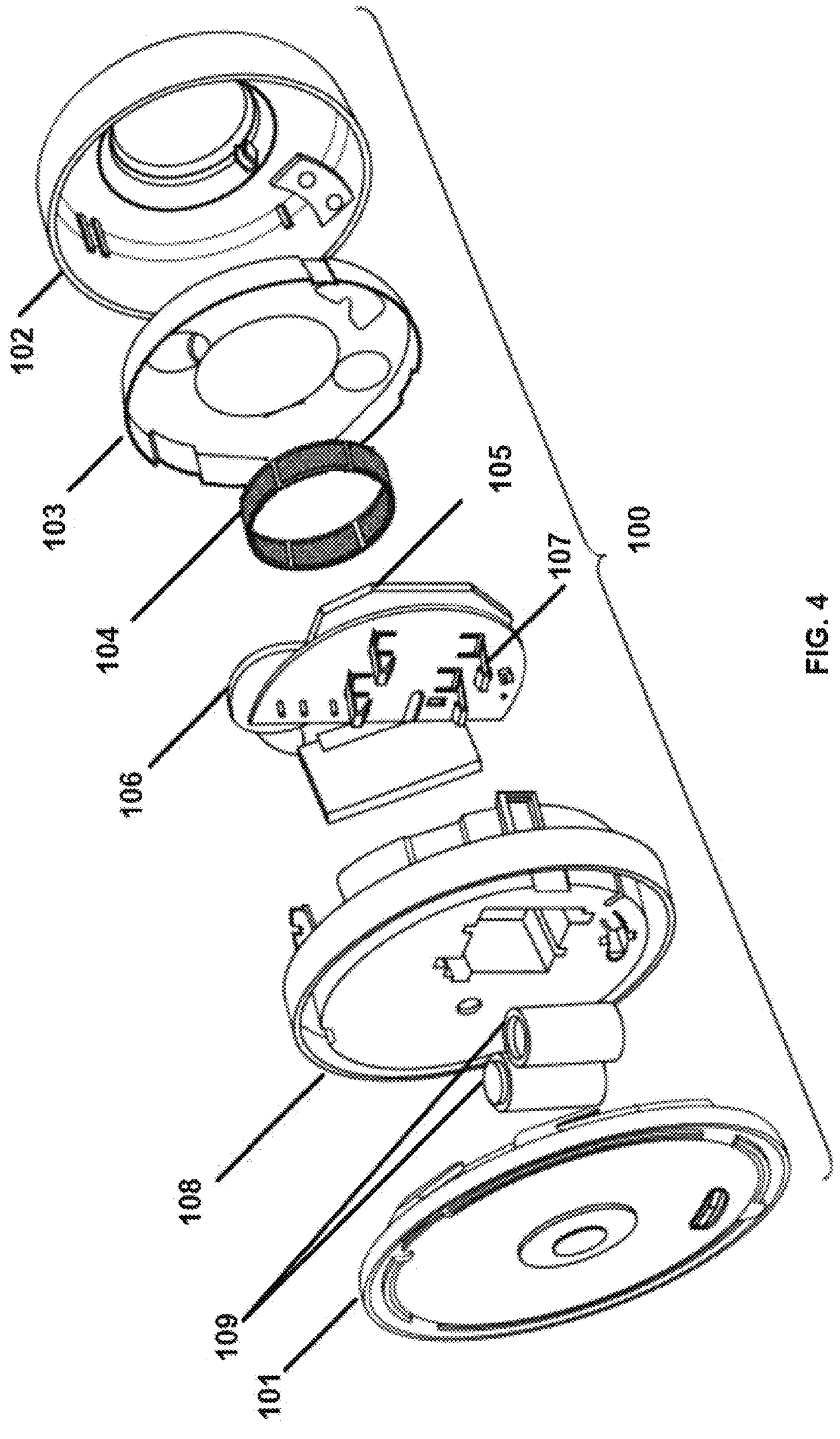
FIG. 4 is an exploded bottom-right view of a detector 100 for smoke, fire, and carbon monoxide detection.
Figure 5:
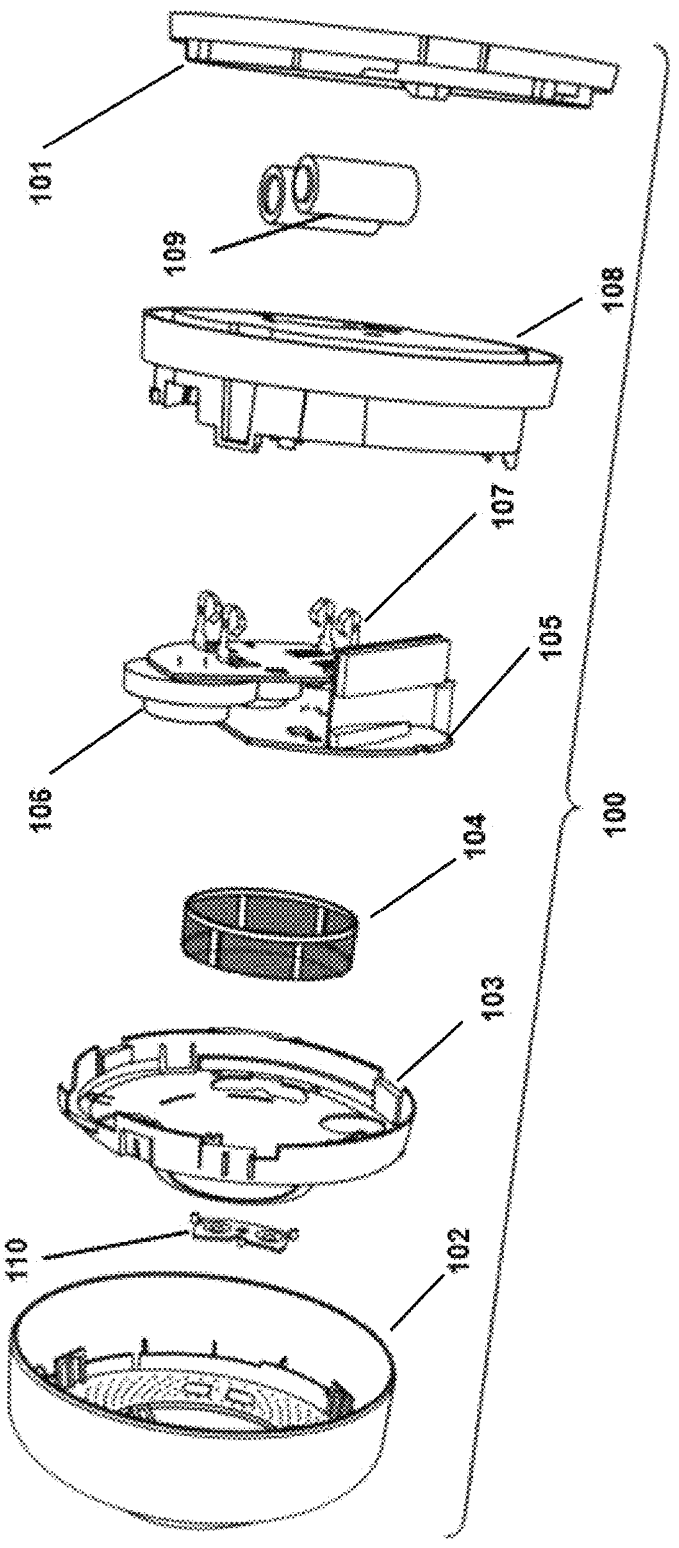
FIG. 5 is an exploded side-left view of a detector 100 for smoke, fire, and carbon monoxide detection.

FIG. 4 and FIG. 5 depict further views of a detector 100 illustrating an embodiment wherein the PCB assembly may abut the battery terminals 107, which house the batteries 109 through the bottom case 108 when the Smoke Cell detector 100 is closed and the batteries 109 installed. In one embodiment, the batteries 109 are two CR123A lithium batteries. It is understood other batteries with comparable or better battery life and comparable or smaller size could replace CR123A batteries.

In one embodiment, the Smoke Cell detector 100 contains a button membrane 110 that may be accessed through the detector lid 102 to control the detector 100, as depicted in FIG. 5 and FIG. 2. It is understood that a button membrane 110 may be replaced by various other methods of manually controlling the detector 100, for example, a pin hole. It is further understood that remotely controlling the Smoke Cell detector 100 may also be an alternative to the use of a button membrane 110.

Figure 6:
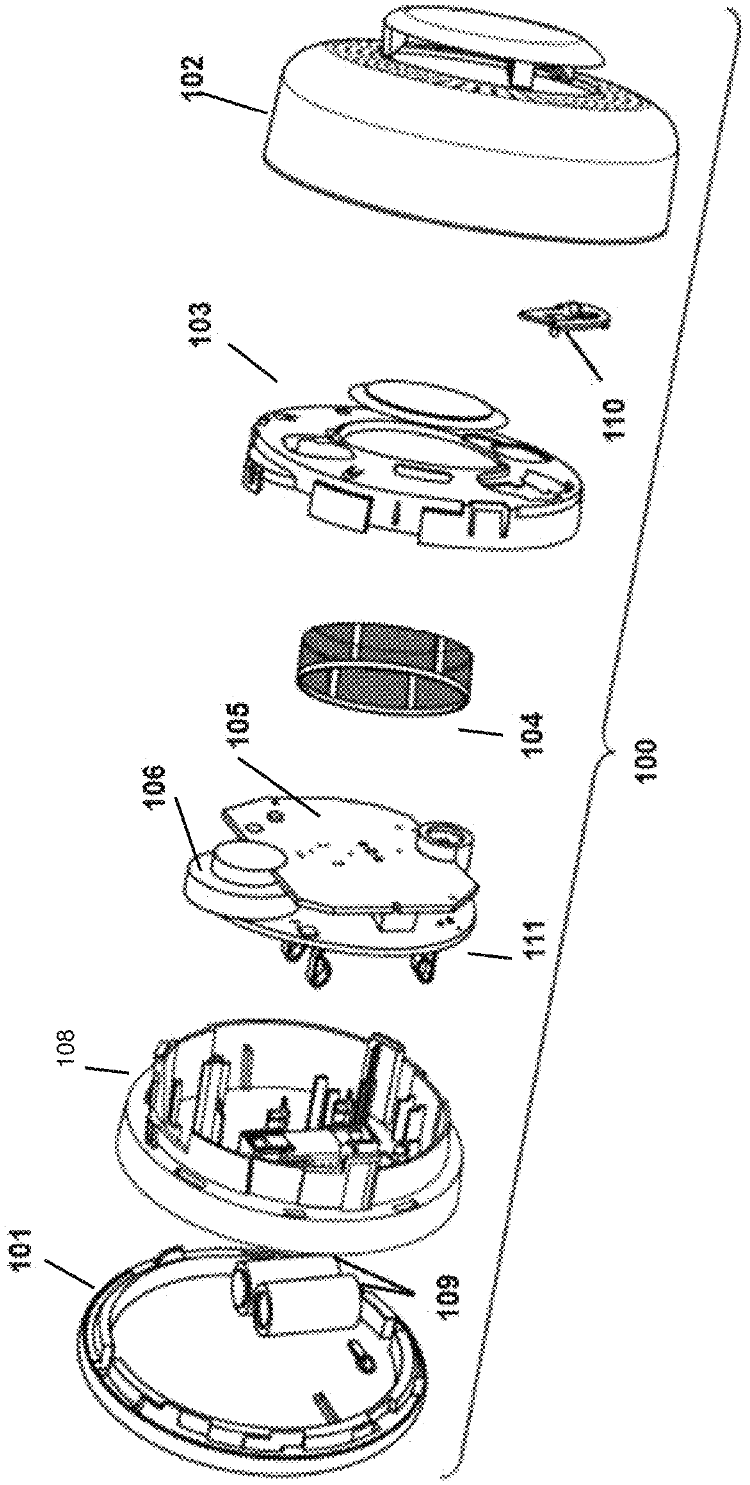
FIG. 6 is an exploded side-right view of a detector 100 for smoke, fire, and carbon monoxide detection.

In one embodiment, the filter mesh 104 may also adjoin the PCB assembly 105, which may in turn adjoin the carbon monoxide cell 111 for the detection of carbon monoxide levels in the environment of the Smoke Cell detector 100, as depicted in FIG. 6.

In one embodiment, each Smoke Cell detector may have one or more of the following attributes associated with it:

Device ID (DID), a string name assigned to the unit, manufacturer information, model information of the unit, international mobile equipment ID (IMEI) for the unit, integrated circuit card ID number (ICCID) for the unit, current firmware version data, upgrade priority information or upgrade wave assignments, Cat M1 module information (module, firmware version, hardware version), and any text commentary to be associated with the unit The associated attributes may be stored on the unit itself or may also be stored on remote servers and associated with the unit through a common unique identifier or unique combination of identifiers (e.g., the DID, IMEI, ICCID, string name, etc.).

Figure 7:
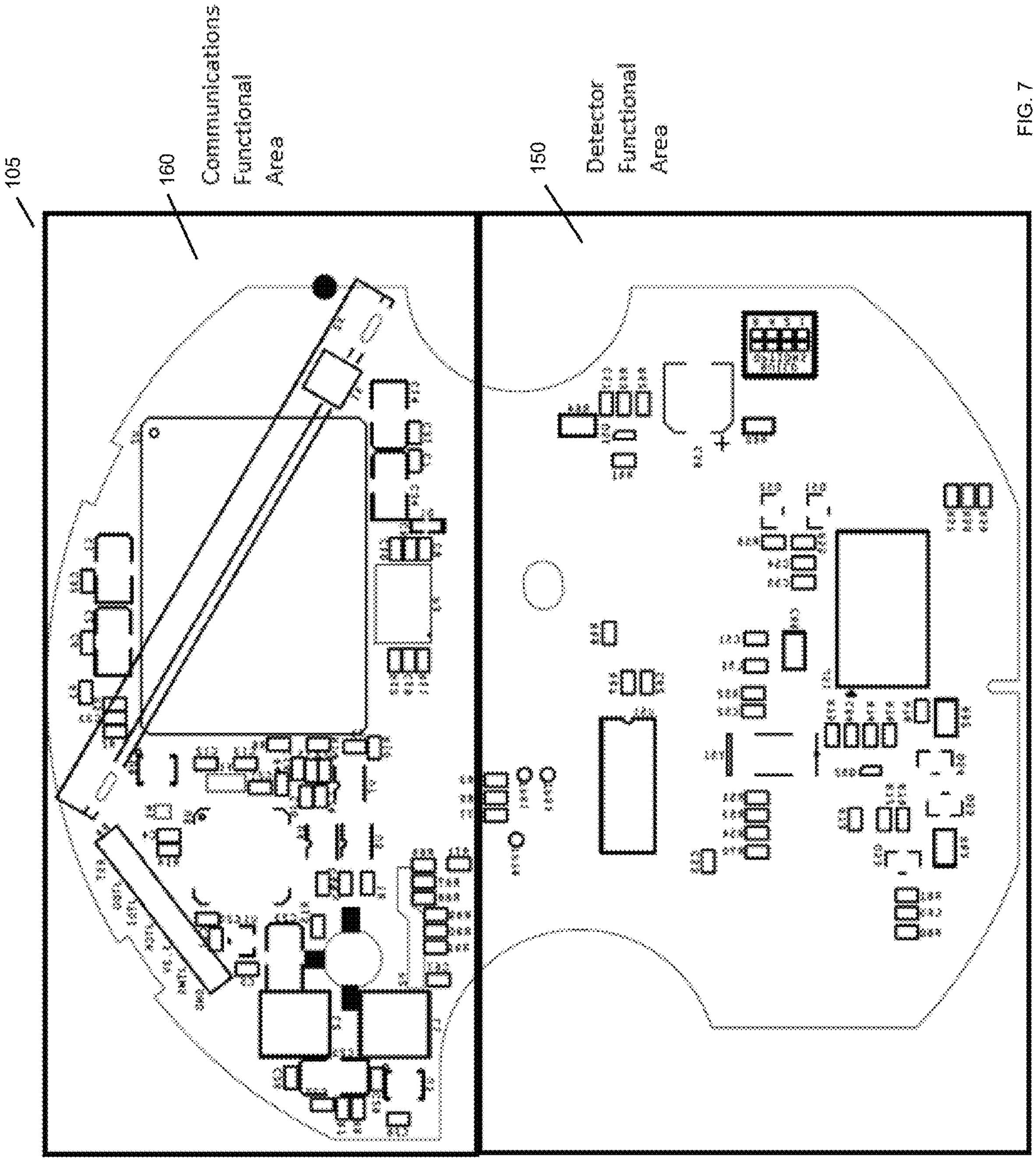
FIG. 7 is a perspective view of the printed circuit board (PCB) assembly of the detector with a communications functional area and a sensor detector functional area.

FIG. 7 depicts an internal layout of an embodiment of the Smoke Cell detector 100. In some cases, the Smoke Cell detector comprises a board containing at least two functional areas that contain separate modules that are in communication with one another, a communications functional area 160 and a detector functional area 150. The two functional areas communicate over a direct line, such as an serial peripheral interface (SPI).

The first functional area provides communication to external systems, allowing the transmission of alerts and sensor data from the Smoke Cell. Preferably this communication is over CAT-M cellular protocol or a similar low-power, wide-area network (LPWAN) protocol to provide unwired communication with an external system to transmit data and receive external commands and requests. Alternatively, the communication may also include wired connections to facilitate better signal integrity. For example, for a Smoke Cell installed in a location with poor reception due to a high number of obstructions or material with high impedance characteristics, a wired connection may be employed to at least bypass the area of obstruction or impedance. The wired connection may connect the Smoke Cell to the communications network via a router or an external wireless/cellular transceiver.

In another alternative with multiple Smoke Cell detectors deployed in relatively close proximity and on the same authorized account, an additional local wireless communications network may be deployed to connect the plurality of Smoke Cell detectors. Of the plurality of detectors, at least one Smoke Cell detector having the highest relative cellular signal strength connection to the external system is then automatically configured to operate as the primary cellular transceiver for the networked plurality of detectors. The remaining detectors communicate with the primary detector over the local network and the primary detector communicates with the external systems over the cellular connection.

Cellular or wireless repeaters may also be deployed to similarly bypass obstructions or boost signal strength and integrity. The repeaters may also be deployed as an additional module in the Smoke Cell detector, permitting each Smoke Cell detector to improve the signal strength and integrity for any nearby Smoke Cell detectors and related devices.

The first functional area contains at least one radio microcontroller unit (Radio MCU) that controls the one or more communication modems and subsystems. Preferably, the communications modem is in a sleep mode and the Radio MCU periodically wakes it on a set schedule in order to check-in with a remote external back-end system. For example, the Radio MCU may be set on a daily schedule to wake the modem to send a check-in transmission and then return the modem to sleep mode. The Smoke Cell may also run a diagnostic check or compile data on the status of each sensor as part of the check-in transmission. The back-end system receives the expected check-in from each Smoke Cell and any additional information provided, logging the status. The check-in process may additionally include communication requests between the back-end system and the Smoke Cell. For example, the back-end system, upon receiving a successful check-in from a connected Smoke Cell, may reference stored profiles and processes specific to that Smoke Cell or to an associated user account and send data retrieval requests to the Smoke Cell for additional status information. The Smoke Cell in response may then collect and transmit the updated status information upon request. The back-end system can conclude the check-in process with a sleep command or the Smoke Cell may have a set time-out interval to return to sleep mode.

In one embodiment, the communications server may require each Smoke Cell detector to successfully check-in according to a predetermined schedule or time interval. Upon a device check-in with the communications server, the server compares the device's firmware version information against the current version information stored on the communications server or a connected upgrade server. The communications server may require each device be upgraded to the latest associated firmware version, or it may process a set of rules to determine whether the device may forego or delay the firmware upgrade (e.g., depending on the device's current version or whether an upgrade is desirable at the moment). The communications server may also send an upgrade request notification to the user through a connected CRM system in order to receive user commands or input on whether an upgrade should be performed at that moment. If the upgrade is delayed, the communications server may reschedule the upgrade for a later time or at the next scheduled check-in.

Figure 13:
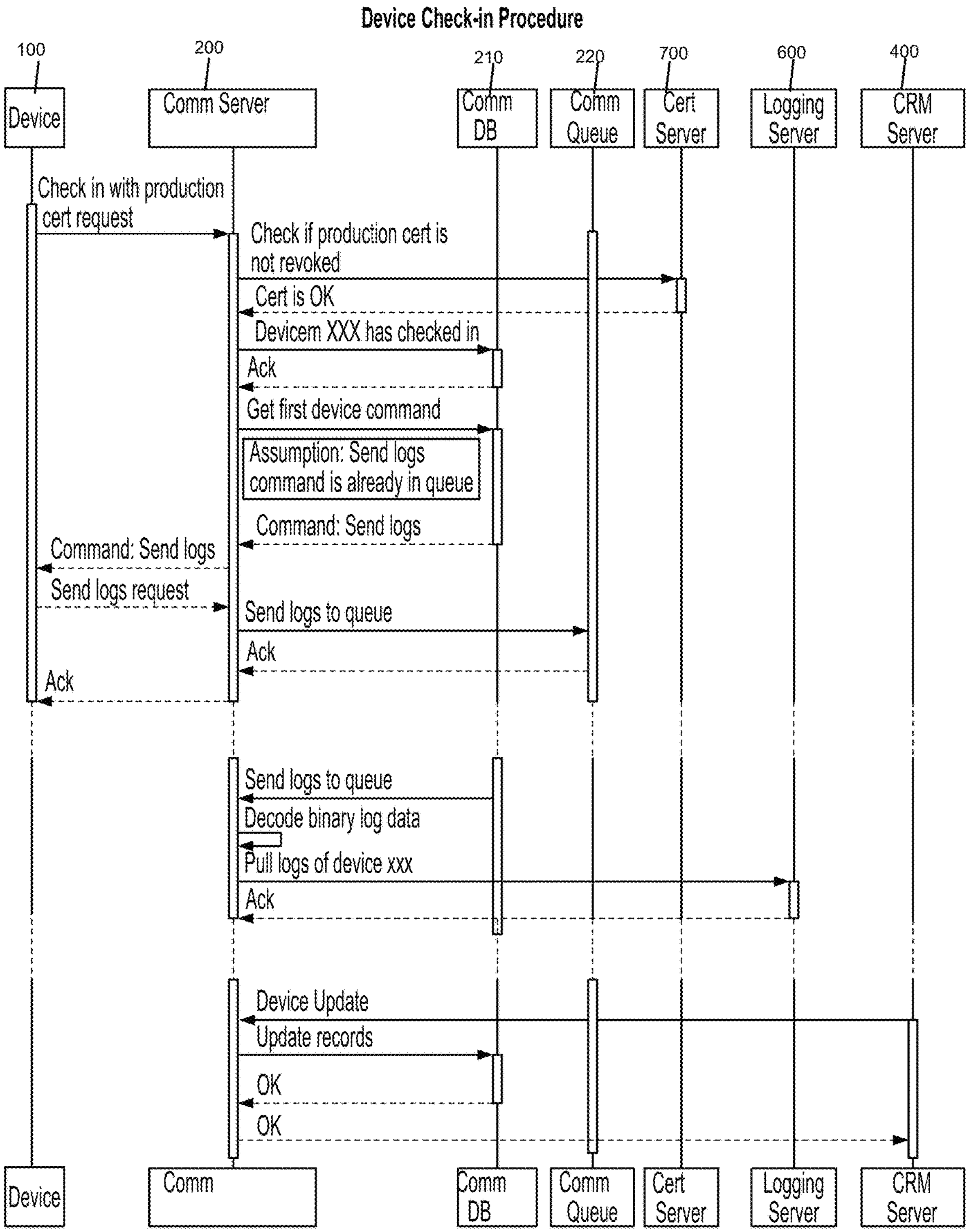

In another embodiment, a response command may be issued for the checked-in device that can instruct the device to download an upgrade. An example of a detailed sequence diagram according to one embodiment is depicted in FIG. 13. As depicted in FIG. 13, the device check-in procedure can involve various communications and commands transmitted between the device 100, the communications server 200, and other connected databases and servers (210, 400, 600 and 700). The procedure shown includes a number of steps:

a. Validating the device by transmitting device certification information and checking certificate status
b. Requesting and transmitting device logs for external logging
c. Downloading device update data and updating associated records Specifically, the device 100 first checks in to the communication server 200 with its production certification. The communication serve 200*r* then validates with the certificates server 700 that the certificate is valid. If it is valid, the communication server 200 then updates its database 210 to indicate that the device 100 is now checked in. The communication server 200 then sends the first device command to its database 210, retrieving a command to send logs for the device 100. The device 100 then initiates a request to send the logs, and the communication server 200 sends the logs request to its queue 220. The queue 220 subsequently returns the log data, which the communication server 200 decodes from its binary format. The communication server 200 then updates the logging server 600 with the logs of the device 100. The CRM server 400 then sends a device update to the communication server 200, which updates the records for the device 100 in its database 210. Upon acknowledgement of the update from the database 210, the communication server 200 indicates to the CRM server 400 that the device update is completed.

The upgrade server may additionally provide upgrades to the LTE module or a separate associated LTE Module upgrade server may be used in conjunction as part of the upgrading procedure. The upgrade server preferably contains a back- and front-end control panel to manage the stored upgrade information, rules, and procedures. The upgrade functionality may also be deployed as part of the CRM system as well.

For example, in one embodiment, upgrades may be deployed in sequences, batches, or waves that are associated with the deployed devices. Upgrade waves may be assigned to sets of devices based on location, and batches may be created based on other associations, such as day of deployment, model, user-defined groupings, etc. The use of upgrade rules and priorities may be used to selectively limit or target particular devices or groups of devices for the upgrade process, and to also provide an orderly sequence for upgrading a plurality of deployed devices in stages. Specific upgrades may also be deployed only for associated devices by selecting their respective wave, batch, or group. Additionally, certain upgrade regulations may be assigned to a wave, batch, or group as needed.

Figure 15:
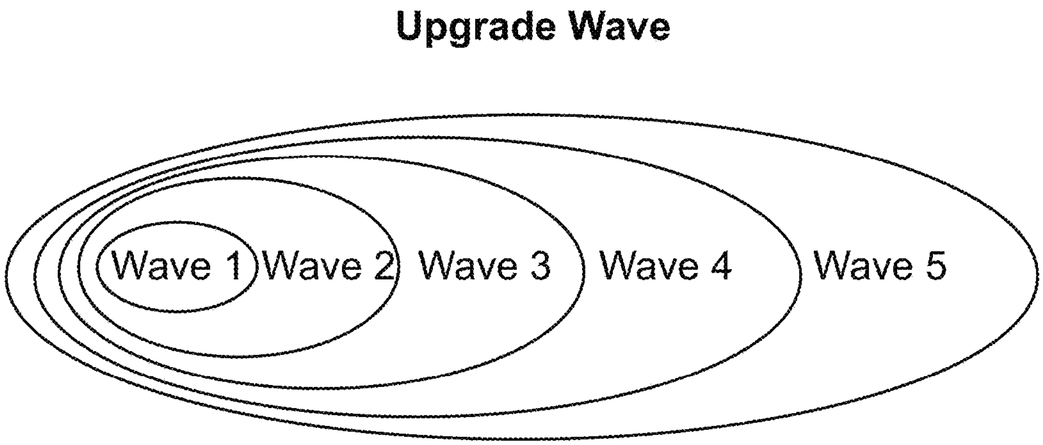
FIG. 15 illustrates an embodiment of the process for upgrading devices in waves.

In one embodiment of an upgrade wave procedure, FIG. 15 depicts a plurality of geographically defined waves. Devices located within those defined locations would be assigned to their respective wave number. The upgrading process may then sequentially advance through the total number of waves, upgrading each in turn. Alternatively, only some of the waves may be selected for upgrades, upgrading only the subset of assigned devices and leaving the remaining devices as is. In another embodiment, the upgrade server maintains a table of all Smoke Cell Firmware versions together with associated entities, attribute and rules required for the upgrade processing.

Figure 16:
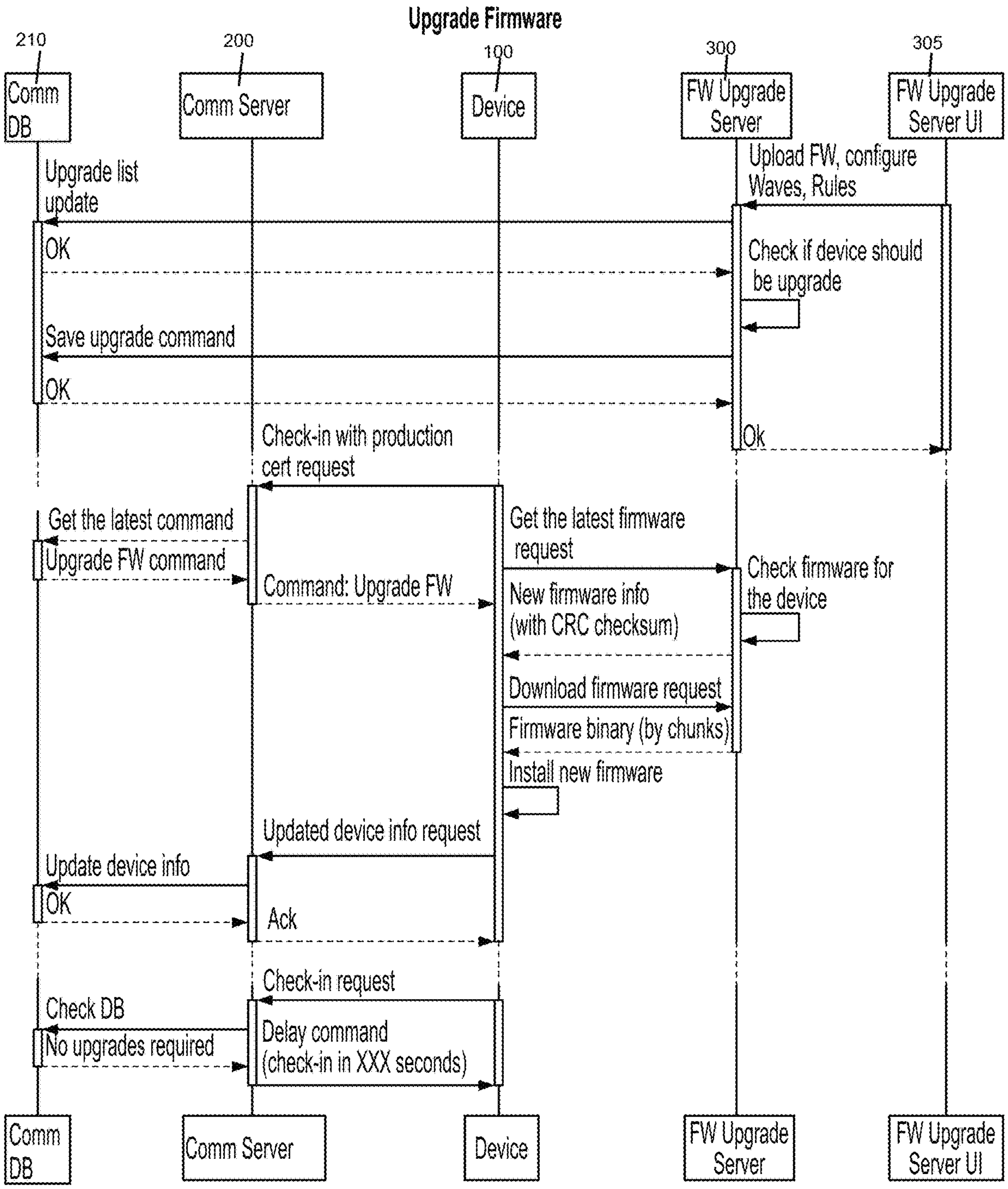
FIG. 16 illustrates an embodiment of the process for upgrading a device's firmware

In an embodiment of the upgrade process, FIG. 16 depicts a sequences of communications between a device 100, the communications server 200, and the upgrade server 300. Specifically, the upgrade server user interface 305 is used to upload new firmware, configure upgrade rules and waves, and these new settings and information are used to configure the upgrade server 300. The upgrade server 300 then updates the communication server's database 210 with the upgrade list. The upgrade server 300 then checks to see if a particular device 100 should be upgraded, and if so, it transmits the upgrade command to the communication server 200. Subsequently, when the device 100 checks in with the communication server 200, the communication server 200 retrieves the latest command and indicates that the device firmware needs to be upgraded. The device 100 then requests from the upgrade server 300 to update the device's firmware. The upgrade server 300 checks the firmware on the device 100 and indicates whether newer firmware is available along with the associated cyclic redundancy check (CRC) checksum. If so, the device 100 requests to download the newer firmware, which is transmitted from the upgrade server 300 to the device 100 in binary formatted chunks. If the CRC checksum for the received firmware binary is correct, the device 100 installs the new firmware and updates its data with the communication server 200. The communication server 200 sends the updated data to its database 210, and acknowledges completion. Subsequently, if the device 100 sends another check-in request, no upgrade required. The communication server 200 then sends a delay command to the device 100 to finish check-in after the delay has lapsed.

In a preferred embodiment, the device 100 automatically checks for any available upgrades from the upgrade server 300 any time it is commanded by the communication server 200 or the communication server is not accessible.

The front-end control panel of the upgrade server preferably provides authorization and authentication via a graphical user interface. Through the control panel, management and audit of the upgrading processes can be accessed by an authorized user. Additionally, the authorized user may use the control panel to create or initiate group, batch, or wave upgrades, including assigning selected devices to different groups, batches, or waves for processing.

In another embodiment, the upgrade server control panel can provide further flexibility when setting up upgrades for devices by creating and customizing upgrade "rules". For example, an upgrade rule may the following attributes, which may be used through filtering or selection to differentiate or group together devices based on one or more of the applied attribute rules:

- Manufacturer—only the Smoke Cells with that manufacturer will be affected by the rule;
- Model—only Smoke Cells with that model will be affected by the rule;
- Version upgrade pattern—the current version of the firmware must match this pattern to be upgraded;
- Version—the target version of the upgrade rule;
- Image type—device specific field, showing types of firmware, e.g. bootloader, radio module, etc.;
- Upgrade wave—the amplitude of the upgrade wave;
- Disabled—flag means that the rule is not working at the moment;
- Spot wave serials—a list of devices in form of their IDs, affected by this rule;
- File ID—an ID of the file containing the firmware;
- Comment—A text comment for the firmware upgrade rule;
- Date—Creation date of the firmware upgrade rule.

Other attributes may also be created and combinations of attributes may be used to select or exclude one or more devices the upgrade process.

In a preferred embodiment, firmware upgrade is performed via standard ping-pong scheme with a separate bootloader, two areas for active and updated firmware, as well as dedicated "NVRAM" area for storing the configuration.

Figure 20:
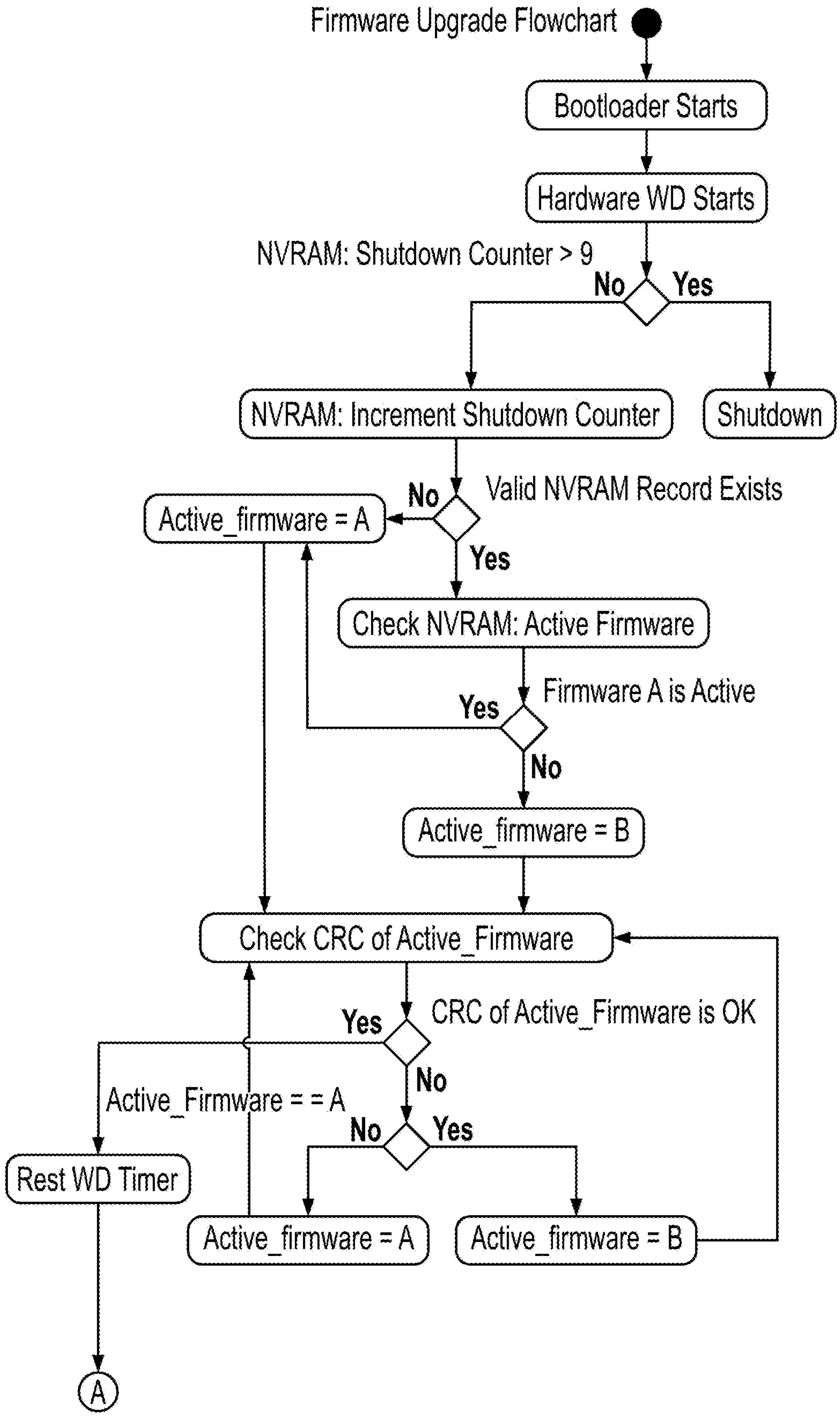
FIG. 20 illustrates an embodiment of the process for firmware upgrade as a flowchart.

In one embodiment, a firmware upgrade flowchart is depicted in FIG. 20, showing the decision tree to check and activate firmware stored on the device's NVRAM. As shown, the device contains two firmware, A and B. The decision tree validates that the CRC is correct for the active firmware. If not, it switches the active firmware to the other stored firmware. Otherwise, a watchdog timer is reset and then the active firmware is set to the other stored firmware.

Figure 21:
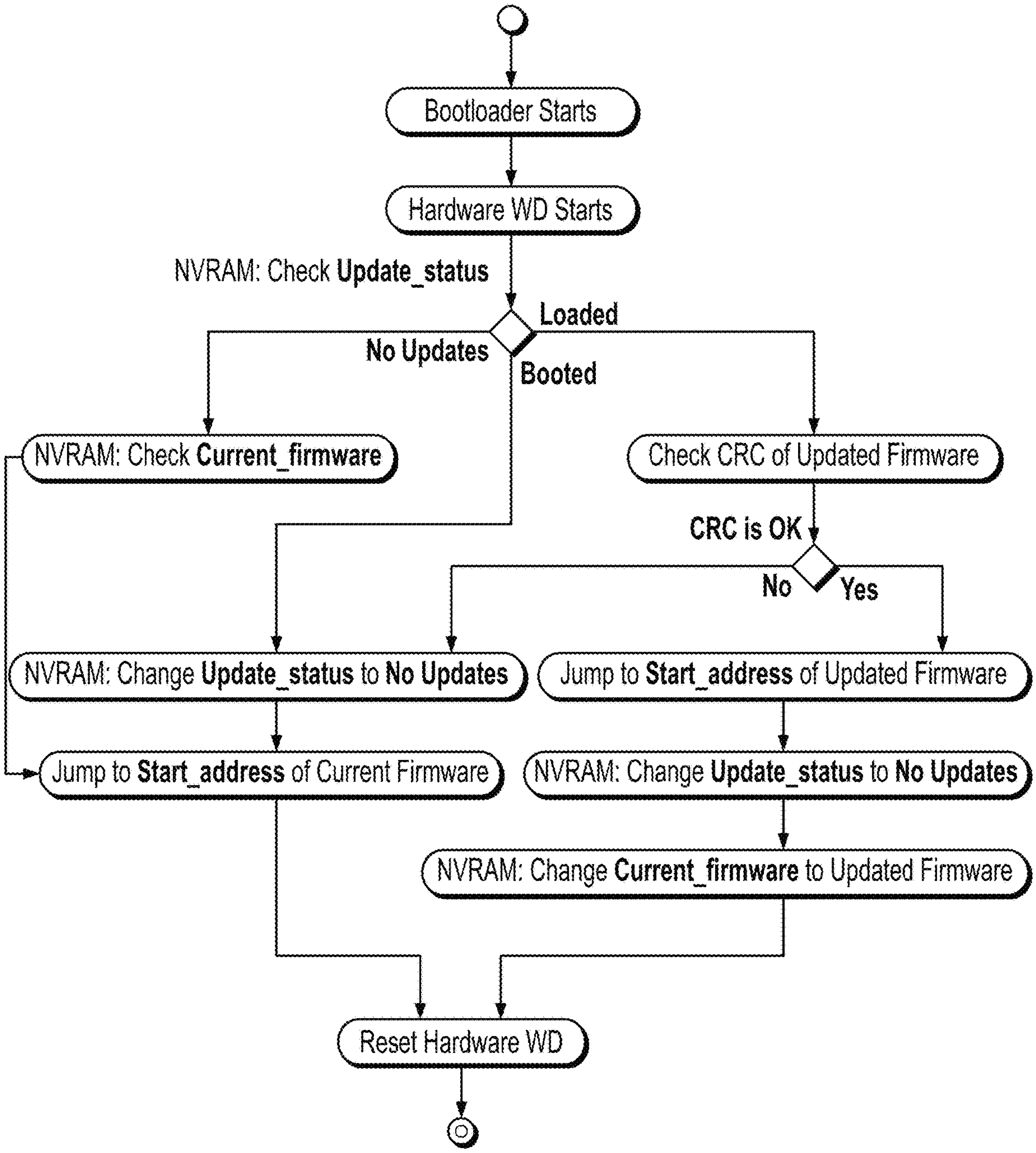
FIG. 21 illustrates an embodiment of the process for simplified firmware upgrade as a flowchart.

Alternatively the firmware upgrade scheme may be reduced by removing "Invalid NVRAM record" protection and Shutdown counter, depending on hardware limitations and required level of reliability. The simplified firmware upgrade flowchart is depicted in FIG. 21.

The second functional area provides sensing and ambient detection through one or more sensors. The second functional area contains at least one MCU that monitors and controls the connected sensors. The Radio MCU sends and receives data from the sensor MCU. For example, the sensor MCU processes sensor information from a carbon monoxide cell, which is preferably located inside the filter mesh 104 to screen out particulate that may result in a false positive. If the carbon monoxide cell detects CO at a level above the predetermined threshold, the event data is transmitted from the sensor MCU to the Radio MCU. The monitored sensors can provide various other detection capabilities, such as sensing temperature, humidity, smoke, or other air contaminants and impurities. Additionally, the sensor MCU may connect to additional sensor devices to add detection of other conditions, such as.

Preferably, the sensor MCU polls and records the status and data of the monitored sensors at periodic intervals, logging the historical values. These values may be stored on local storage media or transmitted via the Radio MCU to a central or cloud server for storage, which can be linked to the associated authorized user account for access or retrieval. The historical log data may be transmitted during the periodic check-in transmission or on a different schedule. The historical log data may also be stored locally for a period of time and provided upon an authorized request or as part of a predetermined response to an event or alarm.

The sensor MCU is programmed to initiate a response algorithm upon the occurrence of an abnormal condition or if a sensor threshold is triggered for any of the connected sensors. The response algorithm typically includes sounding an alarm locally and also transmitting event-related information to the Radio MCU via the SPI interface. The Radio MCU for the Smoke Cell with the alarm or event condition would then wake its associated communications modem and transmit the alarm or event alert to the external system for additional processing. For example, the external system may include a back-end communications server that sends a push notification to the cell phones of any users for the associated account. As discussed below, this additional processing by the external system may also result in requests or commends being sent back to the Smoke Cell detector, which would require additional action at the detector. For example, the external system may also request the Smoke Cell detectors determine whether any devices of associated users are within the proximity of the detectors, which the external system could then send an additional command to sound an alarm on those devices in addition to the push notification (or to escalate the severity or priority of the associated push notification).

In another embodiment, the Radio MCU would also continue communications to receive requests or commands from the external system and to transmit additional sensor data to the external system. The additional sensor data may be a subset of historical data associated with the event or alarm condition, or it may be updated information on the current statuses of sensors in response to a data request from the external system.

Figure 8:
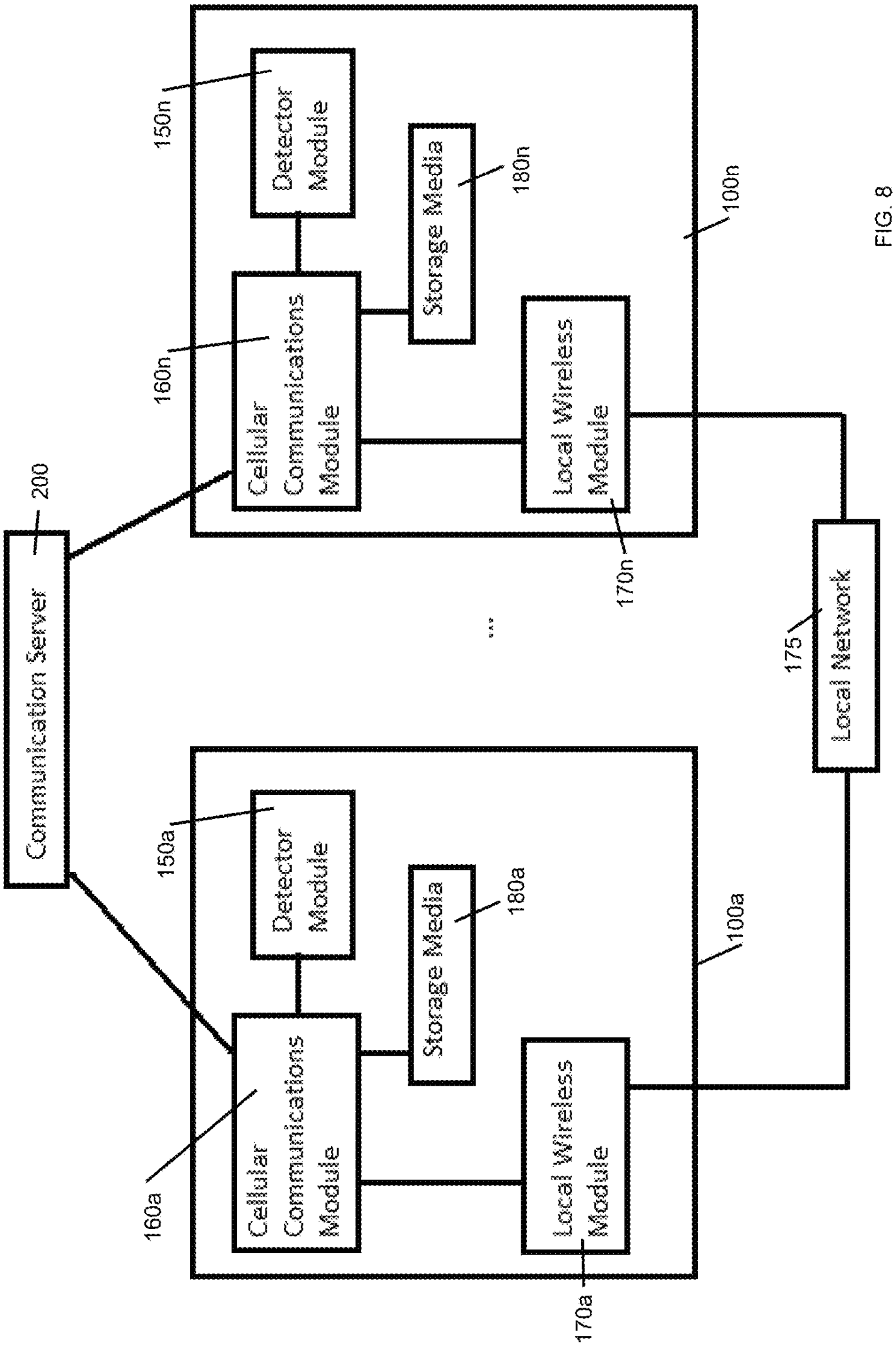
FIG. 8 illustrates an embodiment of the system in the present disclosure including a plurality of Smoke Cell detectors with cellular communications modules to communicate with the communication server and local wireless communication modules to communicate with other connected Smoke Cell detectors.

FIG. 8 further depicts an embodiment of the present disclosure with multiple Smoke Cell detectors 100*a*-100*n*, each having its own detector module 150*a*-150*n* and storage media 180*a*-180*n*, connected via cellular communication modules 160*a*-160*n* to the communications server 200 and further connected to each of the other Smoke Cell detectors via a local wireless communications protocol 170*a*-170*n* and a local network 175.

Figure 9:
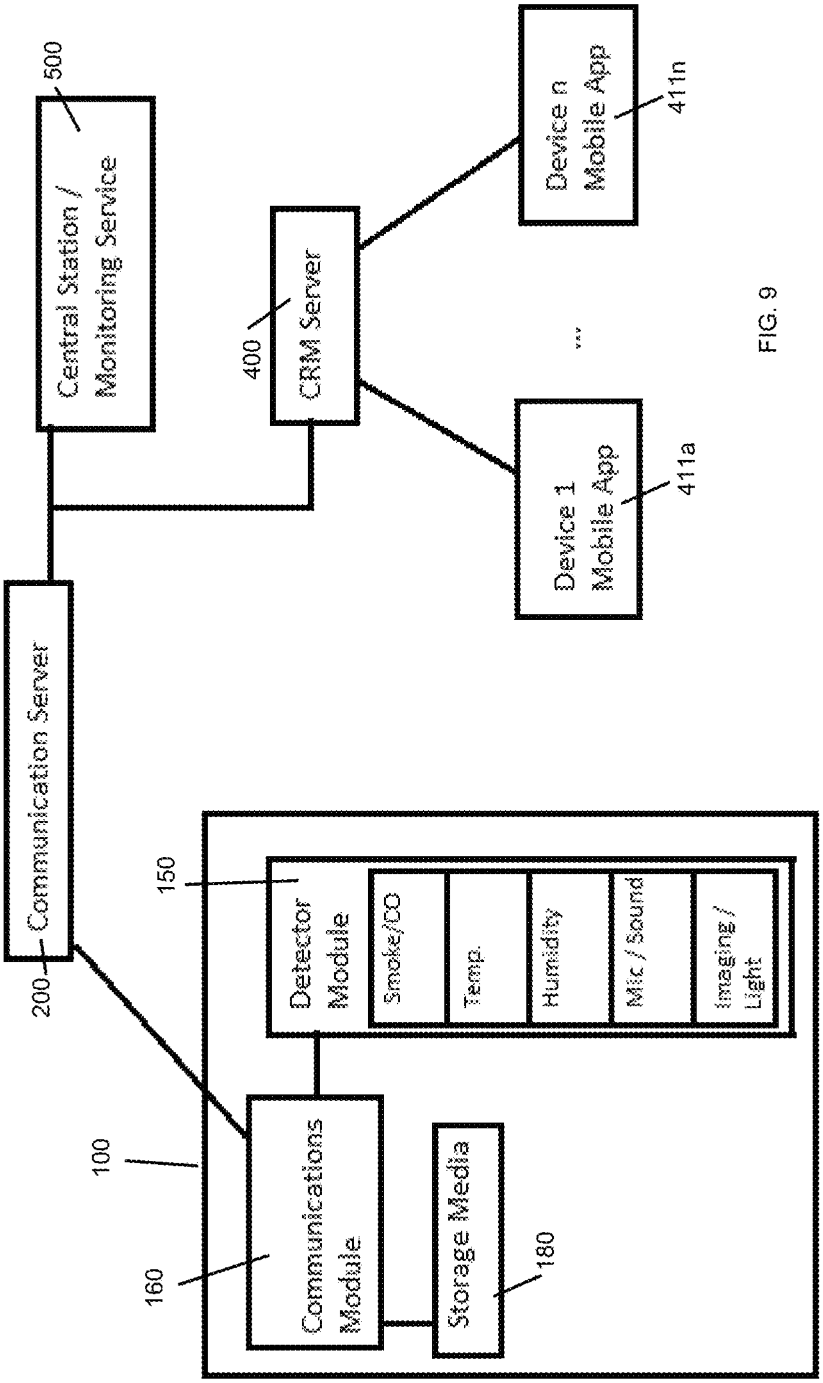
FIG. 9 illustrates an embodiment of the system in the present disclosure having a content and customer relations management (CRM) server to authenticate and manage multiple user devices running mobile applications for interfacing and communicating with the system to receive alarm notifications and interact in response.

FIG. 9 depicts an embodiment of the present disclosure having multiple user devices 411*a*-411*n* connected to the system through a CRM server 400 that authenticates and manages the user's accounts and associated detectors and devices. The CRM further connects with the communication server 200, which communicates with the provisioned Smoke Cell detectors 100. The Smoke Cell detectors 100 contain a wireless communications module 160 for communicating with at least the communication server 200 to send data and to receive operational commands and instructions. The Smoke Cell detectors also contain a detector module 150 that manages and monitors a number of sensors and a storage media for storing data and information regarding the detector and the sensors.

The Smoke Cell detector may also contain predetermined rules and response procedures for various sensor events or combinations of events. For example, in the event of a fire or smoke detection, the Smoke Cell detector could also send a command to nearby Smoke Cell detectors to place them in a different operational state, such as changing the frequency of monitoring of or adjusting the sensitivity thresholds on related sensors. Additionally, the affected Smoke Cell detectors may collectively send their historical log data for a preceding window of time to the external server for backup purposes and if needed for additional processing.

The external communication server is preferably able to control and activate other additional alarm sounders and visual apparatuses during an alarm or event. For example, when an alarm is triggered, other connected devices including strobes and sounders may be also activated via the communication server by sending commands to each additional connected device through the device's associated cellular communication modules. In one embodiment, the additional sounders and visual apparatuses may be connected to a nearby Smoke Cell detector that serves as a controller. The communication server activates the sounders and visual apparatuses by sending the commands to their respective connected Smoke Cell detector, which then activates those devices. Alternatively, the sounders and visual apparatuses may have their own controller that is networked and in communication with either the communication server or the local Smoke Cell detector.

In a preferred embodiment, the communication server is a component of the system that all the Smoke Cell devices must communicate to during their lifecycle. By its design, the communication server is preferably potentially scalable because it does not matter for end devices whether the communication server is actually one single machine or a cluster of machines or instances behind a load balancer. In such an embodiment, the communication server itself is preferably stateless with respect to each request from a device.

In a preferred embodiment, a device cannot communicate to the communication server without a properly signed TLS certificate. In such an embodiment, each device is given a unique certificate with the device ID in its metadata, assuming the device is a properly registered device.

Figure 11:
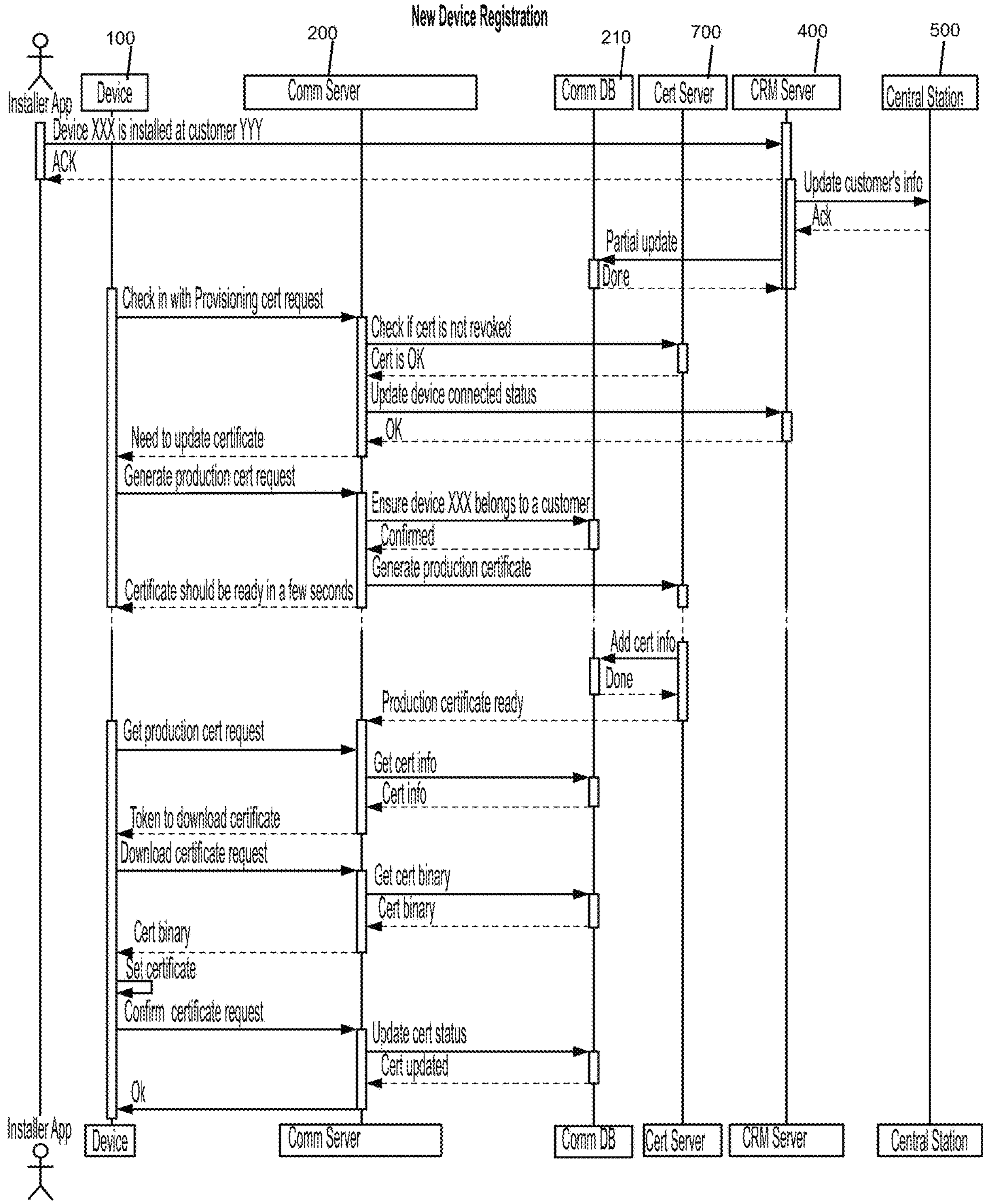
FIG. 11 illustrates an embodiment of the process for new device registration.

In a preferred embodiment, an example of new devices registration is depicted in the procedure flow chart shown in FIG. 11. As shown, the device 100 communicates with the communication server 200, certificates server 700, and CRM server 400 to validate a provisioning certificate, obtain a production certificate, and register the device certificate for the customer. Specifically, the installer application indicates to the CRM server 400 that a device 100 has been installed for a customer. Next, the CRM server 400 updates the customer's information to the central station 500, which sends back an acknowledgement. The CRM server 400 then transmits a partial update to the communication server's database 210 which indicates when the update is done. The new device then sends a provisioning certificate request to the communication server 200 to check in. The communication server 200 verifies with the certificates server that the certificate has not been revoked, which responds that the certificate is still valid or not. If valid, the communication server 200 then sends updated status on connected devices to the CRM server 400 which acknowledges the update. The communication server 200 then indicates to the device that an updated certificate is needed and the device requests to generate a production certificate. The communication server 200 then verifies in its database 210 that the device 100 belongs to an authorized customer, and if confirmed, requests generation of a production certificate from the certificates server 700. The certificates server 700 then adds the new certificate information to the communication server's database 210 and signals the communication server 200 that the certificate is ready. The device 100 then requests to retrieve the production certificate from the communication server 200, which retrieves it from the database 210 and transmits a token to the device 100. The device 100 then requests to download the certificate from the communication server 200, and the communication server 200 retrieves the certificate binary file from the database 210. The communication server 200 then transmits the certificate binary to the device 100, which sets the new certificate and confirms the update to the communication server 200. The communication server 200 them updates its database 210 with the new certificate status and sends an acknowledgement back to the device 100, completing the new device registration.

In another embodiment, devices may be swapped within a deployed system. In such a scenario, a device swapping procedure is performed via a regular communication server database update from the CRM server. Through this procedure, a new device is added and the old device is removed.

However, if connection to the communication server is not possible, a Smoke Cell device will try to upgrade the firmware and fail. When several requests in a row to the communication server have failed (e.g. due to connectivity issue or certificate issue), the device preferably must request a connection to the upgrade server and try to upgrade directly. In such a scenario, the upgrade server preferably does not require a production certificate for the device. Instead, any validly signed certificate may be accepted by the upgrade server. A plurality of acceptable root certificates may be stored remotely for this purpose. In another alternative embodiment, the device may be provided a separate certificate solely for the recovery procedure through the upgrade server.

In a preferred embodiment, if the communication server detects an attempt to use an invalid or revoked certificate, the event is logged. Alternatively, the communication system may also send an alert to the CRM server to provide notification of the improper certificate and to prompt resolution.

In a preferred embodiment, special scripts are used to generate provisioning certificates by the provisioning authority, and the generated certificates are securely delivered to the manufacturer via a secure channel. In such a scenario, the manufacturer preferably also uses special scripts to generate keys during the manufacturing of the PCB for each device in its premise so that the device includes Public/Private keys, server trusted and provisioning certificates, and other metadata at the time of manufacture. Subsequently, the PCB is preferably assembled in the device with the Public/Private keys, server trusted and provisioning certificates, and other metadata that are ideally impossible to change and/or read outside the firmware.

Typically, a Certificate Signing request (CSR) is a block of encoded text that is given to a Certificate Authority when applying for an SSL Certificate. It is usually generated on the server where the certificate will be installed and contains information that will be included in the certificate such as the organization name, common name (domain name), locality, and country. It also contains the public key that will be included in the certificate. A private key is usually created at the same time the CSR is created, making a key pair. A CSR is generally encoded using ASN.1 according to the PKCS #10 specification. A certificate authority typically uses a CSR to create an SSL certificate, but it does not need the private key. The private key may be kept secret as a result. The certificate created with a particular CSR will only work with the private key that was generated with it.

In a preferred embodiment, the CSR for the device production certificate must be generated at the communication server. Alternatively, additional steps may also be taken during manufacturing to securely generate the public/private key combination and CSRs.

In a preferred embodiment, each newly produced Smoke Cell device is provided with a special provisioning certificate. This certificate is preferably used for the initial (1st time) device registration only. During registration of the device, a new production certificate is preferably provided that must be used for all future communication with the communication server.

In one embodiment, the provisioning certificate does not identify the device uniquely. In such a circumstance, the certificate only indicates that the device was issued by a legal supplier. However, a production certificate preferably always identifies a particular device, and the corresponding unique device identifier is preferably stored within the certificate metadata.

The following table indicates an example of the Device Identifier Format FFYYWWTTNNNNNN

| Digits | Example | Definition | Comments |
|---|---|---|---|
| FF | 01 | Factory/Country Code | Assigned to particular factory and country combination. Assigned by Alder |
| YY | 19 | Year | 2019, 2020, etc. |
| WW | 52 | Week | 01 through 52 |
| TT | 01 | Device Type | 00 through 99. SC will be 01 |
| NNNNNN | 123456 | Device Number | Assigned from a factory located server and loaded into units on the factory line |

Each digit is preferably a numeric decimal that is 8 bit encoded ASCII.

The serial number is preferably 14 bytes long. In an alternative embodiment, it may be extended to hex format if needed to increase the number of encoded devices, types or factories.

Accordingly under the foregoing scheme, the maximum weekly production would be capped at 1,000,000 units per week.

In one embodiment, CRC byte(s) are not required. Instead, each transport layer as well as certificate has its own error control. In another embodiment, CRC bytes may be used alongside custom cryptography in place of or in addition to certificates.

In one embodiment, to support the certificate provisioning approach, two additional entities are used. First, a certificate authority is responsible for issuing provisioning and production certificates. Second, a root certificate authority serves as a first level certification authority and issues certificates for all other servers and services in the deployed system.

Figure 14:
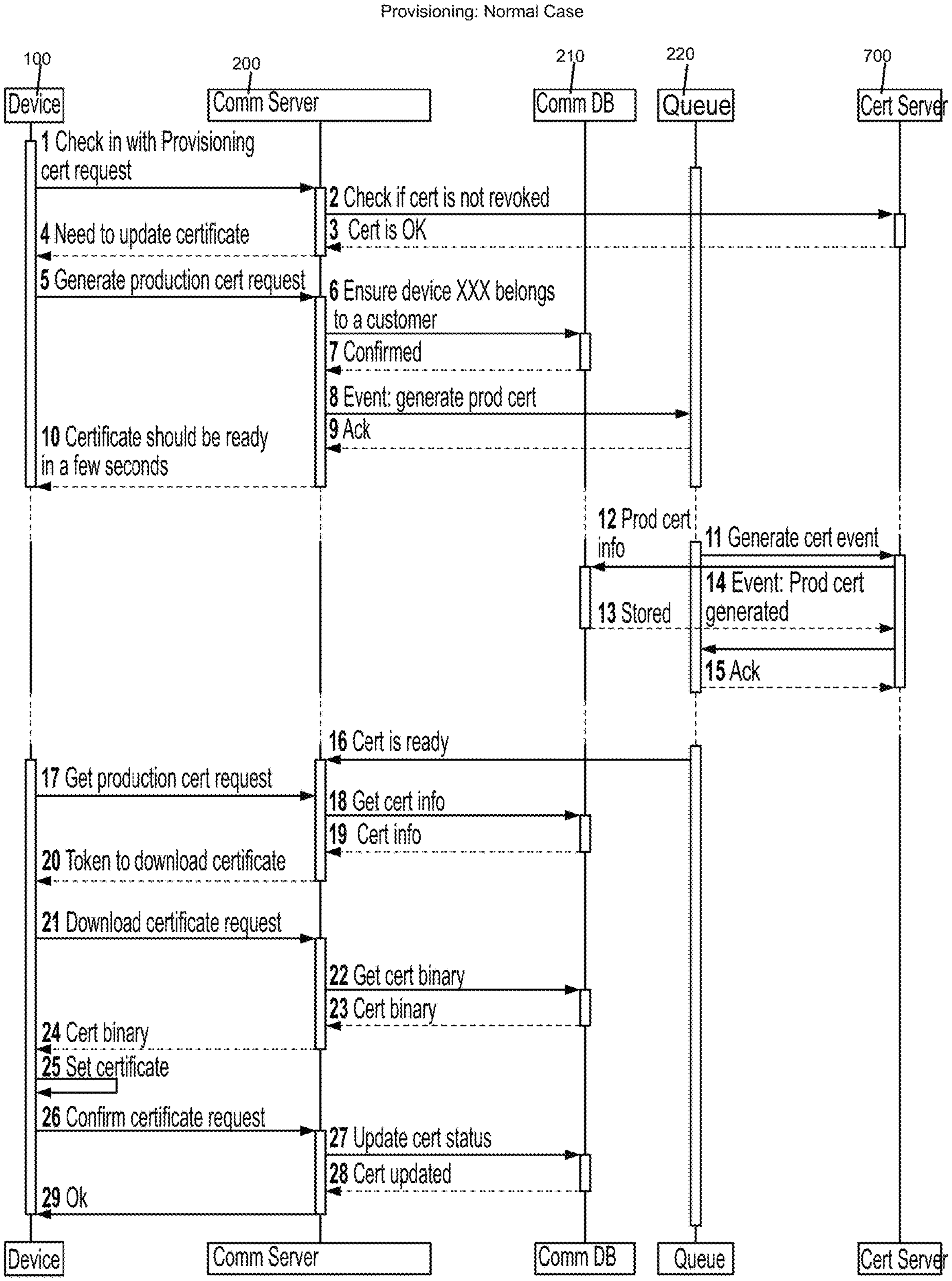
FIG. 14 illustrates an embodiment of the process for provisioning a certificate for a device.

While the root certificate authority is just a private key generator that can be used to manually create certificates for a certificate authority, the upgrade server as well as other servers preferably participate in each Smoke Cell device onboarding and engage in a secure communication handshake. One embodiment of the typical provisioning process is depicted in FIG. 14 with steps 1-29. Specifically, a device 100 initiates a check-in to the communication server 200 with a provisioning certificate. The communication server 200 validates with the certificates server 700 that the certificate has not been revoked. If the certificate is valid, the communication server 200 indicates to the device 100 that an updated certificate is needed. The device 100 then requests generation of a production certificate. The communication server 200 verifies in its database that the device belongs to an authorized customer, and upon confirmation, sends the command to generate a production certificate to the queue 220. The queue 220 subsequently sends the generate certificate event to the certificates server 700, which transmits production certificate information back to the communication server's database 210. Once stored, the certificates server 700 sends notification that the production certificate has been generated to the queue 220. The queue 220 subsequently transmits the ready notification to the communication server 200, and the device 100 thereafter requests to get the certificate. The communication server 200 retrieves certificate information from its database 210 and transmits the token information to download the certificate to the device 100. The device 100 then requests to download the certificate, and the communication server 200 retrieves the certificate binary from its database before sending it to the device 100. The device 100 then sets the new certificate and sends confirmation to the communication server 200. The communication server 200 updates the certificate status in its database 210 and acknowledges completion to the device 100.

In one embodiment, the normal operations handshake is similar to the first steps of provisioning a certificate. The communication server detects that a certificate used by the Smoke Cell device is a production certificate, and it skips provisioning steps.

In case of invalid or revoked certificate, the communication server preferably logs the attempt to a corresponding log service. In one embodiment, an authorized administrator may update the device manually via the upgrade server by disabling certificate check for that particular device.

In one embodiment, the upgrade server contains a separate certificate that is pinned within the Smoke Cell device firmware, meaning the hash of the Public Key is embedded into each and every device firmware. However, a change to the upgrade server requires updating all device firmware.

In an alternative embodiment, a reduced-size certificate authority bundle may be used instead of pinning. However, this approach requires relying on LTE module capabilities of certificate chain verification with given numbers of certificate authorities.

In a preferred embodiment, both provisioning and production certificates have expiration dates (as required by certificate structure). When expired, the certificate preferably cannot be accepted by the communication server during a transport layer security (TLS) handshake and thus no communication is possible.

In a preferred embodiment, a provisioning certificate rotation policy is deployed to so that the provisioning certificate will not expire before an installation happens. For example, the policy can specify that the provisioning certificate is re-generated for every manufacturing batch of the product. Alternatively, other rotation schedules may be deployed to avoid an expired certificate. For example, certificates may be rotated once a month without revocation. Or certificates may be rotated every 1-2 years and are placed on a revocation list. Production certificate rotation may be accomplished using any of the same mechanics as a regular provisioning. In another embodiment, every certificate is considered revocable and must be checked for revocation status each time a device connects to the communication server.

Preferably the system also includes one or more cameras deployed alongside each Smoke Cell detector, which maybe activated or commanded to transmit imaging data during an alarm or event. For example, in the event of an alert based on detected smoke or fire, the processing rule may activate the camera associated with the Smoke Cell detector in the alarm state and obtain one or more images for transmission to the communication server. In one embodiment, the images may be transmitted by the communication server along with the alert notification so that the user may review the images on the client mobile application as part of responding to the notification. Alternatively, the images may be transmitted upon a user request as part of responding to the notification. The images may also be transmitted from the communication server to the Central Station and to emergency responders as part of ascertaining whether the alarm is valid or not.

In another embodiment, the communication server may place the one or more cameras into a transmission state to send video clips or at least periodic images to the server for storage and logging with the alert notification. For example, when one Smoke Cell detector enters an alarm condition, the alert is transmitted to the communication server, which responds by commanding that Smoke Cell detector to activate and transmit imaging data from at least one associated camera. The communication server may also place additional nearby Smoke Cell detectors into a transmission state such that they also activate and transmit imaging data from their respective associated cameras.

In one embodiment, each Smoke Cell detector may contain its own camera module which is controlled by the Smoke Cell detector. Alternatively, the cameras may be part of a security monitoring system with its own controller that is in communication with either a Smoke Cell detector or directly with the communication server. Commands to transmit imaging data from one or more cameras in the security monitoring system may be sent by the communication server, either directly or through the connected Smoke Cell detector. As part of this response step, the communication server would receive the alarm notification from one or more Smoke Cell detectors and compare the location of that detector with nearby security cameras to determine which ones to request imaging data for based on information provided during system setup and provisioning.

Alternatively, the list of cameras in the security system may be part of the alert notification transmitted to the authorized user's client mobile application, providing the user the option to select which cameras to retrieve imaging data. Similar listings of available cameras in the security system may also be provided to the Central Station or to emergency responders for retrieval of current or historical imaging data from one or more of the cameras, which may be used to assist in evaluating the validity of the alarm or in emergency response efforts.

The communication server also provides detector device interconnectivity between non-locally interconnected detectors and even between non-connected systems. An alarm event in one system may be relevant to the monitoring and readiness of adjacent systems. The present disclosures provide the capability to extend notifications and signaling from one system to other nearby systems via the communication server without setting up any direct connections or communications systems. For example, in areas with buildings in close physical proximity that are operated by different users, a fire event or other emergency may apply to multiple buildings due to the geographical proximity. Even though adjacent building systems may not have detected any alarm conditions, an alarm event could be preemptively initiated by the communication server, by the Central Station monitoring all of the systems, or by emergency responders assessing the situation. By way of example, a fire may be at risk of spreading beyond the building in question, so emergency responders could initiate a fire alarm on adjacent buildings to start the evacuation process early, without needing to wait or task manpower to conducting the evacuation. Similarly, for an emergency event requiring persons to shelter in place within a geographical range, an alert notification may be initiated by the Central Station or emergency responders for affected buildings quickly and efficiently without needing to detect any alarm conditions in each building.

In another embodiment, the communication server may also be programmed to transmit alert notifications directly to the location of nearby emergency responders without the requirement to connect through dispatch. Preferably, the communication server maintains a list of the closest emergency responders to contact directly, which may be updated in real-time based on staffing and call load data for emergency responders.

In another embodiment, upon triggering certain alarm or event conditions, the alert would be transmitted to an external communication system, and the response profile may require an opportunity for user input before proceeding. For example, the alarm signal would similarly result in a push notification from the communication server to the associated user's device or devices, such as a cellular phone or tablet. The notification would them prompt the user to select whether to cancel the alarm within a predetermined window of time (e.g., 30 seconds). If the user fails to respond or selects that the alarm should not be cancelled, the communications server would then relay the alarm signal to a central station for dispatching emergency response services.

In another alternative embodiment of the Smoke Cell detector, one or more of the plurality of functional areas may be contained in physical modules that may be swapped out or replaced in the Smoke Cell detector as needed. For example, the detector functional area may require an additional or specific set of detectors, and the module may be replaced to customize the Smoke Cell detector. Changes to the communications protocol may also require or at least benefit from different hardware upgrades, and that module may be switched out as well to improve the Smoke Cell detector. Preferably, the Smoke Cell detector contains stored unique identifiers, tokens or other authorization data that persist so that the detector may be upgraded in firmware, software, or hardware, may be relocated to a new position, or may temporarily lose power or connectivity without needing to be redeployed or provisioned again. This information may be contained in another module or in storage media attached to the Smoke Cell detector.

Preferably each connected detector is a Smoke Cell detector that contains a cellular communications module. Alternatively, additional detector modules may be used which communicate directly with a nearby Smoke Cell detector, such as through a wired connection. The Smoke Cell detector would then monitor and transmit any data or notifications for itself and the other connected detector modules.

Additionally, in the event of an alarm, the system identifies the account and authorized user devices associated with the Smoke Cell detector that is in an alarm state, and it compares the last received GPS location data of those user devices with the location of the Smoke Cell detector to identify which ones are within proximity of the alarm event.

When the Smoke Cell detector detects either smoke or carbon monoxide it sends a signal to the communications server via an embedded cell module in the detector. The communications server then requests the GPS location of all user device (e.g., smart phones) that are connected to the sounding Smoke Cell detector, which is relayed to the communication server. This information will be used in the following scenarios:

1) Only produce a T-3 or T-4 cadence on the user devices that are located at the address where the alarming Smoke Cell detector was installed.
2) Provide 911 and first responders with this information to help them determine if anyone may be located in the residence where smoke or carbon monoxide are detected based on the user device's location.

The user device's GPS location may also be obtained upon request through application programming interface (API) integration with third party device manufacturers (e.g., Apple, Android, Google and other cell phone manufacturers).

Alternatively, the Smoke Cells can contain a user device detecting module which is also capable of detecting the presence of nearby devices, such as those of an authorized user. In one embodiment, the device detecting module operates on one or more local or near-field communication protocols to periodically scan for any devices that are in range and broadcasting on that protocol. The device detecting module preferably then screens the detected devices against a list of known devices or device types to flag devices that may be associated with a person or exclude devices that are known to be stationary or unassociated. For example, the device detecting module may scan for any active, broadcasting Bluetooth devices to determine if any are potentially associated with a person. The device detecting module may then screen against a list of known stationary Bluetooth devices, such as radios, PCs, or TVs, which are broadcasting but not indicative of the presence of a person. The device detecting module may also compare with a list of devices or device types that are known to be associated with a person, such as a user's personal phone or any cellular phones in general.

Alternatively, the Smoke Cells detectors may contain a microphone that is activated whenever any of the connected Smoke Cells detectors transmits an alarm or event alert to the communication server. The communication server then pushes an alarm notification to each authorized user device for the associated account, which is intended to sound a particular sequence or tone over each device. The connected Smoke Cell detectors all listen for the same alarm notification sound and if the sound pattern is detected by the microphone for any of the Smoke Cell detectors, the system notes the presence of at least one user device in the vicinity of that Smoke Cell detector.

In another embodiment, the Smoke Cell detectors may contain a microphone that monitors for the presence of one or more sound patterns or sound profiles. In one embodiment, the sound patterns or sound profiles may be stored in the form of data files on the Smoke Cell detectors. Alternatively, the sound pattern or profile may be stored on a remote server that receives data from the Smoke Cell regarding a detected sound, and the remote server analyzes the detected sound to check for a match in one or more of the audio pattern, frequency, decibel, or any characteristic of a sound wave. Additionally, the presence of a sound pattern or profile may be determined through one or more hardware audio filters or frequency analyzers. A combination of stored patterns or profiles with hardware or software filtering and frequency analysis may also be utilized to detect the presence of an audible sound satisfying one or more aspects.

For example, in one embodiment, the system may monitor for one of a number of predetermined sounds such as a user-defined emergency phrase, glass break, gunshots, or other unconnected third party devices' registered alarm sounds (e.g. car alarms, safes, other security systems or devices, etc.). If such a predetermined sound is identified, the system may further generate an alert or notification based upon that identification or may trigger additional monitoring or processing of sensors to confirm the validity of the identified event.

In another embodiment, the Smoke Cell is capable of monitoring a plurality of different conditions and contains one or more profiles based on the presence or absence of those one or more conditions. Preferably, these profiles may be programmed or customized to adjust sensitivity, account for environmental conditions to be ignored, and/or to address new concerns or considerations. The profiles may also be supplied to or updated in the Smoke Cell from a remote database or server. Alternatively, as part of the programming or customization, preset profiles may be selected to be activated or deactivated for each Smoke Cell. Additionally, a programmable schedule may be applied to the activation/deactivation of profiles to further adjust for known or expected environmental conditions and scenarios.

For example, the Smoke Cell may detect the presence of carbon monoxide, indicating a fire may be present somewhere in the vicinity of the Smoke Cell. However, if the Smoke Cell also detects the presence of fluctuating lighting levels as well as the presence of carbon monoxide, this may indicate the presence of fire in the visual proximity of the Smoke Cell and trigger a different reporting condition. Additionally, if the Smoke Cell also detects the presence of a user's mobile device, an additional or different reporting condition may be triggered.

Figure 12:
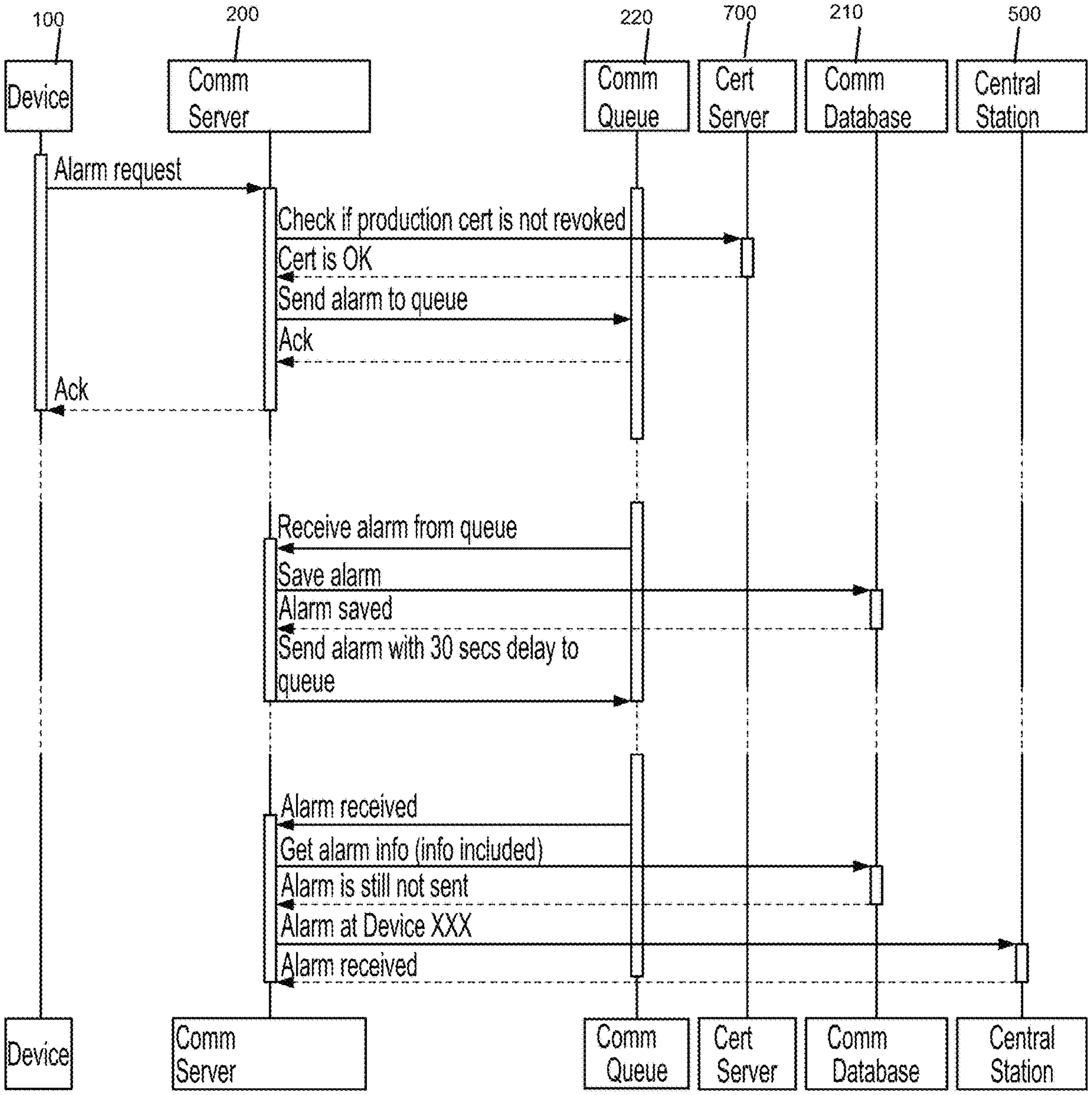
FIG. 12 illustrates an embodiment of the process for alarm reporting from a device to the communication server and the central station.

In another embodiment, an example process for alarm reporting is depicted in FIG. 12. As shown, the device communicates with the communication server 200 and the certificates server 700 to validate the device certificate and report an associated alarm state. Specifically, the device 100 first sends an alarm notice to the communication server 200. The communication server 200 then validates with the certificates server that the device's certificate is not revoked. If the certification is valid, the alarm notification is sent to the communication server's queue 220. Thereafter, the queue 220 transmits the alarm back to the communication server 200, which saves the alarm information in its database 210. The communication server 200 then resends the alarm to the queue 220, this time with a 30 second delay. The queue 220 indicates receipt of the alarm to the communication server 200, and the communication server 200 then sends alarm info and central station info to its database 210. Then the communication server transmits notification that an alarm is at the device to the central station 500, which acknowledges receipt of the alarm.

The Smoke Cell's RFBA module can report its sensor and status data to the cloud-based services, for example on a periodic basis or upon a triggering condition or event. Preferably, the Smoke Cell's reporting conditions are associated with the activated profiles, providing data in relation to the profile's monitored aspects. For example, if the activated profile detects for abnormal temperature variations, the Smoke Cell may report at periodic intervals the ambient measured temperature so as to build a historical record that can be retrieved or viewed by the user. Additionally, the Smoke Cell may compile and report periodically (e.g., daily, hourly etc.) all or a subset selection of various sensor data, providing snapshots or overviews of overall sensor status. Significant deviations outside of a predetermined range may also trigger a notification to be pushed to the cloud-based service or to nearby connected user devices. If the activated profile detects for a dangerous condition, such as the presence of fire, smoke or natural gas, notifications may also be generated and pushed to the cloud-based service and to emergency responders. The Smoke Cell can also log certain selected conditions or events, creating running compilations that can be retrieved on demand by the communication server. Preferably, the RFBA module reports to the cloud-based service via a wireless transceiver, such as a CAT M1 LTE modem.

In one embodiment, the RFBA comprises a smoke alarm communication module that sends alarms and other data to the communication server. Preferably, the RFBA module is in communication with one or more alarm sensors and handles cellular communications between the alarm sensors and the communication server. The transmitted alarms and data may include alarm status messages (alarm condition or detection of smoke, excess heat or cold, CO, fault, low battery, tampering) as well as overall condition data (test state, fault detection, general status, sensitivity levels). Additional detected data may be transmitted to or requested by user devices via connected mobile applications (e.g., current temperature or humidity levels).

The RFBA module can also receive remote commands and settings updates from the communication server. For example, the activated profiles and settings of the Smoke Cell can be updated by the communication server. Additionally, the firmware of the Smoke Cell can be upgraded from updates pushed from the communication server. Alternatively, an authorized user can remotely adjust one or more monitoring parameters using a connected mobile device. Preferably the RFBA module also handles generation and rotation of security certificates.

The mobile application also provides authentication information to verify that the user is authorized to access or interact with the system. In one embodiment, various user authorization levels and profiles may be implemented, providing certain users full access to the system's settings and sensors, versus limited access for other users. For example, administrative level users may need the ability to access and control any available aspect of the system, but other roles may only require monitoring current alarm statuses without the ability to modify any settings. Alternatively, the limited roles may only have privileges to access certain settings.

Additionally, in another embodiment, an authorized user can use a connected mobile application to manage the handling of triggered alarms. The mobile application is used to handle user account/devices and to handle triggered alarms (cancel/send immediately/call 911). For example, the mobile application may provide an interface for the user to set up the notification timing and process, including selecting the response options and delays for each potential triggered alarm. For certain triggered alarms, the system may need to contact emergency responders such as 911, and the timing of that automated contact may be selected to be immediate, dependent upon user input, and/or after a predefined delay has lapsed. In one embodiment, connected user devices receive notification of the triggered alarm along with an interface to select options to cancel/forward/respond to the triggered alarm. Depending on the alarm, there may be need for an adjustment of system settings or sensors, and the user may be provided an interface with those adjustment options to directly update or verify the Smoke Cell settings and reset the alarm status.

In one embodiment, the communication server manages received alarms and other reported events received from one or more of the RFBA devices. The communication server establishes communication with each of the Smoke Cells, as well as with backend CRM and the central operations station. In order to timely process alarms and send for emergency responders if necessary, the RFBA module sends one or more alarms to the communication server to process and sends to authorized client mobile applications if needed. If user feedback is permitted or desired, the end-user has the ability to respond to an alarm in the client mobile application (such as canceling the alarm, sending it to the central operations station immediately, or even initiating a call to 911 or other emergency responders). The system may use third party software (e.g., RapidSoS) to enable the user to push any alarm information directly into the 911 system for a confirmed alarm. This allows the user to skip the alarm monitoring service at the central station and speeds dispatch times for user-confirmed emergencies.

In the event an alarm is not processed by the user within some predetermined period of time (e.g., 30 seconds by default), then the communication server automatically proceeds with forwarding the alarm to the central operations station. The central operations station then verifies the alarm condition and notifies emergency services if needed.

In another embodiment, when the Smoke Cell detector detects either smoke or carbon monoxide it sends a signal to the communications server via an embedded cell module in the detector. The communications server then pushes this information to the client mobile application on any user devices that have been registered to the same account as the activated Smoke Cell detector. The client mobile application then uses the device's speaker to sound the universally recognized T-3 (for smoke) or T-4 (for carbon monoxide) loudly. The client mobile application displays a push notification showing which Smoke Cell detector has detected the hazard. The speaker on the user device will continue to sound until either 1) the hazard is removed from the sounding Smoke Cell detectors environment and an alarm cancellation signal is sent from the communication server to the client mobile application or 2) the authorized user goes through a two-step verification process on the client mobile application that confirms that they would like to stop the sounder on their smart phone. The client mobile application can also use geo-location to determine whether to turn on the smoke alarm cadence. For example, if the user device is not located within a predetermined range of the Smoke Cell detector (e.g., 1 mile), then the alarm would be a normal notification message. If the user device is located within a mile of the Smoke Cell detector, the appropriate sounder cadence would be initiated.

Additionally, the client mobile application is sent notification of an alarm with an opportunity to respond. The different user interaction processes are illustrated in the process flow examples below:

(a) User cancels alarm
- Smoke Cell initiates an alarm
- RFBA sends the alarm to the communication server
- The communication server stores the alarm data and sends push-notifications to the Client Mobile Application, scheduling a 30 seconds trigger to handle any unprocessed alarms
- The Client Mobile Application shows the alarm notification
- The authorized user opens the alarm screen and presses the "Cancel" button
- The Client Mobile Application sends a command to cancel alarm to the CRM server
- The CRM server then checks the command and the associated account and devices for the Client Mobile Application and forwards the command to the communications server
- The communications server then cancels the alarm, updates its status in storage, and removes the scheduled alarm trigger
- Alarm handling is finished (b) User sends it to Central Station immediately
- Smoke Cell initiates an alarm
- RFBA sends the alarm to the communication server
- The communication server stores the alarm data and sends push-notifications to the Client Mobile Application, scheduling a 30 seconds trigger to handle any unprocessed alarms
- The Client Mobile Application shows the alarm notification
- The authorized user opens the alarm screen and presses the "Send Help Immediately" button
- The Client Mobile Application sends a command to send the alarm immediately to the Central Station to the CRM server
- The CRM server then checks the command and the associated account and devices for the Client Mobile Application and forwards the command to the communications server
- The communications server sends the alarm to the Central Station for further processing, updates its status in storage, and removes the scheduled trigger Alarm handling is finished (c) The Alarm is not processed within the 30 seconds interval Smoke Cell initiates an alarm RFBA sends the alarm to the communication server The communication server stores the alarm data and sends push-notifications to the Client Mobile Application, scheduling a 30 seconds trigger to handle any unprocessed alarms The Client Mobile Application shows the alarm notification The 30 seconds interval ends with no response or selection from the Client Mobile Application The communication server checks the alarm status and sends the alarm to the Central Station, updating its status in storage Alarm handling is finished In some embodiments, the RFBA devices and communication server share alarm information, various system status indicators, and system/user related information, providing reporting of alarms and status messages to the central operations station. The reporting to the central operations station may contain the triggered alarm or event, associated sensor readings and related status indicators, and related user activity logs. Additionally, follow up information requests may be sent to the communication server, which then extracts the data from its own storage or retrieves it from the RFBA device before sending in response to the request. For example, in the event of a triggered smoke alarm, the RFBA device may initially transmit the sensor alarm data along with whether the presence of a connected user mobile device has been detected in its proximity. The communication server may poll neighboring devices to the device that is in the alarm state for similar sensor data or may retrieve additional data of other sensors in the Smoke Cell. Additionally, the communication server may receive requests from the central operations station or the user mobile application to retrieve additional specific data from the system. Further, a request may be provided to refresh or update all of the retrieved sensor and system data, for example to determine if any detected conditions have changed, if additional sensors have subsequently triggered, or if the status is still the same as the last report. The refresh or update requests may be automated or provided on demand from the central operations station or user.

In a preferred embodiment, the messaging data used by all of the connected devices and systems conforms to a JSON-formatted payload. Firmware updates may be formatted differently, depending on the requirements of the underlying hardware and the delivery protocol to receive and apply the update. Additionally, the firmware binary file may need to be downloaded in chunks, checking the CRC checksum to ensure the entire file is not corrupted or incomplete. Preferably, each device may control the size of each data chunk based on its settings and parameters.

In one embodiment, the system may be designed to restrict or limit the available situations for communicating with the communications server. For example, a device may only be able to initiate a limited selection of communications with the communication server or in a select number of situations, such as:

The new device wants to register (Note: the registration procedure is asynchronous). The registered device sends "check in" request.

The registered device sends its logs (this happens when the communication server requests for logs).

The registered device reports an alarm or supervisory event such as low battery, tamper, system malfunction, sensor error/failure etc.

Device requests for a firmware upgrade.

Device sends collected sensor data (it collects that data once per hour and sends once a day to the communication server in one bulk package).

Device has to update its production certificate (Note: that procedure is asynchronous).

Device has to update its settings (the communication server initiates that procedure via command)

Device has to send device info to the communication server (the communication server initiates that procedure via command)

Table of Example Commands between a Smoke Cell Device and the Communication Server.

| Endpoint | HTTP Method | Description | Success Response |
| --- | --- | --- | --- |
| /check-in | POST | As Smoke Cell device is the only initiator of communication between itself and the communications server, the firmware upgrade server and any other relevant services this command is a standard start of the data or commands exchange. E.g. provisioning starts with this command and when the communication server detects provisioning certificate it initiates provisioning procedure. Similar scheme works for certificate rotation. Payload typically includes device ID, firmware version, hardware version, LTE software/hardware version, flag indicating critical issues in logs | The request is accepted. In case of any other response code the device must repeat the request. |
| /alarm | POST | The request must be sent when a heat or smoke alarm is identified by the device and in case of the alarm restoral ("disalarm"). The fact whether the alarm has just identified or has it been restored is exposed within the JSON payload of this request | Alarm signal is accepted. In case of any other response code the device must repeat the request |

-continued

| Endpoint | HTTP Method | Description | Success Response |
|---|---|---|---|
| /logs | POST | By using this call the device can send the logs to communication server. The transfer encoding must be defined separately | HTTP 200 - The logs were received. In case of any other HTTP code the device must not repeat the request |
| /settings | GET | By using this call the device can get the settings from the communication server | Device settings is returned |
| /settings/confirm | POST | By using this call the device can confirm that it updates its settings | Confirmed |
| /device-info | POST | By using this call the device can send information about it (firmware versions, list of modules) to the communication server. | Device info was received |
| /certificate | POST | By using this call the device can start certificate generation process | Server started production certificate generation |
| /certificate | GET | By using this call the device can get information about generation certificate | Certificate is already generated, returned info the download the new certificate to the device |
| /certificate/download/{token} | GET | By using this call the device can download the generated certificate | Certificate downloaded |
| /certificate/confirm | POST | By using this call the device can confirm that it installs the new certificate | Certificate was installed, old certificate is revoked. |
| /data | POST | By using this call the device can send collected sensor data to the communication server | The sensor data was received |

In one embodiment, all commands except downloading certificate and uploading logs are in JSON format. Additionally, any commands may be responded to with a 200 HTTP code both in case of success and error. In the event of an error, the server may additionally respond with a JSON containing the errorCode integer field that represents the specific error.

Table of Example Commands between the CRM server and the Communication Server.

| Endpoint | HTTP Method | Description | Success Response |
|---|---|---|---|
| /devices | POST | By using this call the CRM can create a new device in the communication server | Device was added. |
| /devices/{id} | PUT | By using this call the CRM can update device in the communication server | Device was updated |
| /devices/{id} | DELETE | By using this call the CRM can delete device in the communication server. Device should be removed from the communication server DB | Device was removed. |
| /accounts | POST | By using this call the CRM can create a new account in the communication server | Account was added. |
| /accounts/{id} | PUT | By using this call the CRM can update account in the communication server | Account was updated. |
| /accounts/{id} | DELETE | By using this call the CRM can remove account in the communication server. All dependent entities like device should be also removed from the communication server DB. | Account and all dependent entities were removed. |
| /accounts/{id}/alarms | GET | By using this call the CRM can get all active alarms for the account | List of active alarms returned. |

-continued

| Endpoint | HTTP Method | Description | Success Response |
|---|---|---|---|
| /alarms/{id} | GET | By using this call the CRM can get information about alarm by its id | Alarm info returned. |
| /alarms/{id}/command | POST | By using this call the CRM can initiate a command for the alarm (send immediately or cancel). | Command processed. |

In an embodiment, the foregoing commands are in JSON format. In case of an error, the server can respond with JSON containing the errorCode, message fields that represent the error, and a corresponding HTTP status code (400, 401, etc.).

Additionally, in an embodiment, any of the requests above can only be sent by or through the CRM Server. Other connected devices or applications may need to transmit such requests, but the system can restrict the process to require use of the CRM server, for example to ensure user authentication and privileges. Any of the requests would preferably also use HTTPS protocol and valid client certificates to reach the communication server. In addition, a valid JSON Web Token (JWT) bearer token can also be provided for authorization.

In another embodiment, the communication server separately logs all communications with any external services (such as the CRM, the Central Station, the firmware upgrade server, etc.). Preferably, the logs would be organized by data fields and attributes to log and cover all the critical decisions made, permitting subsequent inspection of what happened in the system and why at any particular point in time.

In a preferred embodiment, the logs generated by the communication server would be sent to and stored in a separate logging server, which would index the log entries with a UTC time stamp to permit reporting, querying and filtering by an authorized user.

In one embodiment, each log would also be marked with a severity level as follows:

| # | Level | Description |
|---|---|---|
| 1. | ERROR | The log entiy signifies that an unexpected error has been encountered. |
| 2. | WARN | This level means that irregular circumstances have been encountered but the software hasa clearly defined recovery strategy which doesn't imply system availability or performance. |
| 3. | INFO | The log entry describes a decision within the normal conditions the software makes or normal events appeared at the reporting side. |
| 4. | DEBUG | The log entry brings some coarse diagnostic information mostly addressed to the software developers rather than the system users or administrators. |
| 5. | TRACE | The log entry brings highly verbose diagnostic information about the implementationdetails of the software. |

Additionally, in one embodiment, each log entry would contain the following fields:

Time and date in the form of a timestamp with millisecond precision;

Log message;

Thread name that issued the log entry;

Class and package information to identify the subsystem which issued the log entry;

Node name or any other suitable identifier of the machine which issued the log entry.

The log message may also include the correlation identifier for a device if the certain log entry is connected anyhow to processing a request from that particular device. An example of a correlation identifier to be included would be [correlationId=ee94b39b-7ff3-4cc7-a5e7-510dd990-ea04] where ee94b39b-7ff3-4cc7-a5e7-510dd990ea04 represents the unique request identifier value.

Table of Example Commands between the device and the upgrade server.

| Endpoint | HTTP Method | Description | Success Response |
|---|---|---|---|
| /firmware/{deviceId} | GET | By using this call the device can get firmware upgrade info if device should be upgraded | Firmware upgrade info sent to the device |
| /firmware/download/{fileId} | POST | By using this call the device can download needed firmware file by chunks. | Firmware chunk sent to the device |

In one embodiment, all commands except downloading certificate and uploading logs are in JSON format. Additionally, any commands may be responded to with a 200 HTTP code both in case of success and error. In the event of an error, the server may additionally respond with a JSON containing the errorCode integer field that represents the specific error. Additionally, in an embodiment, any of the requests above can only be sent by or through the Smoke Cell device.

In another embodiment, the upgrade server separately logs all communications with any connected devices or parts of the system, as well as any changes or updates to any upgrade rules or settings, such as the change history, when it was made and by whom. Preferably, the logs would be organized by data fields and attributes to log and cover all the critical decisions made, permitting subsequent inspection of what happened in the system and why at any particular point in time.

In a preferred embodiment, the logs generated by the upgrade server would be sent to and stored in a separate logging server, which would index the log entries with a UTC time stamp to permit reporting, querying and filtering by an authorized user.

In one embodiment, each log would also be marked with a severity level as follows:

| # | Level | Description |
|---|---|---|
| 1. | ERROR | The log entiy signifies that an unexpected error has been encountered. |
| 2. | WARN | This level means that irregular circumstances have been encountered but the software hasa clearly defined recovery strategy which doesn't imply system availability or performance. |
| 3. | INFO | The log entry describes a decision within the normal conditions the software makes or normal events appeared at the reporting side. |
| 4. | DEBUG | The log entry brings some coarse diagnostic information mostly addressed to the software developers rather than the system users or administrators. |
| 5. | TRACE | The log entry brings highly verbose diagnostic information about the implementationdetails of the software. |

Additionally, in an embodiment, each log entry would contain the following fields:

Time and date in the form of a timestamp with millisecond precision;

Log message;

Thread name that issued the log entry;

Class and package information to identify the subsystem which issued the log entry;

Node name or any other suitable identifier of the machine which issued the log entry.

The log message may also include the correlation identifier for a device if the certain log entry is connected anyhow to processing a request from that particular device. An example of a correlation identifier to be included would be [correlationId=ee94b39b-7ff3-4cc7-a5e7-510dd990ea04] where ee94b39b-7ff3-4cc7-a5e7-510dd990ea04 represents the unique request identifier value.

In another embodiment, the upgrade server may utilize the Firmware Over the Air (FOTA) Server Protocol/Specification in order to upgrade the LTE Module if the cellular network does not or cannot provide such upgrading service at any time.

In one embodiment, the communication server's interactions with the central station are limited to only two situations:

A device has just signaled an alarm.

A device has just signaled a restoral of a previous alarm.

Additionally, in an embodiment, the communication server uses Simple Object Access Protocol (SOAP) to interact with the central station to send a "receive Alarm" message. In an embodiment, the system may restrict the communication server to only interacting with the central station to through such a message.

In an embodiment, the following excerpt describes the API protocol used to communicate with the central station:

Parameters:

alarmXML: (xml packet) (required)

Returns an XML Formatted String

A typical alarmXML Packet looks like this:

```
<alarm>
  <csAccountNumber>C00258814</csAccountNumber>
  <zone>1301000</zone>
```

-continued

```
  <verificationUrl>Optional URL for images/video</verificationUrl>
</alarm>
```

The csAccountNumber is the Central Station account Number, which is assigned by us.

The zone format is as follows:

First position is the signal type, a 1 or a 3 (1 is an alarm and a 3 is a restore) The next 3 characters are the alarm code.

The last 3 characters are the alarm zone.

```
<response>
  <code>200</code>
  <referenceID>1291648702854</referenceID>
  <message>12/06/2010 10:18:22 Eastern : Alarm received and saved
for automation</message>
  </response>
```

A code 200 means the alarm was received successfully without error. A code 500 indicates an error has occurred and the error message is included in the messagesection of the response.

In another embodiment, the communication server must convert (map) the device ID that initiated the request to the correct pair <AccountID, ZoneID>, which may be required by the receiveAlarm central station message. Such a conversion would be done by utilizing the database associated with the communications server.

In another embodiment, the central station is generally assumed to be highly available and reliable. However, in case of any communication issue with the central station, the communication server would log any errors with an error severity and all the necessary explanations so that the problem can be identified and investigated afterwards by technical support personnel.

The following are examples of Alarm Codes that can be mapped in the messaging from the communication server, based on a generic contact ID/CID template:

| Alarm | Code |
|---|---|
| Smoke Alarm | 111 (Fire/Smoke) |
| Heat Alarm | 114 (Fire/Heat) |
| Freeze Alarm | 159 (Low Temperature) |
| General Fault | 307 (Self-Test Failure) |
| Battery Low | 302 (Low System Battery) |
| Tamper Fault | 144 (Sensor Tamper) |
| Dirty Detector | 394 (Sensor Watch Failure) |
| Communication Failure (via SMS) | 350 (Communication Failure) |
| CO Alarm | 162 (CO) |

Table of Example Commands between the communication server and the CRM server.

| Endpoint | HTTP Method | Description | Success Response |
|---|---|---|---|
| /devices/{id}/data | POST | By using this call the communication server send collected sensor data once a day to the CRM. | Data was stored |
| /devices/{id}/events | POST | By using this call the communication server send event to the CRM. | Event was stored. |
| /devices/{id} | PUT | By using this call the communication server can update device fields (connected status, RFBA firmware version, sensor firmware version). | Device was updated. |

In one embodiment, all commands listed above are in JSON format and are restricted to be sent only by the communication server. Preferably, any of the requests should also use the HTTPS protocol to reach the CRM server. In addition, a valid JWT bearer token can be provided for authorization. The communication server preferably may use a client credentials flow to generate the JWT access token on the CRM Server.

Table of Example Commands between the mobile application and the CRM server.

| Endpoint | HTTP Method | Description | Success Response |
|---|---|---|---|
| /customer/account | GET | By using this call Mobile App can get account data. | Account data returned. |
| /customer/account | PUT | By using this call Mobile App can update account. | Account was updated. |
| /customer/account/create | POST | By using this call Mobile App can create a new account | Account was added. |
| /customer/account/push-notifications | POST | By using this call Mobile App can register push-notification token for the account | Token was registered. |
| /customer/account/push-notifications | DELETE | By using this call Mobile App can remove push-notification token. | Token was removed. |
| /customer/settings | GET | By using this call Mobile App can get account settings. | Account settings returned. |
| /customer/settings | PUT | By using this call Mobile App can update account settings. | Account settings were updated. |
| /customer/alarms | GET | By using this call Mobile App can get the list of active alarms for the account. | List of active alarms returned. |
| /customer/alarms/{id} | GET | By using this call Mobile App can get alarm data. | Alarm data returned. |
| /customer/alarms/{id} | POST | By using this call Mobile App can handle alarm (send it immediately or cancel). | Alarm command processed. |
| /customer/climate/{deviceId} | GET | By using this call Mobile App can get climate data. | Climate data returned. |
| /customer/definitions | GET | By using this call Mobile App can get application definitions (links, constants, etc.). | Application definitions returned. |
| /customer/devices | GET | By using this call Mobile App can get list of account's devices. | List of devices returned. |
| /customer/devices | POST | By using this call Mobile App can register a new device into account. | Device was registered. |
| /customer/devices/{id} | GET | By using this call Mobile App can get device info. | Device info returned. |
| /customer/devices/{id} | PUT | By using this call Mobile App can update device info. | Device info was updated. |
| /customer/devices/{id} | DELETE | By using this call Mobile App can remove device. | Device was removed. |
| /customer/devices/{id}/status | GET | By using this call Mobile App can get device SC status info. | Device SC status info returned. |

-continued

| Endpoint | HTTP Method | Description | Success Response |
|---|---|---|---|
| /customer/emergency-network | POST | By using this call Mobile App can register a new emergency contact into account. | Emergency contact was registered. |
| /customer/emergency-network | GET | By using this call Mobile App can get emergency contact info. | Emergency contact info returned. |
| /customer/emergency-network | DELETE | By using this call Mobile App can remove emergency contact from the account. | Emergency contact info was removed. |
| /customer/account/friend-referral | POST | By using this call Mobile App can start the refer a friend flow. | Refer a friend flow was initiated. |
| /customer/history | GET | By using this call Mobile App can get list of history events. | List of history events returned. |
| /customer/history/acknowledgement | POST | By using this call Mobile App can acknowledge list of history events. | List of history events was acknowledged. |
| /customer/subscriptions/current | GET | By using this call Mobile App can get current subscription info. | Subscription info returned. |
| /customer/subscriptions/verification | POST | By using this call Mobile App can apply the subscription. | Subscription was applied. |
| /customer/account/confirmphone | GET | By using this call Mobile App can start sending the confirmation code to the account phone number. | Sending confirmation code was started. |
| /customer/account/confirmphone | POST | By using this call Mobile App can approve confirmation code for the account phone number. | Confirmation code was approved. |
| /customer/account/confirmemail | GET | By using this call Mobile App can start sending the confirmation code to the account email. | Sending confirmation code was started. |
| /customer/account/confirmemail | POST | By using this call Mobile App can approve confirmation code for the account email. | Confirmation code was approved. |
| /customer/account/resetpassword | POST | By using this call Mobile App can start sending reset verification token. | Reset verification token sending was started. |
| /customer/account/resetpassword | PUT | By using this call Mobile App can set the new password. | New password was set. |
| /customer/account/resetpassword/verification | POST | By using this call Mobile App can start sending the confirmation code for password reset. | Confirmation code sending was started. |

In one embodiment, all commands listed above are in JSON format and are restricted to be sent only by the mobile application. Preferably, any of the requests should also use the HTTPS protocol to reach the CRM server. In addition, a valid JWT bearer token can be provided for authorization. The communication server preferably may use a password flow to generate the JWT access token on the CRM Server Table of Example Commands between the cellular network and the CRM server.

In one embodiment, all commands listed above are in JSON format and are restricted to be sent only by the cellular network carrier. Preferably, any of the requests should also use the HTTPS protocol to reach the CRM server. In addition, other security mechanisms may be required by the cellular carrier as part of communications.

Table of Example Commands between the cellular network and the CRM server.

| Endpoint | HTTP Method | Description | Success Response |
|---|---|---|---|
| /callback/carrierservicecallback | POST | By using this call the cellular service can update device status | Device status was updated |

| Endpoint | HTTP Method | Description | Success Response |
|---|---|---|---|
| /customer/subscriptions/update/google | POST | By using this call Google Play can notify about purchases | Purchase notification is processed |
| /customer/subscriptions/update/apple | POST | By using this call Apple Store can notify about purchases | Purchase notification is processed |

In one embodiment, all commands listed above are in JSON format and are restricted to be sent only by a payment processing service. Preferably, any of the requests should also use the HTTPS protocol to reach the CRM server. In addition, other security mechanisms may be required by the payment processing service as part of communications.

In another embodiment, the CRM separately logs all communications with any external services (such as the communication server, the central station, a cellular carrier, a payment processing service, etc.). Preferably, the logs would be organized by data fields and attributes to log and cover all the critical decisions made, permitting subsequent inspection of what happened in the system and why at any particular point in time.

In a preferred embodiment, the logs generated by the upgrade server would be sent to and stored in a separate logging server, which would index the log entries with a UTC time stamp to permit reporting, querying and filtering by an authorized user.

In one embodiment, each log would also be marked with a severity level as follows:

| # | Level | Description |
|---|---|---|
| 1. | ERROR | The log entry signifies that an unexpected error has been encountered. |
| 2. | WARN | This level means that irregular circumstances have been encountered but the software hasa clearly defined recovery strategy which doesn't imply system availability or performance. |
| 3. | INFO | The log entry describes a decision within the normal conditions the software makes or normal events appeared at the reporting side. |
| 4. | DEBUG | The log entry brings some coarse diagnostic information mostly addressed to the software developers rather than the system users or administrators. |
| 5. | TRACE | The log entry brings highly verbose diagnostic information about the implementationdetails of the software. |

Additionally, in an embodiment, each log entry would contain the following fields:

- Time and date in form a timestamp with millisecond precision.
- Log message per se.
- Thread name that issued the log entry.
- Class and package information to identify the subsystem which issued the log entry.
- Node name or any other suitable identifier of the machine which issued the log entry.

The log message may also include the correlation identifier for a device if the certain log entry is connected anyhow to processing a request from that particular device. An example of a correlation identifier to be included would be [correlationId=ee94b39b-7ff3-4cc7-a5e7-510dd990-ea04] where ee94b39b-7ff3-4cc7-a5e7-510dd990ea04 represents the unique request identifier value.

In a preferred embodiment, the API for the CRM server can only be requested by the following services and actors:

- Mobile App
- Communication Server
- Cellular carriers (e.g., Verizon)
- External Payment Services (e.g., Google Play and Apple Store)

Any access to the CRM's API preferably requires implementation of security mechanisms for each of the services/actors above, which may vary based on configurations and third party requirements.

In a preferred embodiment, all communication between a Smoke Cell device and the communication server are asynchronous by default, in order to reduce power consumption. Preferably, the transmission of a request is separated from receiving the results when a device is interested in the result. The general approach can be seen below.

Formally not all communications are asynchronous, but only the selected set of the commands (which support "delay" field in the response). On the device side, a request to response processing is synchronous (the device is not sleeping and is waiting for the answer). However, some commands support "delay" response, permitting retrying the same step of the request in XX seconds. In that case, the device may turn off the modem and sleep for this period of delay, preferably after determining if it is power-effective to do so. For instance, if the delay is several minutes, it makes sense to power off the LTE modem, but if the delay is only a few seconds, it may be more effective to stay powered on.

In one embodiment, the request may not require a result if the server responds with a successful status code, indicating that the server put the data into a queue to be processed it later. Some examples of such requests include:

- Posting logs
- Sending an alarm
- Posting sensor data
- Posting device data

In another embodiment, the device may require a result from the server, such as when the device generates a production certificate. In that case, the system will wait for the generated certificate to be transmitted, typically involving the following steps:

- Starting certificate generation
- Retrieving generated certificate info (if a server is still in progress it will ask device to wait a few seconds more)
- Downloading the certificate binary
- Confirming the certificate after installation In a preferred embodiment, all of the connected devices and servers on a system would comply with a time synchronization policy, which periodically updates the clock for the entire system to minimize any accumulated discrepancies.

For example, the Smoke Cell detector firmware (e.g., on the RFBA) may be required to have a real time clock synchronized within a certain amount of time with a connected server's components. Devices may also receive new real time clock value from the mobile network. In this case the device must update its clock immediately. In a preferred embodiment, each time the device updates its clock, the device logs the event. The corresponding log entry preferably should specify the fact of clock synchronization and the accumulated time delta applied to the device clock.

In another embodiment, all of the server components in the system leverage the network time protocol (NTP) to synchronize the clock time sources in the network, such as when an NTP is provided by a connected cloud platform.

In some embodiments, the communication server also connects with a CRM to send collected sensor data, device events, system and equipment connection status, as well as the firmware and hardware details of connected equipment. The CRM preferably provides at least an API to handle requests from the client mobile application, and a portal to provide operational information about user accounts. First, the API provides server functionality to handle requests (e.g., HTTP requests) from the client mobile application. The API may communicate with the mobile application to support its functionality. The communication server also maintains account information, along with the account's associated devices and the history of connected device events.

The CRM can also include a portal with operational information about end-user accounts. The CRM maintains a list of authorized portal users and the associated devices for each account, with the ability to add and remove devices and users from the account. The portal may also retrieve lists of available reports for the account and associated devices.

The CRM may also manage account subscription levels, which can provide access to different features based upon the different levels of subscription. The subscription options may also depend on the types of devices associated with the account. The CRM additionally may push updated user and device data to the communication server and the central station in the event of any account updates. Alternatively, the communication server or the central station may request the current account information from the CRM, retrieving any updates as needed. The CRM may also facilitate communications with third party services as part of maintaining account subscriptions and device activation/deactivations.

In a preferred embodiment, the CRM server securely transmits updates of its database to the communication server. As part of its normal operations, the communication server may require the information from the CRM's database. At the same time, the communication server may not be allowed to request data from the CRM for security purposes and based on user settings and parameters. In such a situation, the CRM server may notify the communication server about partial updates to any records stored in the database associated with the CRM server. Such notifications may be sent on a periodic basis to transmit a batch of changes since the last notification or as triggered upon occurrence of each change or a specific predetermined change (e.g., triggering notification only upon a major database change to reduce frequency of notifications). The scope of database changes to be transmitted may be filtered, customized, or predetermined to be all or only some types of changes, in order to reduce bandwidth and avoid transmittal of unnecessary or less relevant information.

Preferably, the updates to the CRM database include information about changes to devices and authorized accounts. Upon receipt, the communication server preferably stores a copy of the received data in its associated database and then responds with an 'OK' status (HTTP 200) to the CRM if and only if the data has been persisted successfully. If the transmittal or storage is not successful, the communication server may respond with an error indication or a predetermined time interval may lapse, after which the CRM server may retransmit the same update. Alternatively, the CRM server may continue to accumulate database changes until the next notification transmittal is due, and then the CRM server may transmit the new database update to reflect both the prior failed transmission and the subsequent updates.

The CRM may also receive geo-coordinates from devices and mobile applications associated with each account. The CRM collects GPS and location data from authorized user devices to help determine if they are home when an alarm event is triggered and to develop a daily pattern of activity. This data is used to help decide the probability of fire being actual or false. The communications server may also collect customer behavioral and environmental data to help provide risk analysis to home and health insurance companies. The communication server can use the data from individual Smoke Cell devices to provide insurance companies risk analysis based on proprietary algorithms.

The system in the present disclosure may also integrate with various connected detectors, sensors and user devices to provide first responders with real time compilations of relevant data when responding to an alert or event. For example, the communication server allows for the activation of on-premise cameras if smoke or carbon monoxide is detected to help verify false alarms and provide real-time imaging information to first responders to view. Additionally, the communications server may also allow the activation of on-premise speakers and microphones (cameras, voice service devices, etc.) by law enforcement when they are geographically close when responding to an activated Smoke Cell detector.

Similarly, the communications server can also provide a building schematic to first responders when they are geographically close to an active Smoke Cell detector, including an overlay of the detector statuses and alarm conditions. The communication server uses an API with third parties (security companies, phone companies, etc.) to securely provide first responders with this real-time information on the latest activity inside the premise, including historical data from when the alarm condition was first detected.

The communications server also provides a secure API integration with smart home and security monitoring companies, allowing first responders within a defined geographical proximity to an active alarm the ability to unlock/open exterior main and garage doors with automated locking/opening mechanisms.

The communications server also allows 911 dispatchers and first responders within a defined proximity to the premise to where there is an active alarm, or geographically located in a 911 dispatch center to remotely communicate with those on premise through either voice enabled connected devices (e.g. Alexa, Google Voice, or user phones) or directly through the smoke detector itself utilizing the embedded cell module. For example, the first responder may send voice data through the Smoke Cell detector to issue instructions to any persons within audible range of the detector. The Smoke Cell detectors may also be equipped with microphones to enable two-way communication. In one embodiment, the Smoke Cell detector contains both a microphone and a camera, enabling the Central Station or first responders to communicate with any persons inside the premises and to identify their location relative to any of the Smoke Cell detectors by monitoring for their audible and visual responses.

The communications server also allows emergency dispatchers and first responders within a defined proximity to the premises of the active Smoke Cell detector alarm to remotely request a real time image from the smoke detector. This imaging may be used to help decide if an alarm is actual or false and to also guide rescue efforts or efforts to contain the situation.

The communication server may also share variable account information with first responders when they are within a predefined geographical proximity to a location with an active Smoke Cell device. This variable information may include:

Names of individuals who live in the home

Names of any pets that live in the home

Sleeping locations of all individuals and pets who live in the home

Door codes

Hidden key locations

Individual medical and disability information

Family fire evacuation plans/rendezvous points

Any other information that might be of value for a responding fire fighter or medical personal Additionally, the CRM may send SMS and email messages through third party services to notify users associated with the system account, regardless of location.

In a preferred embodiment, a backup channel for communication between the Smoke Cell detector and the communication server may be provided. Preferably the backup channel supports transmitting from the device to the communication server a notification of (1) a communication error or (2) notification of an alarm or state change in addition to a communication error. Additionally, the communication server may use the backup channel to transmit to the device commands and notifications to update the device settings or behavior. Preferably the backup channel utilizes SMS messaging over a cellular network.

In another embodiment, the communications server may provide other interested parties, such as property owners and property management companies, with system and alarm information. For example, the communications server may provide site specific information on air quality or radon levels to help property owners or managers manage tenant compliance with applicable regulations. The communications server may also provide governmental agencies current device reports via a secure API so that they are able to inspect if certain rental properties are in compliance with smoke detector requirements without needing to dispatch agents.

The communications server may also provide insurance companies real time information on whether the smoke detectors installed at a premise are functioning correctly or not. Homeowner insurance rates will adjust immediately if discounts are applied and require functioning smoke detectors. The communications server can also notify insurance agencies of a fire, based on Smoke Cell detector data, monitoring information from the Central Station, and any available public resources.

The CRM preferably manages authorization of user accounts and connected devices and communicates with the communication server to create, update, and delete any accounts or associated devices, as well as associating authorized client mobile application instances with the respective user account. Through the associated client mobile application, the CRM may receive and store sensor data from connected devices associated with the authorized user. The CRM may also receive device events and alarms, and forward requests to get or process alarms.

In a preferred embodiment, the CRM Server includes 3 parts:

The CRM API, which is capable of communicating with a Mobile App, communication server, cellular carriers, and payment services, etc.;

The CRM Worker, which is a part of the server that processes asynchronous tasks;

The CRM Portal, which provides back-end and front-end support for the administrators to access and manage the CRM server.

Preferably, the CRM API Server is a component that all of the Mobile Application devices must communicate with, and it also handles requests by third-party systems (e.g., the communication server, cellular carriers, Payment Services, etc.).

By its design the CRM API Server preferably should be scalable and may be one single machine or a cluster of machines behind a load balancer. This means that the server itself may be stateless.

Additionally, the CRM Worker Server is preferably a component of the CRM server that handles all asynchronous tasks such as creating/updating/suspending accounts into the central station, updating devices/accounts into the communication server, and other integration tasks.

The CRM worker should also be potentially scalable, and preferably it is capable of running multiple instances to process multiple asynchronous tasks. In a preferred embodiment, the number of CRM workers instantiated equals the number of pending asynchronous tasks. Alternatively, the system may provide a scheduler to estimate over a period of time the number of workers to instantiate to handle some minimum threshold number of pending asynchronous tasks. For example, some tasks may be estimated to complete sooner than others, and a single instantiation may be able to handle multiple tasks during the same time interval as another instantiation takes to handle a longer task. The scheduler similarly categorize tasks by a weighting metric to generally group them, e.g. as quick, medium, or long tasks, or using metrics of differing granularity or degree.

In a preferred embodiment, the CRM server also provides a portal as a back-end and front-end component for the CRM's administrators to have access to the server.

In one embodiment, the system may also provide a dedicated Logging Server to function as the central repository for all of the logs generated across the entire system. Different servers and components in the system may independently generate logs for various activities and events, and preferably those logs would be transmitted to the Logging Server for indexing and storage. The Logging Server preferably also includes an API for querying the logs using each entry's metadata and also a web user interface for searching and filtering log entries for reporting and investigation purposes. In one embodiment, the Logging Server utilizes an ElasticSearch, Logstash, Kibana (ELK) stack.

In another embodiment, the communication server would have its own database, which would be responsible to:

Store results of long-running requests in scope of asynchronous requests from Smoke Cell device.

Store the mapping between device ID and the pair of (account ID, zone ID) as required by the Central Station API.

Store account-specific data (provided and updated by the CRM). This data is necessary to operate the devices.
Store device-specific data (provided and updated by the CRM). This data is necessary to operate the devices.
Store device alarms and their statuses.

In another embodiment, the CRM server would have its own database, which would be responsible to:

Store client accounts, their credentials, claims and metadata (including the central station metadata).
Store devices, their metadata (including cellular carrier metadata).
Store device history events.
Store device climate data.
Store administrator users, their credentials, claims.
Store account addresses.
Store account notification tokens.
Store account emergency contacts.
Store account purchases and subscriptions.
Store account system logs.
Store system reports.

In this embodiment, the CRM database would also be used and accessible by the CRM API, Worker and Portal components.

Figure 23:
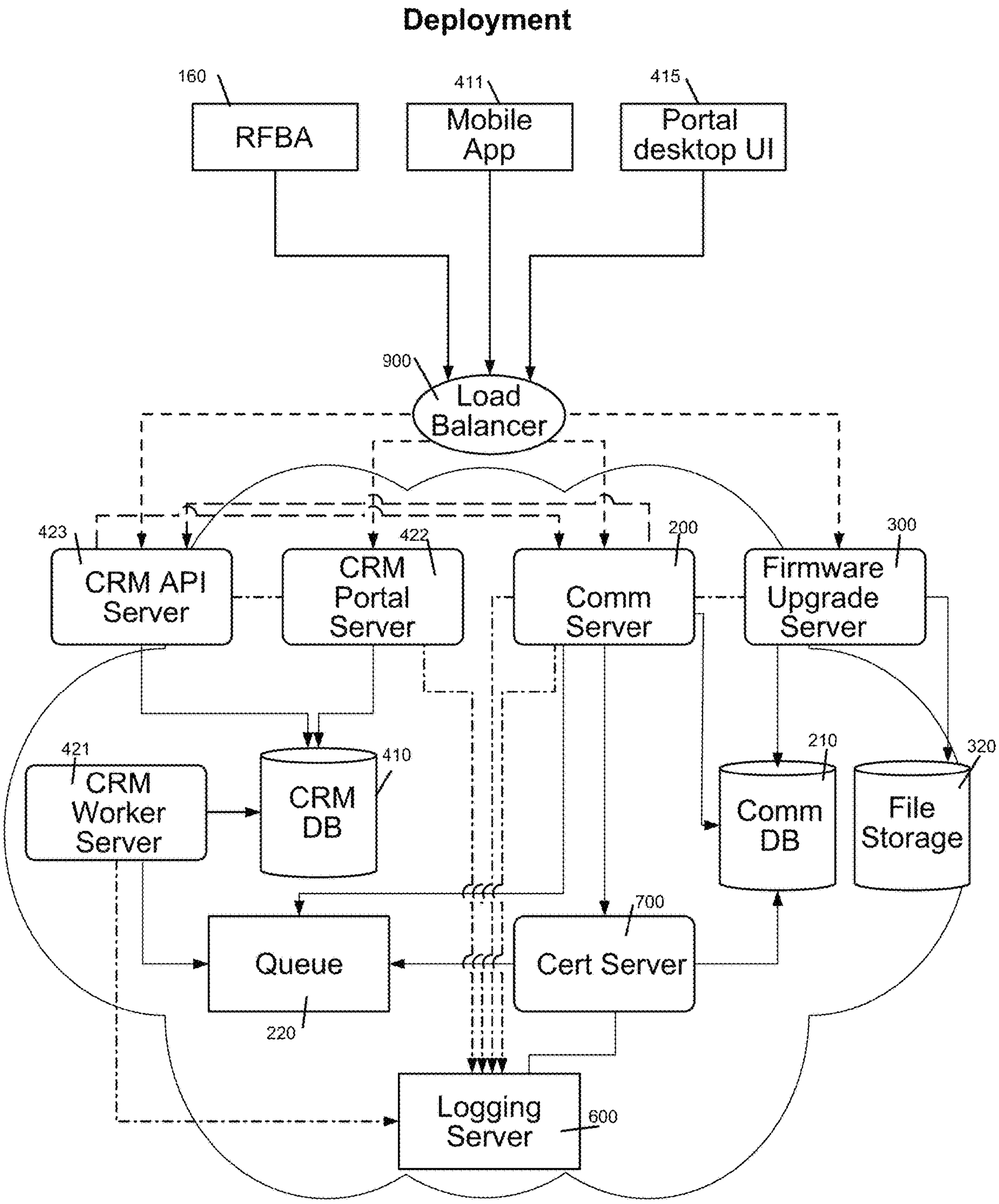
FIG. 23 illustrates an embodiment of the system as deployed over the cloud.

In a preferred embodiment, the system is deployed over the cloud in order to leverage increased reliability and availability of the deployed services. FIG. 23 depicts one embodiment of a cloud deployment, utilizing a load balancer 900 to interface the various cloud-based components for the CRM API 423, CRM server 422, communication server 200, and upgrade server 300. Additionally, a CRM worker 421, CRM database 410, communications queue 220, communications database 210, certification server 700, file storage 320, and logging server 600 may all be deployed as cloud-based components in the system. As cloud deployments, each of those may be instantiated as needed to match the load balancer 900. The load balancer 900 receives communication signals and commands from the RFBA 160 on the device, from authorized user mobile applications 411, and from portal user interfaces 415. To an external user or processor, the cloud-based deployment of each of these components would appear as a respective single resource, even though multiple instantiations would exist to meet the load requirements.

In a preferred embodiment, the cloud deployment would include the following features.

| # | Requirement |
|---|---|
| 1. | Health monitoring |
| 2. | Load balancer |
| 3. | Database as a service |
| 4. | Reliable file storage service |
| 5. | [Certificate management service] Ability to register a customself-signed certification authority root certificate |
| 6. | [Certificate management service] Ability to generate TLS. Certificates signed by the custom certification authority root certificate |
| 7. | [Certificate management service] Ability to revoke a TLS certificate |
| 8. | [Certificate management service] Ability to check whether the TLS certificate is revoked (either via OCSP or via CRL) |
| 9. | ELK stack as a service |
| 10. | Queue as a service |

In a preferred embodiment, the communication server's reliability may be increased by means of horizontal scalability. Since each communication server itself can be stateless there can be a number of communication server instances behind the load balancer. The devices do not need to know how many communication server instances are there behind the load balancer. Preferably, the device does not rely on receiving a response from any particular instance. If an instance is not reachable, e.g. it is down at the moment, the device's request would fail by timeout. In that instance, the device may repeat the request until an available instance is able to respond.

The communications server also preferably monitors all provisioned or deployed Smoke Cells to verify operational status. For example, the firmware and hardware versions of components and devices may be monitored and verified by the communications server, which tracks the functionality and capabilities of the deployed devices. The communications server also processes the status data and device event logs of the monitored Smoke Cells, storing the processed status and event data from the Smoke Cells into respective storage logs that can be subsequently accessed or retrieved. Additionally, the Smoke Cell and communications server may modify their reporting and logging behavior based on specific conditions or triggered events. For example, if smoke is detected by a Smoke Cell, the communications server may begin retrieving and storing the sensor and additional related sensor data of the Smoke Cell on a predetermined frequency, providing more granular (or real-time or near real-time) data until the alarm event has cleared. In another example, if an indicator shows the environmental circumstances are not conducive to an accurate sensor reading, alarm indicators may be temporarily suspended or the normal response may be modified to account for the temporary circumstance, such as requiring an authorized user to review the alarm status.

The Smoke Cell may receive remote updates from a server that monitors and logs firmware versions and upgrade history for each device. Users may elect upgrade policies for one or more of their devices, setting times and parameters for upgrades, including whether upgrades should be conducted in batches or waves and the scheduling of such upgrades. The server may also track logs of failed or incomplete upgrades, and reports may be sent periodically or upon request to authorized users with the upgrade history and data for all of the user's connected devices. The server may also send notifications to the user of any failed or incomplete upgrades, providing the user an opportunity to select specific instructions or schedules to handle completion of the upgrades. The user may also be prompted to rectify certain issues preventing the upgrade, such as power or connectivity concerns.

In a preferred embodiment, other server components such as the communication server, the upgrade server, the CRM API, CRM Portal, and CRM worker components, the logging server, and any associated databases would also follow the same update policies on the system. Preferably, staging and production environments would also be utilized to validate new functionality on a narrow subset of devices first before broad deployment.

Figure 17:
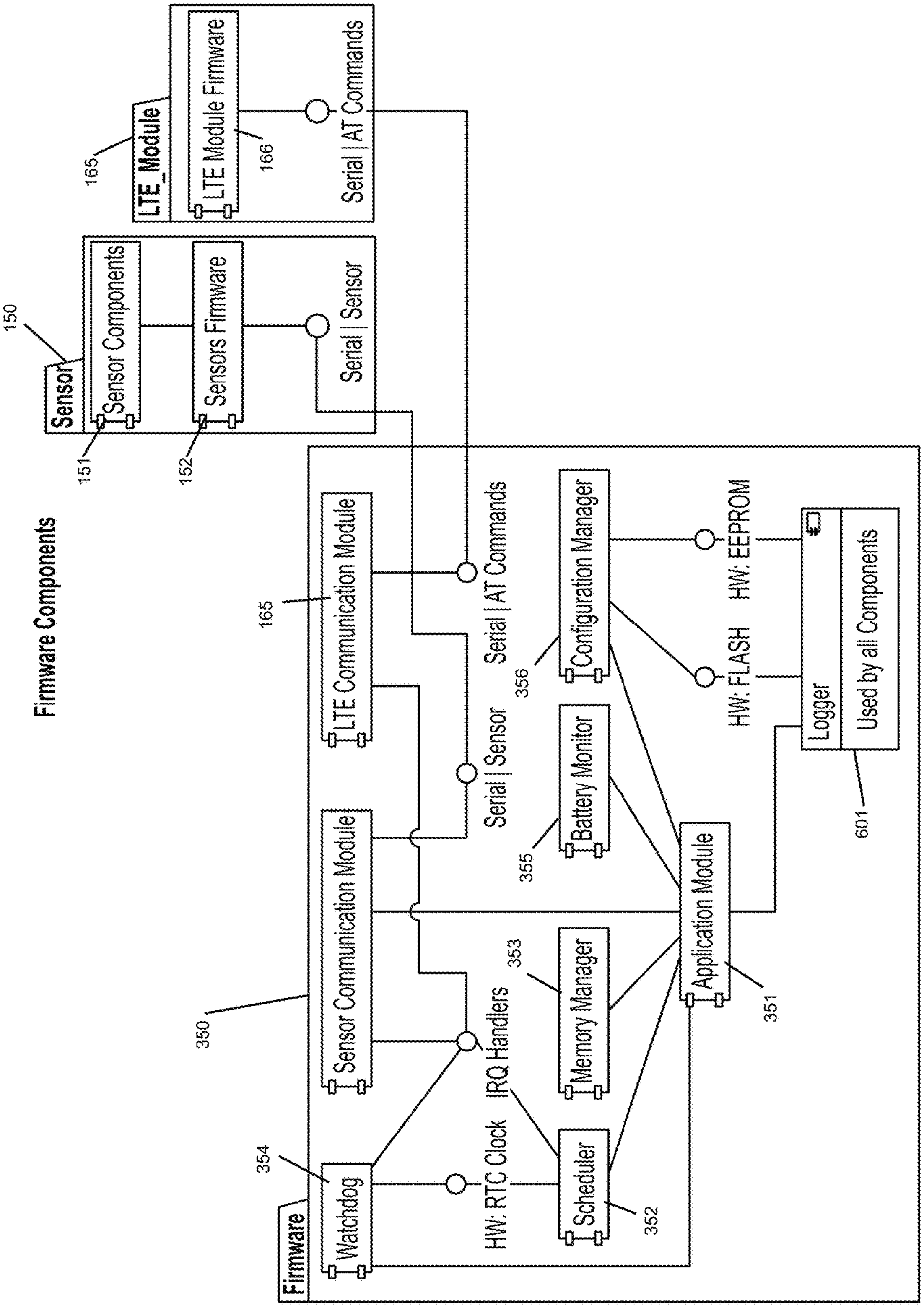
FIG. 17 illustrates an embodiment of the firmware components in the system.

In a preferred embodiment, the system Smoke Cell detector includes the following firmware components, which are also depicted in FIG. 17.

Application module 351
Scheduler 352
Memory Manager 353
Logger 601
Watchdog 354
Battery Monitor 355
Configuration Manager 356

Sensor Communication Module 357

LTE (AT Commands) Communication Module 165

FIG. 17 depicts an example of how these components may be arranged, connecting the LTE and Sensor communication modules to their respective firmware.

Figure 18:
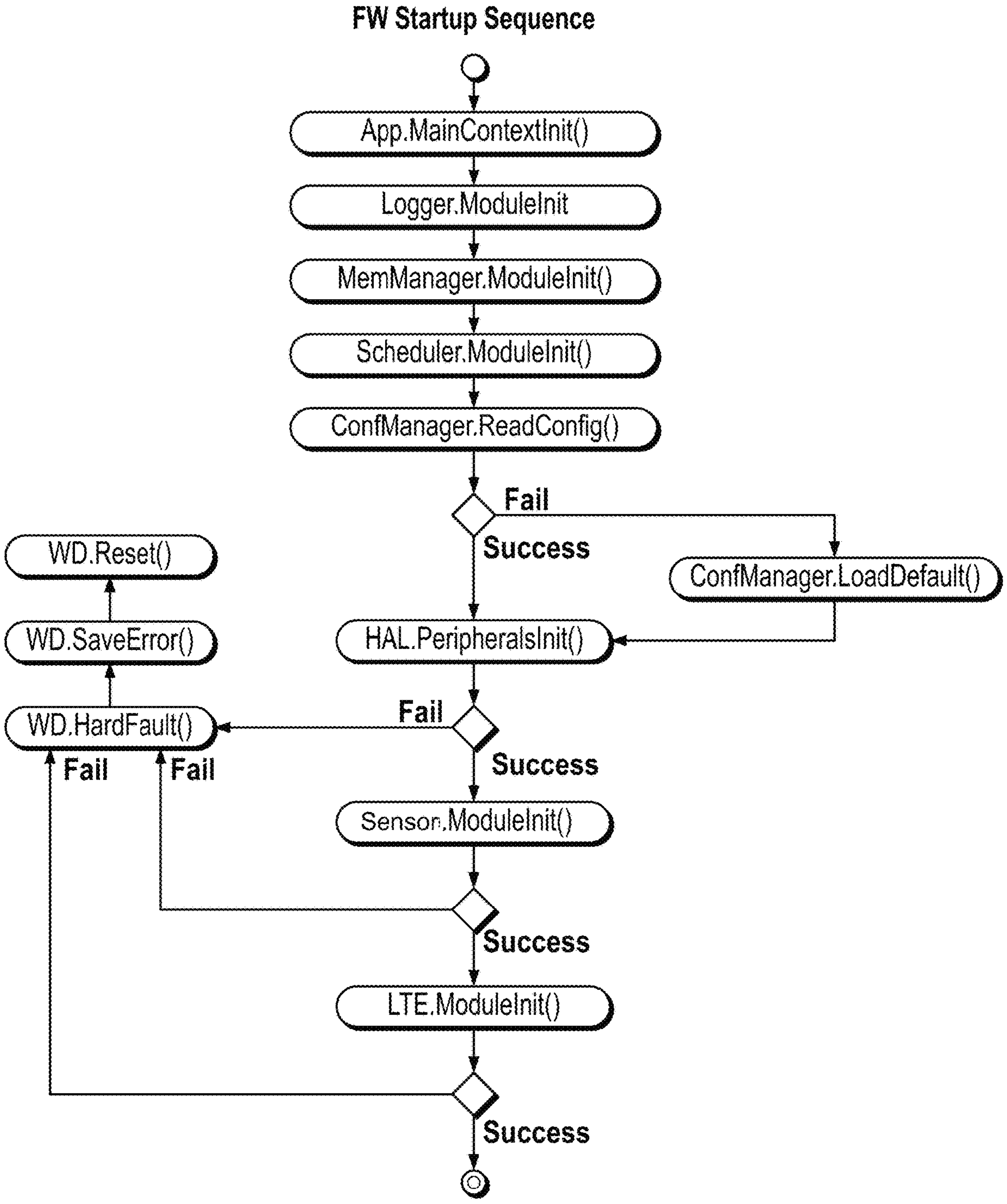
FIG. 18 illustrates an embodiment of the firmware startup sequence.

In one embodiment, the application module serves as the main logical module and is responsible for startup sequence, initialization of other components and starting up regular tasks like check-ins, keep-alive etc. For example, an example of an application startup sequence is depicted in FIG. 18. Specifically, the sequence initializes the main application, logger module, memory manager, and scheduler. The configuration manager the reads the configuration and if that fails, it loads a default configuration. Regardless, the sequence subsequently initializes hardware abstraction layer (HAL) peripherals. If the peripherals initialization fails, a fault is generated and saved before the device is restarted. Otherwise, the sensor module is initialized along with the LTE module. Should either of those fail, a hard fault is generated and saved before the device is restarted.

In one embodiment, the co-operative scheduler serves as a core of the firmware. Due to co-operative nature of the scheduler, there preferably are no blocking tasks. Instead, every task assuming any type of waiting for hardware response or some other sort of interaction should be divided into two or more parts. E.g. task_1 prepares a request, sends a wake-up to hardware and exits, when hardware responds task_2 is scheduled, when task_2 is called it sends a request to hardware and so on. Such an embodiment provides both a good level of quantization and eliminates any unnecessary nesting that is especially important in case of hardware and power consumption limitations.

In one embodiment, the scheduler queue is not manageable, and there is no prioritization or deletion of any regularly scheduled task. Preferably, all higher priority tasks are directly embedded into the scheduler's main loop body, rather than added to the scheduler queue.

Preferably, the scheduler also processes "alarm" tasks scheduled for a particular time (relative or absolute depending on available real time clock options). In such an embodiment, the scheduler checks for alarms performed before and after execution of every regularly scheduled task.

In a preferred embodiment, the scheduler is also responsible for deciding on the type of power saving mode for each hardware component and when to enter that mode. In this embodiment, the decision mechanics are tightly connected to particular hardware solutions and are be updated accordingly, e.g. each task/alarm may contain a flag indicating it requires LTE module functionality, so scheduler may start wake up procedure in advance (or not put LTE module to sleep depending on interval and power/time overhead that is to be identified).

Figure 19:
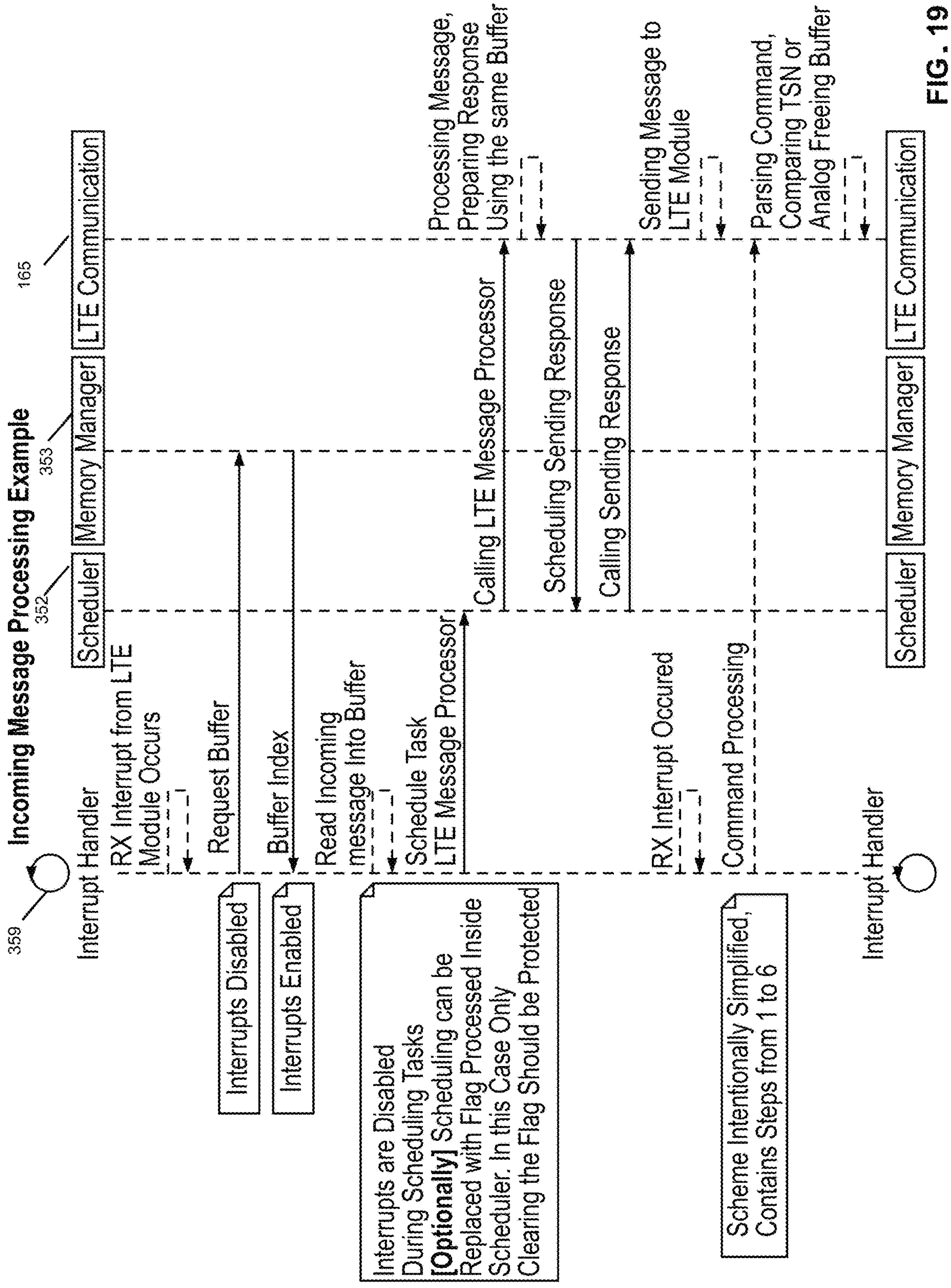
FIG. 19 illustrates an embodiment of the process for handling an incoming message.

In one embodiment, an interrupt handler and scheduler are utilized to process and handle incoming messages and to schedule tasks. FIG. 19 depicts an example process for handling incoming messages. Specifically, upon an RX interrupt triggered by reception of a signal from the LTE module 165, the interrupt handler 359 disables interrupts and sends a request buffer to the memory manager 353. The memory manager 353 sends the buffer index to the interrupt handler 359, which then reenables interrupts and proceeds to read the incoming message into the buffer. The interrupt handler 359 subsequently schedules a task to the LTE message processor. Alternatively, a flag may be processed inside the scheduler. The scheduler 352 then sends a call to the LTE communication module 165 to process the message, and the LTE module 165 processes the message and prepares the response using the same buffer. The LTE module 165 then sends a scheduling response to the scheduler 352, which calls the LTE communications module 165 to send the message. The LTE module 165 then sends the message to itself, and the interrupt handler 359 then sends a command to the LTE module 165 to parse the command and free the buffer.

In a preferred embodiment, the system utilizes a memory manager and fixed size data structures for per-module contexts and fixed-size arrays. Additionally, a buffer pool is utilized for input/output buffers, and the system preferably uses buffer indexes instead of pointers. Preferably, different buffers are used for the different modules in the system to minimize any read/write blocking situations or out-of-memory errors.

In a preferred embodiment, logging of events and notifications is handled on different levels, with each level including messages from previous levels. Alternatively, if there are hardware limitations, the logging levels may be separately handled or may be reduced in number or scope. Preferably, three levels of logging are utilized:

Regular logs covering: Alarms events, Provisioning events, IP Communication events, Critical issues;

Debug (Level 1) covering moderate severity issues, scheduler and memory manager status, power management and related information; and Debug (Level 2) covering information about all 'tasks' called together with corresponding parameters.

To avoid potential collisions during time synchronization, all logged events preferably have 4 bytes even number with overflow. Preferably, each message would also contain timestamp in UTC format. Any Time Correction Events would preferably be logged as well.

In a preferred embodiment, any logs are stored in dedicated Flash memory that is reserved for this purpose. The logger then uses a ring buffer approach to saving records to the Flash memory, allowing the current data to replace the oldest set of data after memory is full. Alternatively, the oldest data can be periodically archived locally or remotely as needed to free up room on the dedicated flash memory.

In a preferred embodiment, a watchdog is utilized to be responsible for detection of critical issues and resetting, re-configuring or restarting the RFBA and all connected peripherals if applicable. Preferably, each module may report a critical issue to the watchdog directly without scheduling a callback by calling a corresponding routine. Upon execution, the watchdog stores the current status, issue code and corresponding information into NVRAM and resets the whole RFBA or respective component that initiated the routine.

Preferably, the watchdog utilizes a standard approach by resetting a hardware watchdog timer on every scheduler tick (or every several ticks). The monitored conditions include:

Read/write blocking

Out of memory conditions

Communication with LTE module

Communication with the sensors

MemoryFlash/EEPROM health.

Communication with communication server or upgrade server

Alternatively, memory health monitoring may be offloaded to a configuration manager.

Alternatively, each module may be responsible for monitoring its own conditions and contain its own mechanism for logging issues and restarting hardware. For example, the communications server may independently handle the monitoring and restarting of any connected devices due to operational problems. The upgrade server may independently handle the monitoring and restarting of any devices due to firmware problems. The CRM server may independently handle the monitoring and restarting of any server resources connecting to external systems or programs.

In a preferred embodiment, any communication failure reported by the watchdog initiates a retry sequence of the following steps:

1. Retry in 5 minutes with 1 minute jitter
2. Retry in 30 minutes with 6 minutes jitter
3. Retry in 2 hours with 24 minutes jitter
4. Device Reboot
5. Repeat step 1
6. Visit firmware upgrade server
7. Repeat steps 1-3
8. Send SMS notification to the Communication Server
9. Repeat whole sequence after 24 hours.

Alternatively, the foregoing sequence may be shorter, longer, or customized by the user. Different failure events may also be handled using tailored response sequences. For example, in the event of a communication failure during transmission of an alarm notification, the system preferably switches to retry delivery using the backup channel (e.g., if the backup channel utilizes SMS, then the system would skip to step 8).

In a preferred embodiment, the watchdog module also monitors for initiation of any reset to factory defaults sequences. For example, if any connected device receives a reset to default command (either via an authenticated software command or via a hardware button sequence), the watchdog processes the command by logging the change to the device and initiating the factory reset procedure.

In another embodiment, other monitors may be separately established to monitor for specific system conditions. For example, a battery monitor may be utilized to report on battery conditions and degradation curves. A configuration manager may be utilized to store configuration, credentials and other security materials. In addition, the configuration manager may monitor flash memory write frequency to a page or sector, utilizing a timestamp for determining the last good portion of data. Preferably the write sequence is the following: Data->Timestamp->16 bit CRC to protect from interrupted writes.

In a preferred embodiment, a Memory Manager subsystem is responsible for initial buffer allocation, de-allocation and monitoring memory usage statistics.

In a preferred embodiment, a Communication Module facilitates communication with the detector functional area to receive data from any connected sensors. Additionally, in a preferred embodiment the communications functional area includes an LTE communications module, which is responsible for communication with LTE hardware. The LTE module supports initialization, composing and parsing AT commands, provides an abstraction layer for other modules, and permits swapping a particular LTE module with similar hardware from another vendor(s).

Preferably the following functionality is exposed by the LTE module: Module Initialization, Get Module status, Setup SSL Context, Send Command, Receive Command, and Set Power Mode. Additionally, the LTE module is responsible for receiving incoming SMS messages and forwarding them to the Application, such as the "Restart now" SMS command.

Figure 22:
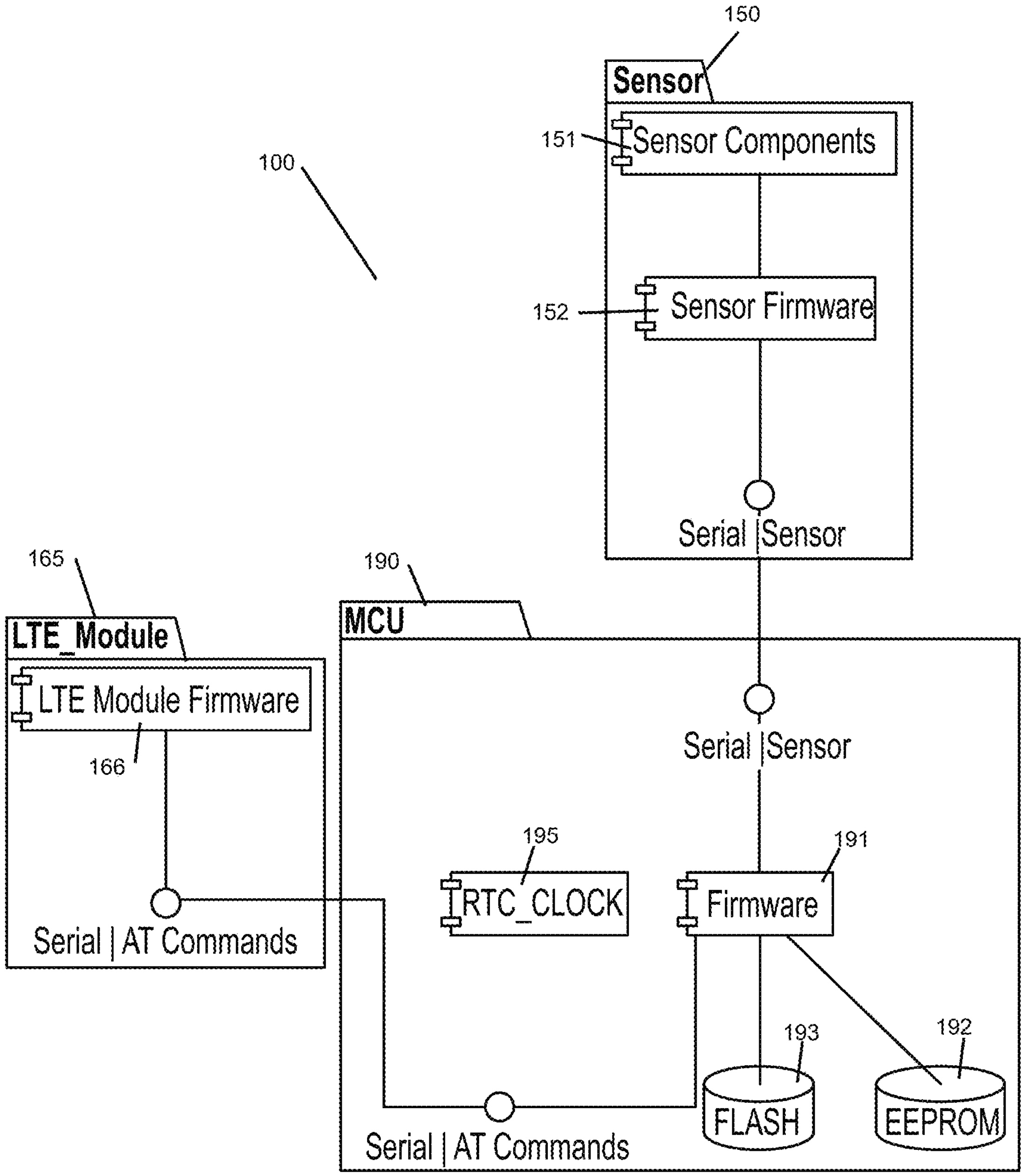
FIG. 22 illustrates an embodiment of the system showing an LTE module, the microcontroller unit, and a sensor module.

In a preferred embodiment, the core components of the system include:

- a microcontroller unit, such as a STM32L1-series chip, which provides the application module responsible for the whole scope of exposing sensor-associated Alarms and Statuses to the Back-end services via LTE module;
- an LTE module, which provides IP communication functionality managed via AT Commands Interface; and
- a sensor board, which contains its own firmware responsible providing an interface for capturing Alarms and Statuses from the sensor board In one embodiment, the various hardware components in the LTE module, the microcontroller unit module, and the sensor module are depicted in FIG. 22. As shown, the microcontroller unit module 190 contains two serial connections to the sensor module 150, the sensor firmware 152, sensor components 151, and to the LTE module 165 and the LTE module firmware 166. The microcontroller unit module 190 also contains an RTC clock 195, firmware 191, flash memory 193, and EEPROM memory 192. The sensor module 150 similarly has a serial connection to the microcontroller unit 190, its own firmware 152, and sensor components 151.

In a preferred embodiment, the hardware parameters for the Smoke Cell device include at least the following:

Voltage: 2.1V to 3.6V
Ripple voltage: 200 mV
Maximum standby current: 1 μA
Maximum average current: 20 μA
Maximum transmit current: 50 mA
Power-up delay: is maximum before 1st transmission
Power-up sequence: Header allowed to be in any state
Alarm signaling delay: 1 s maximum
Signaling rules: Single (prioritized) state signaled
Pin 7 synchronization: 4 second heartbeat in quiescent state Additionally, the interface between the RFBA communications functional area and the detector functional area on the sensor board preferably includes a pin to provide an input interrupt from the detector functional area to the radio PCB to indicate an alarm. Additionally, the interface includes a pin to receive an output from the radio PCB indicating a message needs to be passed to the detector functional area. Preferably, serial input/output ports are also provided for additional data transmission and reception. In a preferred embodiment, the detector status is signaled through a serial peripheral interface (SPI), and the radio microcontroller unit (RFBA) is acting as SPI peripheral. In such a scenario, communication may be initiated from both the radio MCU and the detector MCU.

In a preferred embodiment, normal operations include the Radio MCU performing periodic SPI data transfers to request climate data from the sensor MCU (e.g., once per 10 min) and the detector MCU performing periodic SPI data transfers of sensor data.

Additionally, in the event of a fire or smoke alarm situation, in a preferred embodiment, the device transmits sensor data over the SPI data transfer and the radio system before initiating the sounder alarm so as to avoid overloading the power supply.

In some embodiments, the CRM interfaces with a client mobile application to receive user requests from the application as part of its program flows. The client mobile application can register or provision newly added Smoke Cells and their respective RFBA modules.

The communication server may also use real time data from the Smoke Cell detector to help decide if an alarm is real (i.e. if particulate matter in the air is increasing or decreasing real time). Variable sensor data can be monitored and uploaded to the communication server where individual patterns would be compared to other additional sensors.

Using pattern recognition and machine learning, algorithms would learn from alarm triggers and false alarms to recognize patterns for each and discern between real events and false alarms. This would significantly reduce current false alarm rates and improve the positive detection of valid alarm events. The communication server uses variable information from all smoke detectors connected to the server to help optimize the smoke detecting algorithm used by the manufacturer. The communication server is also able to remotely update the smoke algorithm to improve performance. Alternatively, the update is provided by the firmware upgrade server. The communication server also provides feedback to customers based on historical account data if they are at risk for a false alarm.

In one embodiment, Smoke Cell devices may be updated with revised profiles and settings to assist with filtering out or identifying potential false alarms. While Smoke Cell devices at the time of installation would be programmed to function according to a profile and setting that has previously been certified to function in compliance with an approved standard or regulation, the programmed functionality can be additionally upgraded or modified based on subsequent changes to the certified functionality or changes to the underlying standard or regulation. For example, depending on geographic location, smoke detector devices may be required to comply with various national or regional regulations or with standards issued by organizations (such as Underwriter's Laboratories, the National Fire Protection Association, the European Committee for Standardization, European Committee for Electrotechnical Standardization, Japan Fire Equipment Inspection Institute, ISO and GB standards, etc.). In a preferred embodiment, the subsequent certification of upgraded or modified profiles for functionality of the same Smoke Cell devices may be transmitted to the Smoke Cell devices to change their functionality while still maintaining necessary certifications and regulatory compliance. The Smoke Cell devices may replace in its firmware the prior certified profile with the latest certified profile. Alternatively, the Smoke Cell devices may store both certified profiles, with the prior certified profile being stored in reserve in the event the change is to be rolled back. In one embodiment, the firmware upgrade server would store programming information on the current functionality of each of the different connected Smoke Cell devices. The upgrade server may also store all historical firmware versions received since deployment for each type of Smoke Cell device, providing the option to roll back corresponding devices to any prior certified version if needed. In another embodiment, the communication server could be used to perform software updates. The remote servers may also aggregate historical sensor and performance data to analyze for any new patterns common to false alarms. Those patterns may be adjusted for by modifying the programmed functionality of the Smoke Cell devices to compensate, and the modifications may be independently verified for efficacy and certification without having to install new hardware to the existing device. The change logs and histories may also be stored at the remote server, and authorized users may additionally request that changes be rolled back or undone without having to remove hardware or reinstall old equipment.

The communication server uses an API combined with data from geographically close smoke detectors to warn customers of the risk of false alarms based on regional weather, environmental, or pollution-related events. For example, if a geographical region is downwind of an event that is generating increased air pollutants such as smoke or fumes, the individual detectors may generate a false alarm. The system can cross-check the alarm notifications with the regional data to identify instances of potential false alarms.

The communication server may also aggregate additional embedded air quality sensor data to share with medical professionals to help discern on a macro level the connection between air quality and certain diseases (asthma, lung cancer, etc.). Similarly, the communication server may also aggregate data from embedded radon sensors to provide geographically specific early earthquake detection notifications to users and governments.

Additionally, upon receiving an alarm or event notification from the communication system, the client mobile application can send commands to respond to the alarm or event. For instance upon occurrence of an alarm or device event, an alert notification is sent to the client mobile application to alert the authorized user of the alarm or event. The alert notification may also provide options for the authorized user to monitor updated device statuses or retrieve additional device sensor data and conditions. The authorized user may also use the mobile application to send a cancel alarm command, resetting the device state. Alternatively, the authorized user may issue a command for the notification to be transmitted immediately to the central station for processing. The authorized user may also use the mobile application to notify emergency responders.

In one embodiment, the authorized user may also use the mobile application to transmit additional information about the notification event, the system's associated devices, and other relevant system data to others, such as the central station or to emergency responders. For example, as part of transmitting the notification to the central station, the mobile application may be used to also report a summary of the number devices and the types of alarms triggered or related sensor data for each, providing relevant context for the alarm notification. The mobile application may also report the number of detected devices within the vicinity of the alarm which may be associated with a person. This additional information can aide those responding to the location with important information assessing the scene and prioritizing actions, such as whether search and rescue efforts are needed or where to direct containment efforts.

The client mobile application is also capable of securely authorizing and tracking user login/logout, managing authentication credentials and account settings, and linking of devices to the user's account and subscription levels. For example, the client mobile application may be used for account logins, entering confirmation codes and process notification tokens.

The client mobile application also can be used to compile customized reports on device event histories and other device and sensor data. The client mobile application may provide filtering and selection options from the authorized user, which are then used to selectively retrieve and return a subset of data. For example, the client mobile application may request one or more devices' environment/climate related data over a select period of time, grouped by day, week, or month. The requested data is processed and returned to the authorized user via the client mobile application for viewing or further customization and filtering.

Additionally, similar reports may be requested and generated in evaluating the cause and occurrence of a particular device event or alarm. In the event of an event or alarm based on one or more devices or sensors, the system may automatically generate reports based on historical data for comparison of various datapoints over time. These generated reports can apply a predetermined template or set of filters to the applicable sensor data, and may also be customized by the user as well. As part of an alarm notification, these generated reports may be provided in conjunction to assist with identifying a false alarm. In another embodiment, the reporting data may be processed first and provided in a summary format, such as indicating the average sensor reading before the alarm and the historical number (and average reading) of false alarms registered with this sensor.

In another embodiment, an alarm analysis profile may be constructed using thresholds for a combination of related sensors to determine the response rules for the communications server to follow. As alarm notifications are processed, the communications server analyzes the historical data associated with each sensor in the profile as well as each of the notification resolutions to identify any batches or trends of false alarms with similar sensor reading combinations. An adjustment to the associated thresholds is then proposed in order to compensate the alarm analysis profile and when various response rules should be initiated. For example, if an increase of a set of thresholds by some combination increments would reduce the number of false alarms by 50% without missing an actual alarm event, the adjustment option may be prompted to the authorized user for approval. Alternatively, the adjustment can be automatically applied with a notification to the authorized user of the change with an option to revert if desired.

As used throughout this application, the word "may" is used in a permissive sense (i.e., meaning having the potential to), rather than the mandatory sense (i.e., meaning must). The words "include", "including", and "includes" and the like mean including, but not limited to.

As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more."

The term "or" is, unless indicated otherwise, non-exclusive, i.e., encompassing both "and" and "or."

Terms describing conditional relationships (e.g., "in response to X, Y," "upon X, Y,", "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring).

Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated.

Further, unless otherwise indicated, statements made herein that one value or action is "based on" another condition or value encompass both instances in which the condition or value is the sole factor and instances in which the condition or value is one factor among a plurality of factors.

Unless otherwise indicated, statements that "each" instance of some collection have some property should not be read to exclude cases where some otherwise identical or similar members of a larger collection do not have the property (i.e., each does not necessarily mean each and every).

Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence.

Statements referring to "at least Z of A, B, and C," and the like (e.g., "at least Z of A, B, or C"), refer to at least Z of the listed categories (A, B, and C) and do not require at least Z units in each category.

Unless specifically stated otherwise, as apparent from the discussion, it is appreciated that throughout this specification discussions utilizing terms such as "processing," "computing," "calculating," "determining" or the like refer to actions or processes of a specific apparatus specially designed to carry out the stated functionality, such as a special purpose computer or a similar special purpose electronic processing/computing device.

Features described with reference to geometric constructs, like "parallel," "perpendicular/orthogonal," "square", "cylindrical," and the like, should be construed as encompassing items that substantially embody the properties of the geometric construct (e.g., reference to "parallel" surfaces encompasses substantially parallel surfaces). The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

Negative inferences should not be taken from inconsistent use of "(s)" when qualifying items as possibly plural, and items without this designation may also be plural.

In a preferred embodiment, the RFBA communications functional area of the device includes the following functionality, although a person of skill in the art would recognize that these may be modified, removed, or combined without deviating from the spirit and scope of the invention:

a. communication with the alarm sensor detector functional area.
b. manage cellular communications between the sensor's associated Alarm and the communication server
c. transmit the following Alarm status messages to the communication server:
   i. Alarm for Smoke, Heat, Freeze, Test, CO;
   ii. Fault for General condition, Battery, Tamper, Sensitivity;
d. transmit following customer alerts to the communication server:
   i. Temperature High/Low
   ii. Humidity High/Low e. receive commands from the communication server
f. receive device settings from the communication server.
g. upgrade firmware upon request from the communication server
h. handle production of certificate rotation.
i. send collected sensor data once a day to the communication server.
j. log all security-related activities and events and transmit it to the communication server upon request.

In a preferred embodiment, the communication server includes the following functionality, although a person of skill in the art would recognize that these may be modified, removed, or combined without deviating from the spirit and scope of the invention:

a. communicate with Smoke Cell devices.
b. communicate with the CRM Server.
c. perform initial provisioning of Smoke Cell devices by providing credentials and all other materials required for secure communication within the system.
d. forward alarms and status messages from Smoke Cell devices to the Central Station.
e. maintain actual statuses of all provisioned Smoke Cell devices including actual Firmware and Hardware versions of all components.
f. forward collected sensor data from Smoke Cell devices to the CRM server
g. parse and store the logs from Smoke Cell device or alternatively to transmit the logs to the Logging Server for storage.
h. send device events to the CRM server.
i. send device sensor data to CRM server.
j. send device updates (connection status, RFBA firmware version, device firmware version) to CRM server.
k. be configurable and allow to manage Central Station Configuration and CRM server access/policy configuration.

In a preferred embodiment, the firmware upgrade server includes the following functionality, although a person of skill in the art would recognize that these may be modified, removed, or combined without deviating from the spirit and scope of the invention:

a. provide a user interface to configure firmware upgrade policies including the following functionality:
   i. configuring individual upgrades
   ii. configuring upgrade waves
b. maintain upgrade event logs including failed or not finished upgrade attempts.
c. communicate with Smoke Cell devices and provide following functionality:
   i. respond to "firmware" requests from Smoke Cell devices
   ii. allow Smoke Cell devices to download requested firmware via corresponding endpoints that store the respective firmware information In a preferred embodiment, the battery end of life notification is repeatedly sent to the communication server for at least 7 days after an initial warning occurs.

In a preferred embodiment, the CRM server includes the following functionality, although a person of skill in the art would recognize that these may be modified, removed, or combined without deviating from the spirit and scope of the invention:

a. communicate with Mobile App to support its flows.
b. communicate with the communication Server to create/update/delete accounts and devices, to receive and store device sensor data, device updates (connection status, RFBA firmware version, device firmware version), device events, to forward requests to get/process alarms.
c. communicate with the Central Station to handle (create/update/suspend) accounts, for each CRM customer account corresponding account in the Central Station should be created.
d. communicate with Payment Services (Google Play and Apple Store) to maintain actual statuses of account's subscriptions.
e. communicate with third party services to send SMS messages.
f. communicate with third party services to send email messages.
g. communicate with Google Geocoding APIs to receive geo coordinates by address.
h. communicate with cellular carrier APIs to activate/deactivate devices.
i. maintain a list of application definitions (links, constants, etc.).
j. handle mobile app notification tokens.
k. provide device status.
l. provide device climate data grouped by day, week, month.
m. handle reset account password.
n. send/verify confirmation code via SMS/email.
o. maintain the mobile application user login/logout.
p. maintain device history events.
q. maintain list of account's devices (Get/Add/Update/Delete).
r. maintain list of client accounts (Get/Create/Update/Delete).
s. be configurable and allow to manage third-party systems/APIs access/policy configuration.

In a preferred embodiment, the CRM portal includes the following functionality, although a person of skill in the art would recognize that these may be modified, removed, or combined without deviating from the spirit and scope of the invention:

a. maintain a list of CRM Portal users (create/update/delete).
b. maintain a list of Smoke Cell detectors with ability to upload a set of new devices via CSV file.
c. support a list of CRM client accounts with the ability to filter/search.
d. support a page with account's details:
   i. Account Info
   ii. List of account's devices List of account's payments
   iii. List of account's system logs
e. maintain a simple list of reports that can be added as SQL queries
f. be configurable and allow to manage access/policy configuration.

In a preferred embodiment, the mobile application includes the following functionality, although a person of skill in the art would recognize that these may be modified, removed, or combined without deviating from the spirit and scope of the invention:

a. communicate with the CRM Server.
b. communicate with Google Maps APIs (to help end user enter the household address).
c. handle device alarms (show alerts, allow to process alarm (cancel or send help immediately, or call 911)).
d. create/update client account (potentially delete).
e. handle user login/logout.
f. add/update/delete device.
g. maintain device history events.

h. handle confirmation codes.
i. maintain reset account's password.
j. maintain device climate data grouped by day, week, month.
k. maintain account settings updates.
l. maintain actual device status.
m. handle notification tokens.
n. support two types of accounts: BASIC and PRO, with some features being enabled only for the PRO account type.
o. handle subscriptions and account levels.

Additionally, in a preferred embodiment, the following parameters and conditions are provided by the various modules and components, although a person of skill in the art would recognize that these may be modified, removed, or combined without deviating from the spirit and scope of the invention:

a. Alarm are reported to Central Station within a 1 second interval (assuming ideal network/services conditions) once the communication server decides that it should send the alarm to the central station (e.g., after a 30 seconds delay has lapsed or a send immediate action has been received).
b. Communication failure/trouble between a device and the communication server are detected in less than 90 seconds. The device logs any issue and reports the failure via the SMS backup channel.
c. The communication server replies to the requests from Smoke Cell devices within 1 second, utilizing an asynchronous protocol (assuming ideal network/services conditions and that a large binary data transfer has not been sent to the communication server)
d. The CRM server replies to requests from a Mobile Application, the communication server, the cellular carrier, or external Payment Services within a time interval sufficient to provide real-time or near real-time responsiveness and minimize any indications of lag to the users.
e. All external communication are encrypted using industry standard SSL/HTTPS.
f. Unique certificates are embedded into every firmware and both firmware and certificates are protected via fuse preventing from reading it from device memory.
g. A special provisioning scheme is deployed to prevent certificates or keys from leakage during manufacturing.

In a preferred embodiment, the system provides general reliability by means of:

a. the stateless or semi-stateless nature of the server components (communication server, upgrade server, CRM server, etc.)
b. explicit redundancy including multiple communication server, upgrade server, and CRM server instances behind a load-balancer cloud provider (e.g. database as a service)

Additionally, in a preferred embodiment, the communications server is scalable by its design and deployed in the cloud environment so that it can accommodate to high loads quite easily. The throughput of the single communication server instance depends on the reserved resources and cloud provider limitations.

Similarly, in another embodiment, the system firmware is designed to be stateless and rely on software and hardware watchdogs, and the stateless structure allows the system components to resume normal functionality after reset independently from its source. The firmware design in such an embodiment also assumes a ping-pong scheme for updating firmware and rollback to previous versions or golden images, minimizing the risk of a corrupted firmware update. Additionally, in such an embodiment, the firmware also provides for shutting down the device in the event of a cyclic reboot problem or firmware corruption in both the current and the backup firmware images.

In a preferred embodiment, the firmware is designed upon an ANSI-C implementation and is intended to be extremely portable by utilizing the ST Microelectronics microcontroller unit software development kit for access to chip peripherals. Additionally, in such an embodiment, approximately 90% of the vendor specific routines are isolated via a vendor agnostic HAL layer. As a result, migration to other STMicroelectronics chipsets can be smoothly performed with virtually no or minimal development effort. However, changing chip vendors would require only some additional work to connect the HAL layer with specific peripherals and verifying functionality.

In a preferred embodiment and to address limited Cat M1 download speeds, the FOTA module preferably supports segmented downloads where the firmware image can be downloaded in multiple segments or chunks. The firmware is preferably be divided into small chunks such that the largest segment can be downloaded in less than 10 minutes. However, multiple segments may be downloaded in a single download session and exceed 10 minutes.

Figure 24:
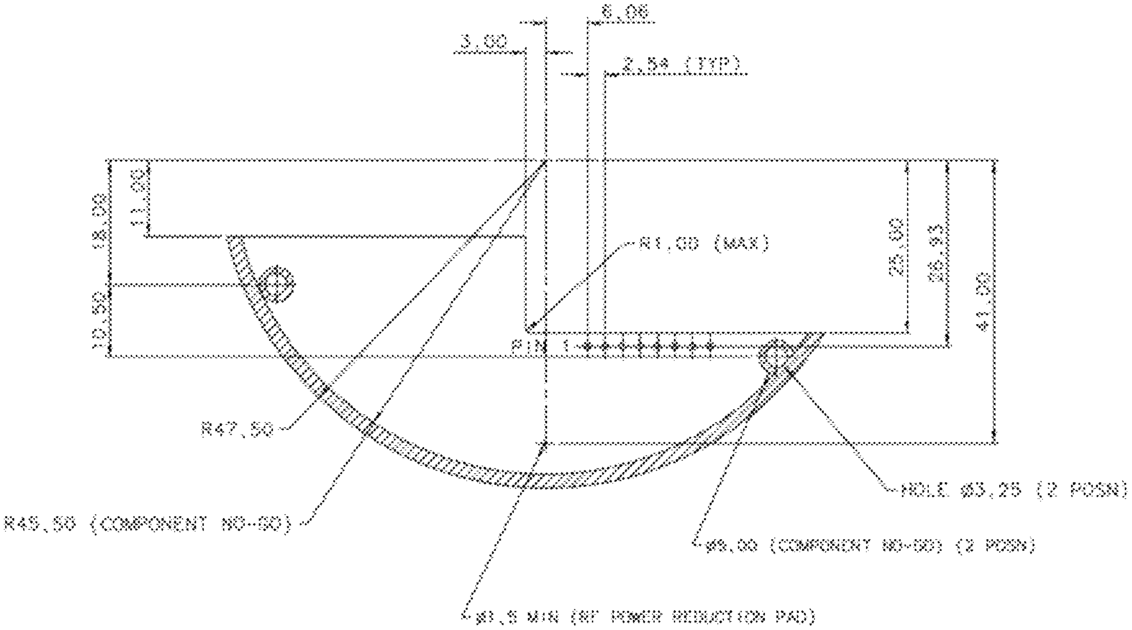
FIG. 24 illustrates the dimensions of an embodiment of the PCB.

In a preferred embodiment, the outer edge of the PCB for the Smoke Cell detector (the 47.50 mm radius) has a 2 mm no-go area for components around the complete arc. The pins are preferably a standard 0.1" pitch 0.5" long square pin gold flash finish header, and the PCB preferably has a 5 mm clearance on the top side and a 10 mm clearance on the far side (as shown in FIG. 24).

The invention claimed is:

1. A connected detector system comprising:

one or more detectors, each detector comprising a sensor module, and a communications module,
said sensor module comprising a first microcontroller and one or more sensors for detecting the presence of at least one of smoke, carbon monoxide, or natural gas,
wherein said first microcontroller is connected to said one or more sensors to monitor a corresponding status of each of said sensors and to receive data corresponding to one or more readings from each of said sensors,
wherein said first microcontroller is configured to process said data from at least one of said sensors to determine whether a predetermined threshold corresponding to said sensor has been passed, and
said communications module comprising one or more transceivers and a second microcontroller connected to and in communication with said first microcontroller to receive from said first microcontroller identification of at least one of said sensors, said data for said sensor, and an alert corresponding to a determination by said first microcontroller that said predetermined threshold for said sensor has been passed,
said second microcontroller configured to receive said sensor data or alerts from said first microcontroller and to communicate said received sensor data or alerts to a communications server via one or more wireless communications channels;
wherein at least one of said one or more detectors is configured to store a first certified profile for detection and operation at the time of manufacture;

a customer relationships management server for storing a customer account associated with said one or more detectors, said customer relationships management server configured to receive from said communications server said sensor data and alerts corresponding to said stored customer account, wherein said customer relationships management server is configured to communicate with one or more user devices associated with said customer account, and a central station configured to communicate with and to receive sensor data and alerts from said communications server.

2. A connected detector system as in claim 1 wherein said detector is capable of being updated and further configured to receive and to store a second certified profile for detection and operation subsequent to manufacture, wherein said detector replaces said first certified profile with said second certified profile.

3. A connected detector system as in claim 2 wherein said first and second certified profiles include parameters for detecting the presence of monitored gasses and particulate matter using said one or more sensors.

4. A connected detector system as in claim 3 wherein said communications server is configured to transmit said second certified profile to said one or more detectors.

5. A connected detector system as in claim 3 further comprising a firmware upgrade server configured to communicate with each of said one or more detectors and to transmit said second certified profile to said one or more detectors.

6. A connected detector system as in claim 5, wherein said firmware upgrade server stores a priority list of the order for upgrading each of said one or more detectors.

7. A connected detector system as in claim 1 wherein said detector further comprises a single substrate containing both said sensor module and said communications module, wherein said microcontrollers of said sensor module and said communications module are electronically coupled on said substrate to communicate with each other.

8. A connected detector system as in claim 1 wherein each detector further comprises a unique key associated with said detector at the time of manufacture of said detector.

9. A connected detector system as in claim 8 wherein said unique key associated with said detector is unchangeable after manufacturing said detector.

10. A connected detector system as in claim 8 wherein said unique key further includes one or more of a Public/Private key combination, a provisioning certificate, a unique device identifier, a Device ID (DID), a string name assigned to the unit, manufacturer information of the detector, model information of the detector, international mobile equipment ID (IMEI) for the detector, integrated circuit card ID number (ICCID) for the detector, current firmware version information of the detector, upgrade priority information of the detector, upgrade wave assignment of the detector, Cat M1 module information.

11. A connected detector system as in claim 1 wherein said one or more transceivers of said communications module comprises a cellular transceiver capable of communicating with an LTE module comprising one or more LTE protocols.

12. A connected detector system as in claim 11 wherein a command issued for at least one of said detectors by said user devices associated with said customer account is transmitted to said communication server and, upon determining an established Cat M1 communication connection on said one or more LTE protocols, said command is transmitted to said device using said Cat M1 protocol.

13. A connected detector system as in claim 11 wherein said transceiver is further configured to communicate with an SMS protocol, wherein said SMS communication protocol is used in the event said transceiver is unable to establish a connection to said communications server using an established Cat M1 protocol on said one or more LTE protocols.

14. A connected detector system as in claim 13 wherein a command issued for at least one of said detectors by said user devices associated with said customer account is transmitted to said communication server and, upon determination that said communication server is unable to establish a connection to said detector within a predetermined set of time, said command is transmitted by said communication server to said device using said SMS communication protocol.

15. A connected detector system as in claim 11 further comprising a firmware upgrade server configured to communicate with each of said one or more detectors, wherein said upgrade server stores a firmware upgrade divided into a plurality of binary chunks and, upon determining an established Cat M1 communication connection one said one or more LTE protocols, transmits each of said binary chunks to said detectors using said Cat M1 protocol.

16. A connected detector system as in claim 1 wherein said one or more user devices comprise a mobile application.

17. A connected detector system as in claim 16 wherein said customer relationships management server further stores information associating said authorized user devices having said mobile application with at least one of said one or more detectors, wherein said sensor data and alerts for said one or more associated detectors is transmitted by said customer relationships management server to said associated authorized devices using said mobile application.

18. A connected detector system as in claim 16 wherein said associated authorized devices having said mobile application is configured to receive commands related to said alerts for one of said one or more associated detectors and to transmit said received commands to said customer relationships management server, and wherein said customer relationships management server is further configured to transmit said received commands to said communications server.

19. A connected detector system as in claim 18 wherein said communications server is further configured to transmit one or more commands to said central station and to said associated detector based upon said received user commands.

20. A connected detector system as in claim 19 wherein said commands from said communications server comprise at least one of a reset status command for said associated detector, a command to notify emergency services, a command to retrieve additional sensor data from said associated detector, or a command to activate or deactivate one or more peripheral devices connected to said associated detector.

21. A connected detector system as in claim 20 wherein said one or more peripheral devices connected to said associated detector comprises at least one of a microphone or an imaging sensor.

22. A connected detector system comprising:

one or more detectors, each detector comprising a sensor module, and a communications module, said sensor module comprising a microcontroller and one or more sensors for detecting the presence of at least one of smoke, fire, radon, carbon monoxide, or natural gas, wherein said microcontroller is connected to said one or more sensors to monitor a corresponding status of each of said sensors and to receive data corresponding to one or more readings from each of said sensors, wherein said microcontroller is configured to process said data from at least one of said sensors to determine whether a predetermined threshold corresponding to said sensor has been passed, and said communications module comprising one or more transceivers connected to and in communication with said microcontroller to receive from said microcontroller identification of at least one of said sensors, said data for said sensor, and an alert corresponding to a determination by said microcontroller that said predetermined threshold for said sensor has been passed, said microcontroller is further configured to communicate said received sensor data or alerts to a server via one or more wireless communications channels, and wherein at least one of said one or more detectors is configured to store a first certified profile for detection and operation at the time of manufacture;

a mobile application residing on one or more user devices and configured to associate said one or more user devices with at least one of said detectors and configured to communicate with said server, wherein said server transmits said alert to at least one of said user devices associated with said detector corresponding to said alert using at least the mobile application, and a database for storing data associated with the occurrence and timing of said alerts along with sensor data associated with each detector.

23. A connected detector system as in claim 22 wherein said mobile application receiving said alert is further configured to prompt a user for a response to said alert and to transmit said user response to said server and subsequently to a central station.

24. A connected detector system as in claim 23 wherein said transmittal to said central station is delayed by a predetermined maximum period of time, and upon receiving no response within said predetermined maximum period of time, said server is further configured to transmit said alert to said central station.

25. A connected detector system as in claim 23 wherein said transmittal to said central station is delayed by said predetermined maximum period of time, and upon receiving a user response to transmit said alert, said server is further configured to transmit said alert to said central station.

26. A connected detector system as in claim 23 wherein said transmittal of said alert to said central station further comprises transmittal of said sensor data of said detector corresponding to said alert.

27. A connected detector system as in claim 22 wherein said database is further configured to store and index any user response to said stored alert.

28. A connected detector system as in claim 22 wherein said transmittal of said alert further comprises transmittal of identification of said detector corresponding to said alert and any device receiving said alert is further configured to use said identification to request said server retrieve and transmit additional sensor data from said identified detector.

29. A connected detector system as in claim 28 wherein said additional sensor data comprises at least one of updated sensor data from said identified detector, imaging data from a sensor connected with said identified detector, audio data from a microphone connected with said identified detector, or numerical sensor data from another sensor connected with said identified detector.

30. A connected detector system comprising:

one or more detectors, each detector comprising a sensor module, and a communications module, said sensor module comprising a microcontroller and one or more sensors for detecting the presence of at least one of smoke, fire, radon, carbon monoxide, or natural gas, wherein said microcontroller is connected to said one or more sensors to monitor a corresponding status of each of said sensors and to receive data corresponding to one or more readings from each of said sensors, wherein said microcontroller is configured to process said data from at least one of said sensors to determine whether a predetermined threshold corresponding to said sensor has been passed, and said communications module comprising one or more transceivers connected to and in communication with said microcontroller to receive from said microcontroller identification of at least one of said sensors, said data for said sensor, and an alert corresponding to a determination by said first microcontroller that said predetermined threshold for said sensor has been passed, said microcontroller is further configured to communicate said sensor data or alerts to a communications server via one or more wireless communications channels; and wherein at least one of said one or more detectors is configured to store a first certified profile for detection and operation at the time of manufacture; and a customer relationships management server for storing a customer account associated with said one or more detectors, said customer relationships management server configured to receive from said communications server said sensor data and alerts corresponding to said stored customer account, wherein said customer relationships management server is configured to communicate with one or more user devices associated with said customer account.

* * * * *